US012581500B2

(12) United States Patent
Nogami et al.

(10) Patent No.: US 12,581,500 B2
(45) Date of Patent: Mar. 17, 2026

(54) USER EQUIPMENT, BASE STATION AND METHOD

(71) Applicant: SHARP KABUSHIKI KAISHA, Sakai City (JP)

(72) Inventors: Toshizo Nogami, Sakai City (JP); Hiroki Takahashi, Sakai City (JP); Kozue Yokomakura, Sakai City (JP); Makoto Kitahara, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 333 days.

(21) Appl. No.: 18/116,429

(22) Filed: Mar. 2, 2023

(65) Prior Publication Data

US 2024/0251422 A1     Jul. 25, 2024

(30) Foreign Application Priority Data

Jan. 25, 2023     (JP) ................................. 2023-009452

(51) Int. Cl.
*H04W 72/231*        (2023.01)
*H04L 5/00*          (2006.01)

(52) U.S. Cl.
CPC ......... *H04W 72/231* (2023.01); *H04L 5/0044* (2013.01); *H04L 5/0053* (2013.01)

(58) Field of Classification Search
CPC .. H04W 72/231; H04L 5/0053; H04L 5/0044; H04L 1/0061
See application file for complete search history.

(56) References Cited

U.S. PATENT DOCUMENTS

2021/0049220 A1*  2/2021  Pingol ................... G06Q 50/26
2024/0073892 A1*  2/2024  Lin ....................... H04W 72/23
2024/0389162 A1*  11/2024  Liu ................... H04W 72/1268
(Continued)

OTHER PUBLICATIONS

Panasonic, "Discussion on dynamic waveform switching", R1-2211134, 3GPP TSG RAN WG1 #111, Toulouse, France, Nov. 14-18, 2022, Nov. 7, 2022 (Nov. 7, 2022).
(Continued)

*Primary Examiner* — Brian D Nguyen
(74) *Attorney, Agent, or Firm* — ScienBiziP, P.C.

(57)     ABSTRACT

A user equipment (UE) is described. The UE may comprise high-layer processing circuitry configured to acquire at least a first RRC parameter for indicating that a first information field is present in a DCI format, the first information field indicating whether a transform precoder is enabled or disabled for a PUSCH. The UE may also comprise reception circuitry configured to monitor the DCI format with CRC scrambled by C-RNTI and the DCI format with CRC scrambled by CS-RNTI. A first number of bits may be included in a second information field in the DCI format with CRC scrambled by C-RNTI with the first information field indicating the transform precoder as disabled. If a second number of bits included in the second information field in the DCI format with CRC scrambled by CS-RNTI is not equal to the first number, most significant bit of which a value is "0" may be inserted to the second information field in the DCI format with CRC scrambled by CS-RNTI until the second number becomes equal to the first number.

7 Claims, 17 Drawing Sheets

(56)         References Cited

U.S. PATENT DOCUMENTS

2024/0405814 A1 *  12/2024  Jang ...................... H04L 5/0023
2025/0089035 A1 *   3/2025  Lee ...................... H04L 5/0094

OTHER PUBLICATIONS

Huawei, "Introduction of Further enhancements on MIMO for NR",
R1-2112941, 3GPP TSG-RAN WG1 Meeting #107-e, e-Meeting,
Nov. 11, 2021-Nov. 19, 2021, Dec. 8, 2021(Dec. 8, 2021).
InterDigital, Inc., "Summary #2 on dynamic switching between
DFT-S-OFDM and CP-OFDM", R1-2212446, 3GPP TSG RAN
WG1 #111, Toulouse, France, Nov. 14, 2022-Nov. 18, 2022, Nov.
17, 2022 (Nov. 17, 2022).

* cited by examiner

Figure 2A

Number of OFDM symbols per slot, slots per frame, and slots per subframe for normal cyclic prefix

| u | $N_{symb}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2B

Number of OFDM symbols per slot, slots per frame, and slots per subframe for extended cyclic prefix

| u | $N_{symb}^{slot}$ | $N_{slot}^{frame,u}$ | $N_{slot}^{subframe,u}$ |
|---|---|---|---|
| 2 | 12 | 40 | 4 |

Block of bits for a codeword

Scrambling

Modulation

Layer mapping $x(i)$ for a layer

Transform Precoding

Disabled: Pass through
Enabled: DFT $y(i)$ for a layer

Mapping to resource blocks

IFFT

OFDM baseband signal generation

OFDM baseband signal $$y(l \cdot M_{sc}^{PUSCH} + k) = \frac{1}{\sqrt{M_{sc}^{PUSCH}}} \sum_{i=0}^{M_{sc}^{PUSCH}-1} \tilde{x}(l \cdot M_{sc}^{PUSCH} + i) e^{-j\frac{2\pi ik}{M_{sc}^{PUSCH}}}$$

$$k = 0, \dots, M_{sc}^{PUSCH}$$

$$l = 0, \dots, M_{symb}^{layer} / M_{sc}^{PUSCH} - 1$$

$$M_{sc}^{PUSCH} = M_{RB}^{PUSCH} \cdot N_{sc}^{RB}$$

Figure 10

Start

Step 1601) Acquiring at least a first RRC parameter for indicating that a first information field is present in a DCI format.

Step 1602) Monitoring the DCI format with CRC scrambled by C-RNTI and the DCI format with CRC scrambled by CS-RNTI End Start Step 1701) Sending at least a first RRC parameter for indicating that a first information field is present in a DCI format.

Step 1702) Transmitting the DCI format with CRC scrambled by C-RNTI and the DCI format with CRC scrambled by CS-RNTI End

USER EQUIPMENT, BASE STATION AND METHOD

TECHNICAL FIELD

The present invention relates to a user equipment, a base station and a method.

BACKGROUND

In the 3rd Generation Partnership Project (3GPP), a radio access method and a radio network for cellular mobile communications (hereinafter, referred to as Long Term Evolution, or Evolved Universal Terrestrial Radio Access) have been studied. In LTE (Long Term Evolution), a base station device is also referred to as an evolved NodeB (eNodeB), and a terminal device is also referred to as a User Equipment (UE). LTE is a cellular communication system in which multiple areas are deployed in a cellular structure, with each of the multiple areas being covered by a base station device. A single base station device may manage multiple cells. Evolved Universal Terrestrial Radio Access is also referred as E-UTRA.

In the 3GPP, the next generation standard (New Radio: NR) has been studied in order to make a proposal to the International-Mobile-Telecommunication-2020 (IMT-2020) which is a standard for the next generation mobile communication system defined by the International Telecommunications Union (ITU). NR has been expected to satisfy a requirement considering three scenarios of enhanced Mobile BroadBand (eMBB), massive Machine Type Communication (mMTC), and Ultra Reliable and Low Latency Communication (URLLC), in a single technology framework.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIGS. 2A and 2B are examples showing the relationship between subcarrier-spacing configuration u, the number of OFDM symbols per slot $N^{slot}_{symb}$, and the CP configuration according to an aspect of the present embodiment;

FIG. 10 shows an example of equation of DFT process for transform precoding;

DETAILED DESCRIPTION

Figure 1:
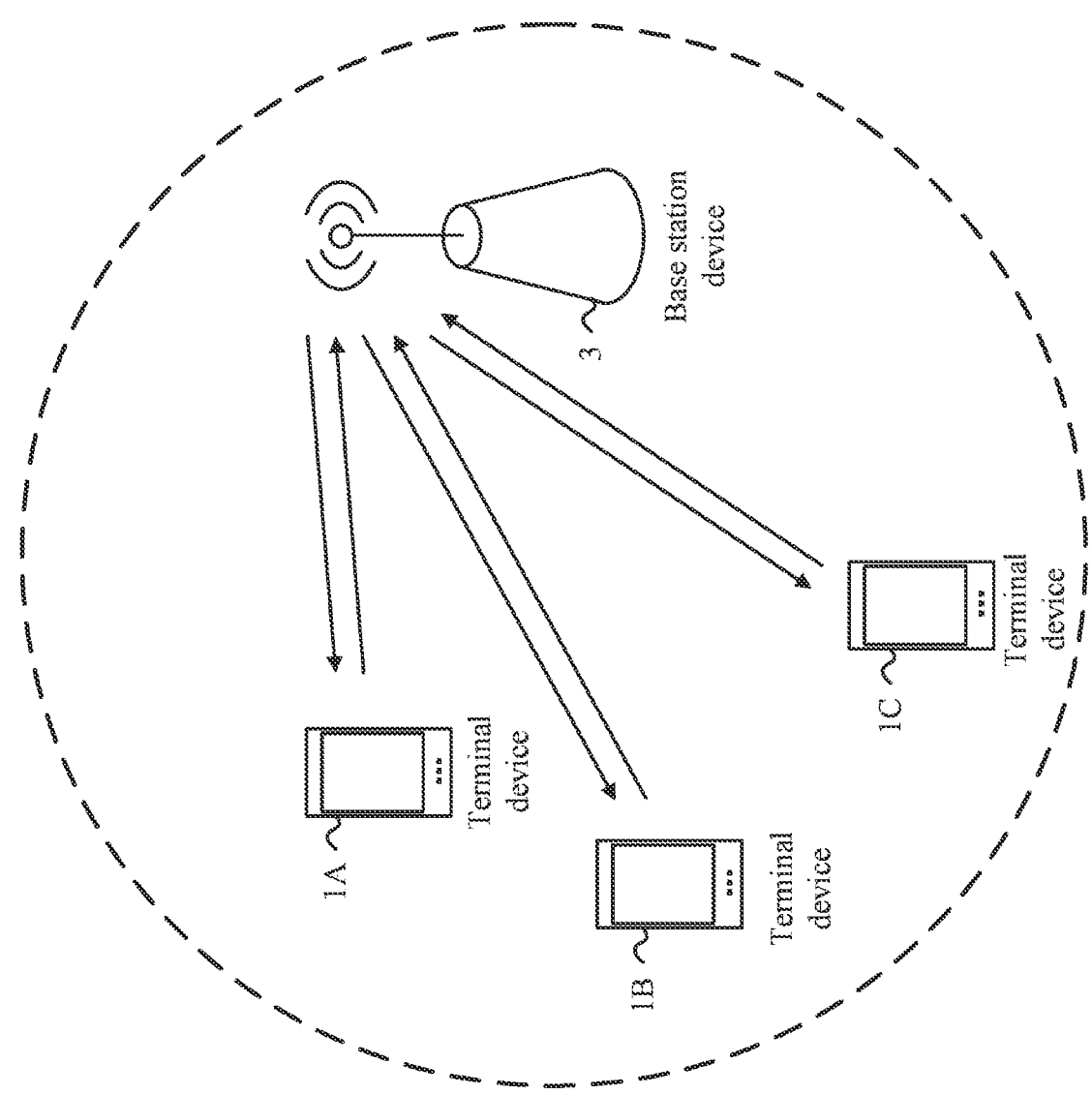
FIG. 1 is a conceptual diagram of a wireless communication system according to an aspect of the present embodiment.

A user equipment (UE) is described. The UE may comprise high-layer processing circuitry configured to acquire at least a first RRC parameter for indicating that a first information field is present in a DCI format, the first information field indicating whether a transform precoder is enabled or disabled for a PUSCH. The UE may also comprise reception circuitry configured to monitor the DCI format with CRC scrambled by C-RNTI and the DCI format with CRC scrambled by CS-RNTI. A first number of bits may be included in a second information field in the DCI format with CRC scrambled by C-RNTI with the first information field indicating the transform precoder as disabled. If a second number of bits included in the second information field in the DCI format with CRC scrambled by CS-RNTI is not equal to the first number, most significant bit of which a value is "0" may be inserted to the second information field in the DCI format with CRC scrambled by CS-RNTI until the second number becomes equal to the first number.

A third number of bits may be included in the second information field in the DCI format with CRC scrambled by C-RNTI with the first information field indicating the transform precoder as enabled. If a third number is not equal to the first number, most significant bit of which a value is "0" may be inserted to the second information field in the DCI format with CRC scrambled by C-RNTI with the first information field indicating the transform precoder as enabled until the third number becomes equal to the first number.

A fourth number of bits may be included in the DCI format with CRC scrambled by C-RNTI with the first information field indicating the transform precoder as disabled. A fifth number of bits may be included in the DCI format with CRC scrambled by C-RNTI with the first information field indicating the transform precoder as enabled. If the fourth number is not equal to the fifth number, a bit of which a value is "0" may be inserted to the DCI format with CRC scrambled by C-RNTI with the first information field indicating the transform precoder as enabled until the fifth number becomes equal to the fourth number.

A base station is described. The base station may comprise high-layer processing circuitry configured to send at least a first RRC parameter for indicating that a first information field is present in a DCI format, the first information field indicating whether a transform precoder is enabled or disabled for a PUSCH. The base station may also comprise transmission circuitry configured to transmit the DCI format with CRC scrambled by C-RNTI and the DCI format with CRC scrambled by CS-RNTI. A first number of bits may be included in a second information field in the DCI format with CRC scrambled by C-RNTI with the first information field indicating the transform precoder as disabled. If a second number of bits included in the second information field in the DCI format with CRC scrambled by CS-RNTI is not equal to the first number, most significant bit of which a value is "0" may be inserted to the second information field in the DCI format with CRC scrambled by CS-RNTI until the second number becomes equal to the first number.

A third number of bits may be included in the second information field in the DCI format with CRC scrambled by C-RNTI with the first information field indicating the transform precoder as enabled. If a third number is not equal to the first number, most significant bit of which a value is "0" may be inserted to the second information field in the DCI format with CRC scrambled by C-RNTI with the first information field indicating the transform precoder as enabled until the third number becomes equal to the first number.

A fourth number of bits may be included in the DCI format with CRC scrambled by C-RNTI with the first information field indicating the transform precoder as disabled. A fifth number of bits may be included in the DCI format with CRC scrambled by C-RNTI with the first information field indicating the transform precoder as enabled. If the fourth number is not equal to the fifth number, a bit of which a value is "0" may be inserted to the DCI format with CRC scrambled by C-RNTI with the first information field indicating the transform precoder as enabled until the fifth number becomes equal to the fourth number.

A method for a user equipment (UE) is described. The method may comprise acquiring at least a first RRC parameter for indicating that a first information field is present in a DCI format, the first information field indicating whether a transform precoder is enabled or disabled for a PUSCH. The method may also comprise monitoring the DCI format with CRC scrambled by C-RNTI and the DCI format with CRC scrambled by CS-RNTI. A first number of bits may be included in a second information field in the DCI format with CRC scrambled by C-RNTI with the first information field indicating the transform precoder as disabled. If a second number of bits included in the second information field in the DCI format with CRC scrambled by CS-RNTI is not equal to the first number, most significant bit of which a value is "0" may be inserted to the second information field in the DCI format with CRC scrambled by CS-RNTI until the second number becomes equal to the first number.

A method for a base station is described. The method may comprise sending at least a first RRC parameter for indicating that a first information field is present in a DCI format, the first information field indicating whether a transform precoder is enabled or disabled for a PUSCH. The method may also comprise transmitting the DCI format with CRC scrambled by C-RNTI and the DCI format with CRC scrambled by CS-RNTI. A first number of bits may be included in a second information field in the DCI format with CRC scrambled by C-RNTI with the first information field indicating the transform precoder as disabled. If a second number of bits included in the second information field in the DCI format with CRC scrambled by CS-RNTI is not equal to the first number, most significant bit of which a value is "0" may be inserted to the second information field in the DCI format with CRC scrambled by CS-RNTI until the second number becomes equal to the first number.

floor (CX) may be a floor function for real number CX. For example, floor (CX) may be a function that provides the largest integer within a range that does not exceed the real number CX. ceil (DX) may be a ceiling function to a real number DX. For example, ceil (DX) may be a function that provides the smallest integer within the range not less than the real number DX. mod (EX, FX) may be a function that provides the remainder obtained by dividing EX by FX. mod (EX, FX) may be a function that provides a value which corresponds to the remainder of dividing EX by FX. It is exp $(GX)=e^{\wedge}GX$. Here, e is Napier number. (HX) A (IX) indicates IX to the power of HX.

In a wireless communication system according to one aspect of the present embodiment, at least OFDM (Orthogonal Frequency Division Multiplex) is used. An OFDM symbol is a unit of time domain of the OFDM. The OFDM symbol includes at least one or more subcarriers. An OFDM symbol is converted to a time-continuous signal in baseband signal generation. In downlink, at least CP-OFDM (Cyclic Prefix-Orthogonal Frequency Division Multiplex) is used. In uplink, either CP-OFDM or DFT-s-OFDM (Discrete Fourier Transform-spread-Orthogonal Frequency Division Multiplex) is used. DFT-s-OFDM may be given by applying transform precoding to CP-OFDM. CP-OFDM is OFDM using CP (Cyclic Prefix).

Either DFT-s-OFDM or CP-OFDM may be given based whether or not transform precoder (or transform precoding) is enabled. DFT-s-OFDM may be given if the transform precoder (or transform precoding) is enabled. CP-OFDM may be given if the transform precoder (or transform precoding) is disabled. E.g. either enabled transform precoder or disabled transform precoder for PUSCH may be indicated based on RRC parameters transformPrecoder in PUSCH-Config or ConfiguredGrantConfig and/or msg3-transform-Precoder in RACH-ConfigCommon. The information element PUSCH-Config may be used to configure the UE specific PUSCH parameters applicable to a particular BWP. The information element ConfiguredGrantConfig may be used to configure uplink transmission without dynamic grant according to two possible schemes. The actual uplink grant may either be configured via RRC (Type1 CS) or provided via the PDCCH (addressed to CS-RNTI) (Type2 CS). Multiple Configured Grant configurations may be configured in one BWP of a serving cell. The information element RACH-ConfigCommon may be used to specify the cell specific random-access parameters.

The RRC parameter transformPrecoder indicates the UE specific selection of the transform precoder for a PUSCH. If the transformPrecoder is absent/not configured, the UE applies the value of the msg3-transformPrecoder to the transform precoder for the PUSCH.

The msg3-transformPrecoder indicates that the UE enables the transform precoder for Msg3 transmission. If the msg3-transformPrecoder is provided/configured, the UE enables the transform precoder for the Msg3 transmission. If the msg3-transformPrecoder is absent/not configured/not provided, the UE disables the transform precoder for Msg3 transmission.

The OFDM symbol may be a designation including a CP added to the OFDM symbol. That is, an OFDM symbol may be configured to include the OFDM symbol and a CP added to the OFDM symbol.

A terminal device may be also referred to as a user equipment (UE). A base station device may be also referred to as next-generation node B (gNB, gNodeB).

FIG. 1 is a conceptual diagram of a wireless communication system according to an aspect of the present embodiment. In FIG. 1, the wireless communication system includes at least terminal device 1A to 1C and a base station device 3 (BS #3: Base station #3). Hereinafter, the terminal devices 1A to 1C are also referred to as a terminal device 1 (UE #1: User Equipment #1).

The base station device 3 may be configured to include one or more transmission devices (or transmission points, transmission devices, reception devices, transmission points, reception points). When the base station device 3 is configured by a plurality of transmission devices, each of the plurality of transmission devices may be arranged at a different position.

The base station device 3 may provide one or more serving cells. A serving cell may be defined as a set of resources used for wireless communication. A serving cell is also referred to as a cell.

A serving cell may be configured to include at least one downlink component carrier (downlink carrier) and/or one uplink component carrier (uplink carrier). A serving cell may be configured to include at least two or more downlink component carriers and/or two or more uplink component carriers. A downlink component carrier and an uplink component carrier are also referred to as component carriers (carriers).

For example, one resource grid may be provided for one component carrier. For example, one resource grid may be provided for one component carrier and a subcarrier-spacing configuration u. A subcarrier-spacing configuration u is also referred to as numerology. A resource grid includes $N^{size,u}_{grid,x} N^{RB}_{sc}$ subcarriers. The resource grid starts from a common resource block with index $N^{size,u}_{grid}$. The common resource block with the index $N^{start,u}_{grid}$ is also referred to as a reference point of the resource grid. The resource grid includes $N^{subframe,u}_{symb}$ OFDM symbols. The subscript x indicates the transmission direction and indicates either downlink or uplink. One resource grid is provided for an antenna port p, a subcarrier-spacing configuration u, and a transmission direction x.

Resource grid is also referred to as carrier.

$N^{size,u}_{grid,x}$ and $N^{size,u}_{grid}$ are given based at least on an RRC parameter (e.g. referred to as RRC parameter Carrier-Bandwidth). The RRC parameter is used to define one or more SCS (SubCarrier-Spacing) specific carriers. One resource grid corresponds to one SCS specific carrier. One component carrier may comprise one or more SCS specific carriers. The SCS specific carrier may be included in a system information block (SIB). For each SCS specific carrier, a subcarrier-spacing configuration u may be provided.

FIGS. 2A and 2B are examples showing the relationship between subcarrier-spacing configuration u, the number of OFDM symbols per slot $N^{slot}_{symb}$, and the CP configuration according to an aspect of the present embodiment. In FIG. 2A, for example, when the subcarrier-spacing configuration u is set to 2 and the CP configuration is set to normal CP (normal cyclic prefix), $N^{slot}_{symb}=14$, $N^{frame,u}_{slot}=40$, $N^{subframe,u}_{slot}=4$. Further, in FIG. 2B, for example, when the subcarrier-spacing configuration u is set to 2 and the CP configuration is set to an extended CP (extended cyclic prefix), $N^{slot}_{symb}=12$, $N^{frame,u}_{slot}=40$, $N^{subframe,u}_{slot}=4$.

In the wireless communication system according to an aspect of the present embodiment, a time unit $T_c$ may be used to represent the length of the time domain. The time unit $T_c$ is $T_c=1/(df_{max}*N_f)$. It is $df_{max}=480$ kHz. It is $N_f=4096$. The constant k is $k=df_{max}*N_f/(df_{ref}N_{f,ref})=64$. $df_{ref}$ is 15 kHz. $N_{f,ref}$ is 2048.

Transmission of signals in the downlink and/or transmission of signals in the uplink may be organized into radio frames (system frames, frames) of length $T_f$. It is $T_f=(df_{max}N_f/100)*T_s=10$ ms. One radio frame is configured to include ten subframes. The subframe length is $T_{sf}=(df_{max}N_f/1000)T_s=1$ ms. The number of OFDM symbols per subframe is $N^{subframe,u}_{symb}=N^{slot}_{symb}N^{subframe,u}_{slot}$.

For a subcarrier-spacing configuration u, the number of slots included in a subframe and indexes may be given. For example, slot index $n^u_s$ may be given in ascending order with an integer value ranging from 0 to $N^{subframe,u}_{slot}-1$ in a subframe. For subcarrier-spacing configuration u, the number of slots included in a radio frame and indexes of slots included in the radio frame may be given. Also, the slot index $n^u_{s,f}$ may be given in ascending order with an integer value ranging from 0 to $N^{frame,u}_{slot}-1$ in the radio frame. Consecutive $N^{slot}_{symb}$ OFDM symbols may be included in one slot. It is $N^{slot}_{symb}=14$.

Figure 3:
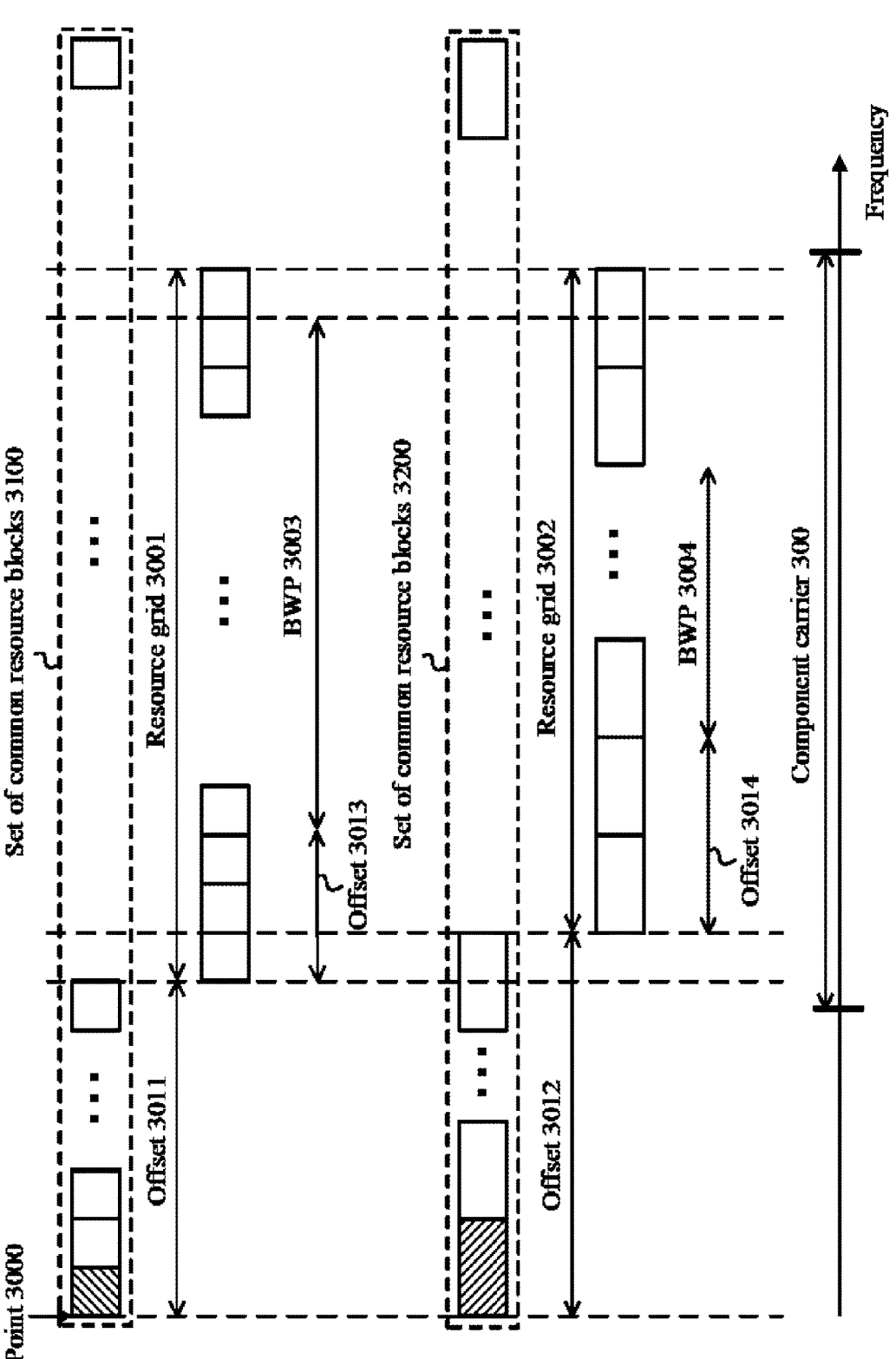
FIG. 3 is a diagram showing an example of a method of configuring a resource grid according to an aspect of the present embodiment.

FIG. 3 is a diagram showing an example of a method of configuring a resource grid according to an aspect of the present embodiment. The horizontal axis in FIG. 3 indicates frequency domain. FIG. 3 shows a configuration example of a resource grid of subcarrier-spacing configuration $u=u_1$ in the component carrier 300 and a configuration example of a resource grid of subcarrier-spacing configuration $u=u_2$ in a component carrier. One or more subcarrier-spacing configuration may be set for a component carrier. Although it is assumed in FIG. 3 that $u_1=u_2-1$, various aspects of this embodiment are not limited to the condition of $u_1=u_2-1$.

The component carrier 300 is a band having a predetermined width in the frequency domain.

Point 3000 is an identifier for identifying a subcarrier. Point 3000 is also referred to as point A. The common resource block (CRB) set 3100 is a set of common resource blocks for the subcarrier-spacing configuration $u_1$.

Among the common resource block-set 3100, the common resource block including the point 3000 (the block indicated by the upper right diagonal line in FIG. 3) is also referred to as a reference point of the common resource block-set 3100. The reference point of the common resource block-set 3100 may be a common resource block with index 0 in the common resource block-set 3100.

The offset 3011 is an offset from the reference point of the common resource block-set 3100 to the reference point of the resource grid 3001. The offset 3011 is indicated by the number of common resource blocks which is relative to the subcarrier-spacing configuration $u_1$. The resource grid 3001 includes $N^{size,u}_{grid1,x}$ common resource blocks starting from the reference point of the resource grid 3001.

The offset 3013 is an offset from the reference point of the resource grid 3001 to the reference point ($N^{start,u}_{BWP,i1}$) of the BWP (BandWidth Part) 3003 of the index i1.

Common resource block-set 3200 is a set of common resource blocks with respect to subcarrier-spacing configuration $u_2$.

A common resource block including the point 3000 (a block indicated by a upper left diagonal line in FIG. 3) in the common resource block-set 3200 is also referred to as a reference point of the common resource block-set 3200. The reference point of the common resource block-set 3200 may be a common resource block with index 0 in the common resource block-set 3200.

The offset 3012 is an offset from the reference point of the common resource block-set 3200 to the reference point of the resource grid 3002. The offset 3012 is indicated by the number of common resource blocks for subcarrier-spacing configuration $u=u_2$. The resource grid 3002 includes $N^{size,u}_{grid2,x}$ common resource blocks starting from the reference point of the resource grid 3002.

The offset 3014 is an offset from the reference point of the resource grid 3002 to the reference point ($N^{start,u}_{BWP,i2}$) of the BWP 3004 with index $i_2$.

Figure 4:
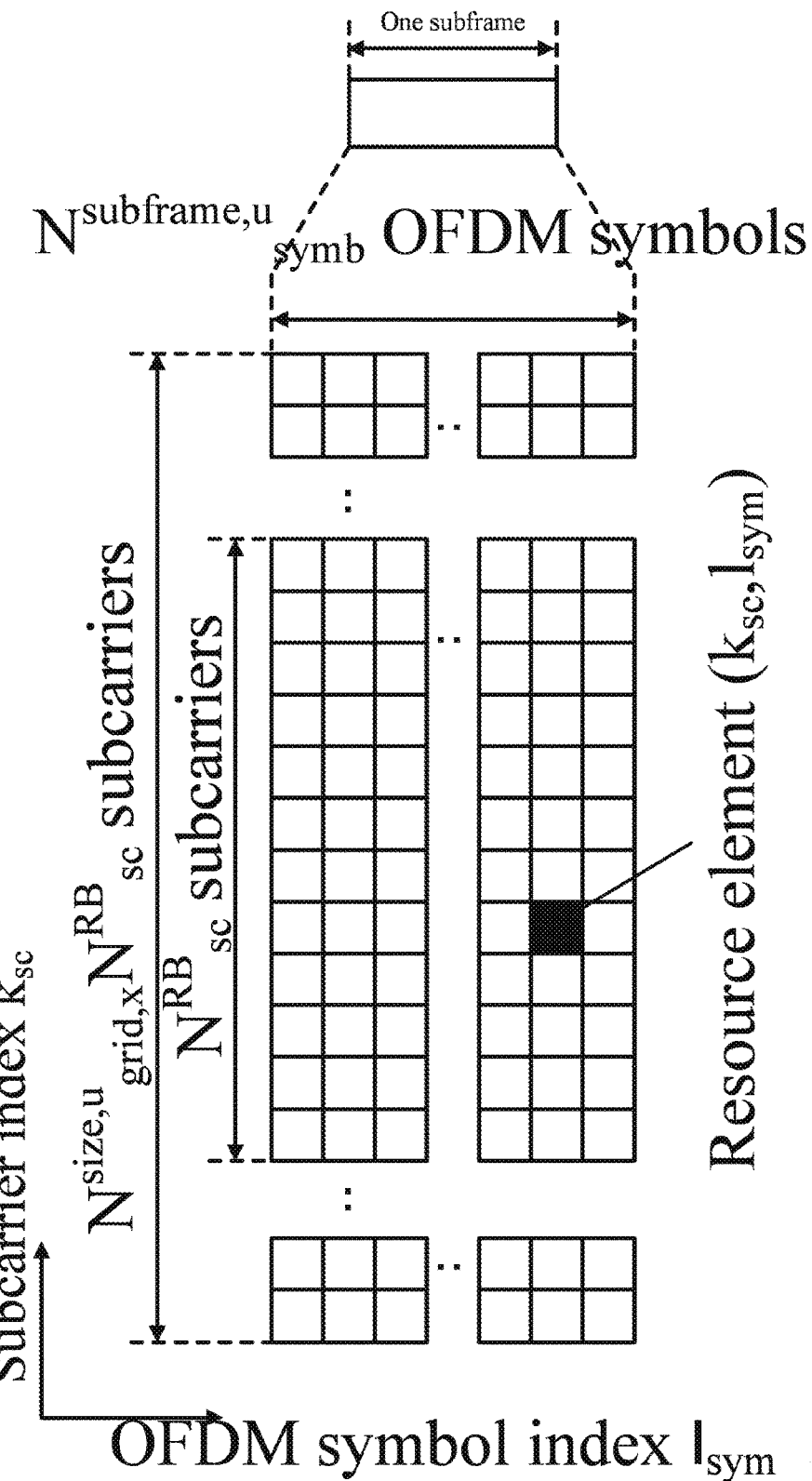
FIG. 4 is a diagram showing a configuration example of a resource grid 3001 according to an aspect of the present embodiment.

FIG. 4 is a diagram showing a configuration example of a resource grid 3001 according to an aspect of the present embodiment. In the resource grid of FIG. 4, the horizontal axis indicates OFDM symbol index $l_{sym}$, and the vertical axis indicates the subcarrier index $k_{sc}$. The resource grid 3001 includes $N^{size,u}_{grid1,x} \times N^{RB}_{sc}$ subcarriers, and includes $N^{subframes,u}_{symb}$ OFDM symbols. A resource specified by the subcarrier index $k_{sc}$ and the OFDM symbol index $l_{sym}$ in a resource grid is also referred to as a resource element (RE).

A resource block (RB) includes $N^{RB}_{sc}$ consecutive subcarriers. A resource block is a generic name of a common resource block, a physical resource block (PRB), and a virtual resource block (VRB). It is $N^{RB}_{sc}=12$.

A resource block unit is a set of resources that corresponds to one OFDM symbol in one resource block. That is, one resource block unit includes 12 resource elements which corresponds to one OFDM symbol in one resource block.

Common resource blocks for a subcarrier-spacing configuration u are indexed in ascending order from 0 in the frequency domain in a common resource block-set. The common resource block with index 0 for the subcarrier-spacing configuration u includes (or collides with, matches) the point 3000. The index $n^u_{CRB}$ of the common resource block with respect to the subcarrier-spacing configuration u satisfies the relationship of $n^u_{CRB}=\text{ceil}$ $(k_{sc}/N^{RB}_{sc})$. The subcarrier with $k_{sc}=0$ is a subcarrier with the same center frequency as the center frequency of the subcarrier which corresponds to the point 3000.

Physical resource blocks for a subcarrier-spacing configuration u are indexed in ascending order from 0 in the frequency domain in a BWP. The index $n^u_{PRB}$ of the physical resource block with respect to the subcarrier-spacing configuration u satisfies the relationship of $n^u_{CRB}=n^u_{PRB}+N^{start,u}_{BWP,i}$. The $N^{start,u}_{BWP,i}$ indicates the reference point of BWP with index i.

A BWP is defined as a subset of common resource blocks included in the resource grid. The BWP includes $N^{size,u}_{BWP,i}$ common resource blocks starting from the reference points $N^{start,u}_{BWP,i}$. A BWP for the downlink component carrier is also referred to as a downlink BWP. A BWP for the uplink component carrier is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. For example, the symbols may correspond to OFDM symbols. For example, the symbols may correspond to resource block units. For example, the symbols may correspond to resource elements.

Two antenna ports are said to be QCL (Quasi Co-Located) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Carrier aggregation may be communication using a plurality of aggregated serving cells. Carrier aggregation may be communication using a plurality of aggregated component carriers. Carrier aggregation may be communication using a plurality of aggregated downlink component carriers. Carrier aggregation may be communication using a plurality of aggregated uplink component carriers.

Figure 5:
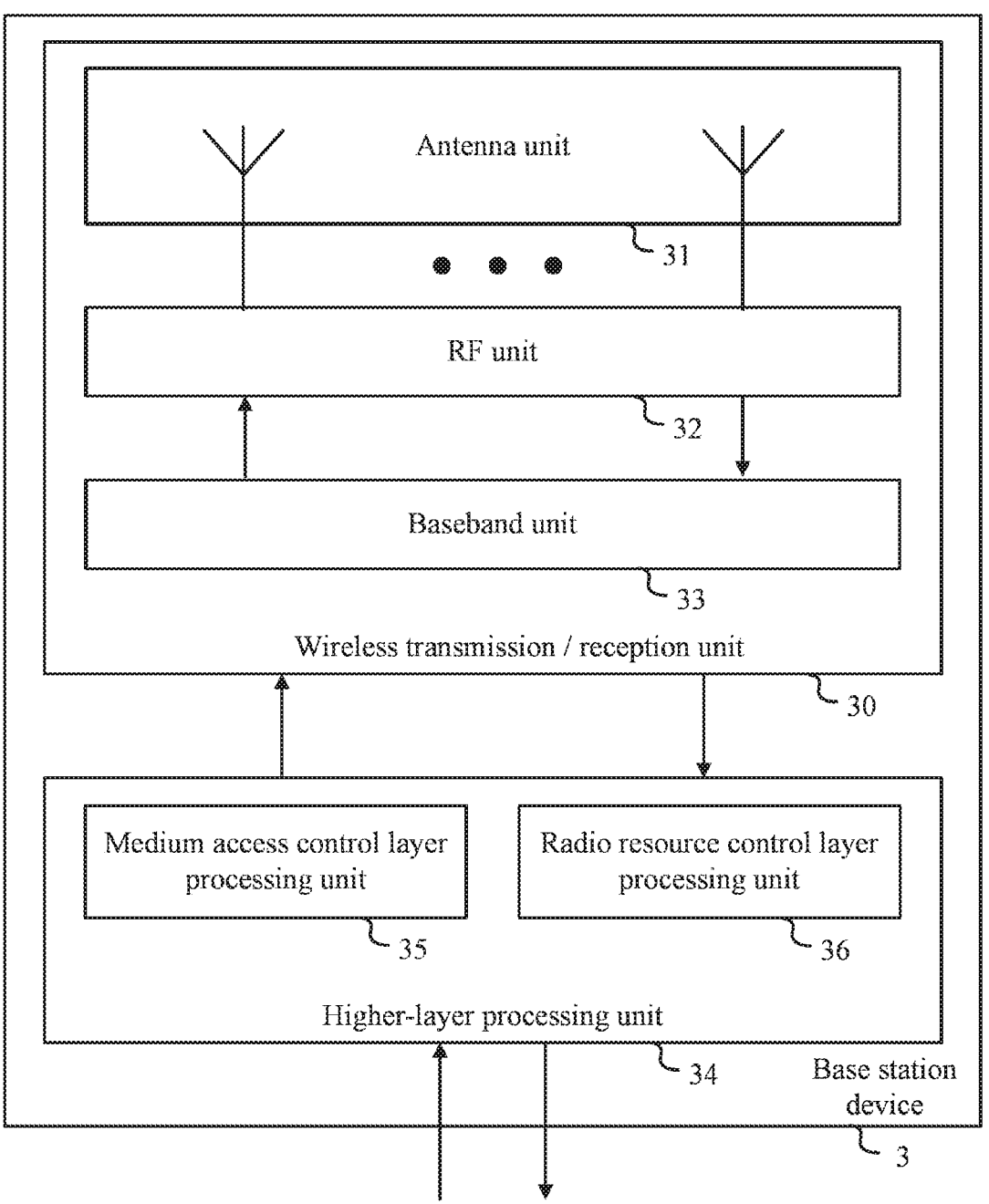
FIG. 5 is a schematic block diagram showing a configuration example of the base station device 3 according to an aspect of the present embodiment.

FIG. 5 is a schematic block diagram showing a configuration example of the base station device 3 according to an aspect of the present embodiment. As shown in FIG. 5, the base station device 3 includes at least a part or all of the wireless transmission/reception unit (physical layer processing unit) 30 and the higher-layer processing unit 34. The wireless transmission/reception unit 30 includes at least a part or all of the antenna unit 31, the RF unit 32 (Radio Frequency unit 32), and the baseband unit 33. The higher-layer processing unit 34 includes at least a part or all of the medium access control layer processing unit 35 and the radio resource control (RRC) layer processing unit 36.

The wireless transmission/reception unit 30 includes at least a part of or all of a wireless transmission unit 30a and a wireless reception unit 30b. The configuration of the baseband unit 33 included in the wireless transmission unit 30a and the configuration of the baseband unit 33 included in the wireless reception unit 30b may be the same or different. The configuration of the RF unit 32 included in the wireless transmission unit 30a and the configuration of the RF unit 32 included in the wireless reception unit 30b may be the same or different. The configuration of the antenna unit 31 included in the wireless transmission unit 30a and the configuration of the antenna unit 31 included in the wireless reception unit 30b may be the same or different.

The higher-layer processing unit 34 provides downlink data (a transport block) to the wireless transmission/reception unit 30 (or the wireless transmission unit 30a). The higher-layer processing unit 34 performs processing of a medium access control (MAC) layer, a packet data convergence protocol layer (PDCP layer), a radio link control layer (RLC layer) and/or an RRC layer.

The medium access control layer processing unit 35 included in the higher-layer processing unit 34 performs processing of the MAC layer.

The radio resource control layer processing unit 36 included in the higher-layer processing unit 34 performs the process of the RRC layer. The radio resource control layer processing unit 36 manages various configuration information/parameters (RRC parameters) of the terminal device 1. The radio resource control layer processing unit 36 configures an RRC parameter based on the RRC message received from the terminal device 1.

The wireless transmission/reception unit 30 (or the wireless transmission unit 30a) performs processing such as encoding and modulation. The wireless transmission/reception unit 30 (or the wireless transmission unit 30a) generates a physical signal by encoding and modulating the downlink data. The wireless transmission/reception unit 30 (or the wireless transmission unit 30a) converts OFDM symbols in the physical signal to a baseband signal by conversion to a time-continuous signal. The wireless transmission/reception unit 30 (or the wireless transmission unit 30a) transmits the baseband signal (or the physical signal) to the terminal device 1 via radio frequency. The wireless transmission/reception unit 30 (or the wireless transmission unit 30a) may arrange the baseband signal (or the physical signal) on a component carrier and transmit the baseband signal (or the physical signal) to the terminal device 1.

The wireless transmission/reception unit 30 (or the wireless reception unit 30b) performs processing such as demodulation and decoding. The wireless transmission/reception unit 30 (or the wireless reception unit 30b) separates, demodulates and decodes the received physical signal, and provides the decoded information to the higher-layer processing unit 34. The wireless transmission/reception unit 30 (or the wireless reception unit 30b) may perform the channel access procedure prior to the transmission of the physical signal.

The RF unit 32 demodulates the physical signal received via the antenna unit 31 into a baseband signal (down convert), and/or removes extra frequency components. The RF unit 32 provides the processed analog signal to the baseband unit 33.

The baseband unit 33 converts an analog signal (signals on radio frequency) input from the RF unit 32 into a digital signal (a baseband signal). The baseband unit 33 separates a portion which corresponds to CP (Cyclic Prefix) from the digital signal. The baseband unit 33 performs Fast Fourier Transformation (FFT) on the digital signal from which the CP has been removed. The baseband unit 33 provides the physical signal in the frequency domain.

The baseband unit 33 performs Inverse Fast Fourier Transformation (IFFT) on downlink data to generate an OFDM symbol, adds a CP to the generated OFDM symbol, generates a digital signal (baseband signal), and convert the digital signal into an analog signal. The baseband unit 33 provides the analog signal to the RF unit 32.

The RF unit 32 removes extra frequency components from the analog signal (signals on radio frequency) input from the baseband unit 33, up-converts the analog signal to a radio frequency and transmits it via the antenna unit 31. The RF unit 32 may have a function of controlling transmission power. The RF unit 32 is also referred to as a transmission power control unit.

At least one or more serving cells (or one or more component carriers, one or more downlink component carriers, one or more uplink component carriers) may be configured for the terminal device 1.

Each of the serving cells set for the terminal device 1 may be any of PCell (Primary cell), PSCell (Primary SCG cell), and SCell (Secondary Cell).

A PCell is a serving cell included in a MCG (Master Cell Group). A PCell is a cell (implemented cell) which performs an initial connection establishment procedure or a connection re-establishment procedure by the terminal device 1.

A PSCell is a serving cell included in a SCG (Secondary Cell Group). A PSCell is a serving cell in which random-access is performed by the terminal device 1 in a reconfiguration procedure with synchronization (Reconfiguration with synchronization).

A SCell may be included in either a MCG or a SCG.

The serving cell group (cell group) is a designation including at least MCG and SCG. The serving cell group may include one or more serving cells (or one or more component carriers). One or more serving cells (or one or more component carriers) included in the serving cell group may be operated by carrier aggregation.

One or more downlink BWPs may be configured for each serving cell (or each downlink component carrier). One or more uplink BWPs may be configured for each serving cell (or each uplink component carrier).

Among the one or more downlink BWPs set for the serving cell (or the downlink component carrier), one downlink BWP may be set as an active downlink BWP (or one downlink BWP may be activated). Among the one or more uplink BWPs set for the serving cell (or the uplink component carrier), one uplink BWP may be set as an active uplink BWP (or one uplink BWP may be activated).

A PDSCH, a PDCCH, and a CSI-RS may be received in the active downlink BWP.

The terminal device 1 may receive the PDSCH, the PDCCH, and the CSI-RS in the active downlink BWP. A PUCCH and a PUSCH may be sent on the active uplink BWP. The terminal device 1 may transmit the PUCCH and the PUSCH in the active uplink BWP. The active downlink BWP and the active uplink BWP are also referred to as active BWP.

The PDSCH, the PDCCH, and the CSI-RS may not be received in downlink BWPs (inactive downlink BWPs) other than the active downlink BWP. The terminal device 1 may not receive the PDSCH, the PDCCH, and the CSI-RS in the downlink BWPs which are other than the active downlink BWP. The PUCCH and the PUSCH do not need to be transmitted in uplink BWPs (inactive uplink BWPs) other than the active uplink BWP. The terminal device 1 may not transmit the PUCCH and the PUSCH in the uplink BWPs which is other than the active uplink BWP. The inactive downlink BWP and the inactive uplink BWP are also referred to as inactive BWP.

Downlink BWP switching deactivates an active downlink BWP and activates one of inactive downlink BWPs which are other than the active downlink BWP. The downlink BWP switching may be controlled by a BWP field included in a downlink control information. The downlink BWP switching may be controlled based on higher-layer parameters.

Uplink BWP switching is used to deactivate an active uplink BWP and activate any inactive uplink BWP which is other than the active uplink BWP. Uplink BWP switching may be controlled by a BWP field included in a downlink control information. The uplink BWP switching may be controlled based on higher-layer parameters.

Among the one or more downlink BWPs set for the serving cell, two or more downlink BWPs may not be set as active downlink BWPs. For the serving cell, one downlink BWP may be active at a certain time.

Among the one or more uplink BWPs set for the serving cell, two or more uplink BWPs may not be set as active uplink BWPs. For the serving cell, one uplink BWP may be active at a certain time.

Figure 6:
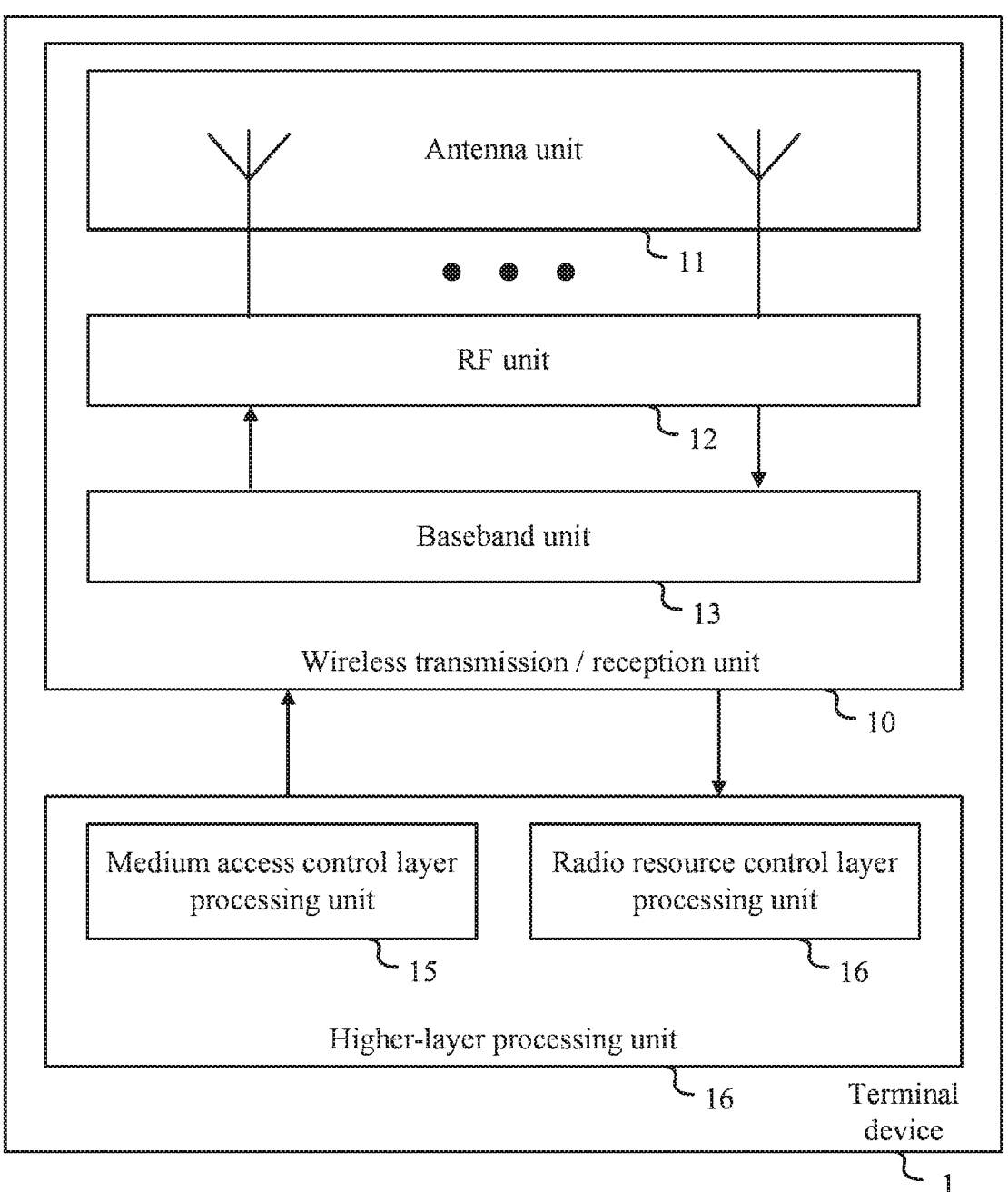
FIG. 6 is a schematic block diagram showing a configuration example of the terminal device 1 according to an aspect of the present embodiment.

FIG. 6 is a schematic block diagram showing a configuration example of the terminal device 1 according to an aspect of the present embodiment. As shown in FIG. 6, the terminal device 1 includes at least a part or all of the wireless transmission/reception unit (physical layer processing unit) 10 and the higher-layer processing unit 14. The wireless transmission/reception unit 10 includes at least a part or all of the antenna unit 11, the RF unit 12, and the baseband unit 13. The higher-layer processing unit 14 includes at least a part or all of the medium access control layer processing unit 15 and the radio resource control layer processing unit 16.

The wireless transmission/reception unit 10 includes at least a part of or all of a wireless transmission unit 10a and a wireless reception unit 10b. The configuration of the baseband unit 13 included in the wireless transmission unit 10a and the configuration of the baseband unit 13 included in the wireless reception unit 10b may be the same or different. The configuration of the RF unit 12 included in the wireless transmission unit 10a and the RF unit 12 included in the wireless reception unit 10b may be the same or different. The configuration of the antenna unit 11 included in the wireless transmission unit 10a and the configuration of the antenna unit 11 included in the wireless reception unit 10*b* may be the same or different.

The higher-layer processing unit 14 provides uplink data (a transport block) to the wireless transmission/reception unit 10 (or the wireless transmission unit 10*a*). The higher-layer processing unit 14 performs processing of a MAC layer, a packet data integration protocol layer, a radio link control layer, and/or an RRC layer.

The medium access control layer processing unit 15 included in the higher-layer processing unit 14 performs processing of the MAC layer.

The radio resource control layer processing unit 16 included in the higher-layer processing unit 14 performs the process of the RRC layer. The radio resource control layer processing unit 16 manages various configuration information/parameters (RRC parameters) of the terminal device 1. The radio resource control layer processing unit 16 configures RRC parameters based on the RRC message received from the base station device 3.

The wireless transmission/reception unit 10 (or the wireless transmission unit 10*a*) performs processing such as encoding and modulation. The wireless transmission/reception unit 10 (or the wireless transmission unit 10*a*) generates a physical signal by encoding and modulating the uplink data. The wireless transmission/reception unit 10 (or the wireless transmission unit 10*a*) converts OFDM symbols in the physical signal to a baseband signal by conversion to a time-continuous signal. The wireless transmission/reception unit 10 (or the wireless transmission unit 10*a*) transmits the baseband signal (or the physical signal) to the base station device 3 via radio frequency. The wireless transmission/reception unit 10 (or the wireless transmission unit 10*a*) may arrange the baseband signal (or the physical signal) on a BWP (active uplink BWP) and transmit the baseband signal (or the physical signal) to the base station device 3.

The wireless transmission/reception unit 10 (or the wireless reception unit 10*b*) performs processing such as demodulation and decoding. The wireless transmission/reception unit 10 (or the wireless reception unit 10*b*) may receive a physical signal in a BWP (active downlink BWP) of a serving cell. The wireless transmission/reception unit 10 (or the wireless reception unit 10*b*) separates, demodulates and decodes the received physical signal, and provides the decoded information to the higher-layer processing unit 14. The wireless transmission/reception unit 10 (or the wireless reception unit 10*b*) may perform the channel access procedure prior to the transmission of the physical signal.

The RF unit 12 demodulates the physical signal received via the antenna unit 11 into a baseband signal (down convert), and/or removes extra frequency components. The RF unit 12 provides the processed analog signal to the baseband unit 13.

The baseband unit 13 converts an analog signal (signals on radio frequency) input from the RF unit 12 into a digital signal (a baseband signal). The baseband unit 13 separates a portion which corresponds to CP from the digital signal, performs fast Fourier transformation on the digital signal from which the CP has been removed, and provides the physical signal in the frequency domain.

The baseband unit 13 performs inverse fast Fourier transformation on uplink data to generate an OFDM symbol, adds a CP to the generated OFDM symbol, generates a digital signal (baseband signal), and convert the digital signal into an analog signal. The baseband unit 13 provides the analog signal to the RF unit 12.

The RF unit 12 removes extra frequency components from the analog signal (signals on radio frequency) input from the baseband unit 13, up-converts the analog signal to a radio frequency, and transmits it via the antenna unit 11 The RF unit 12 may have a function of controlling transmission power. The RF unit 12 is also referred to as a transmission power control unit.

Hereinafter, physical signals (signals) will be described.

Physical signal is a generic term for downlink physical channels, downlink physical signals, uplink physical channels, and uplink physical channels. The physical channel is a generic term for downlink physical channels and uplink physical channels.

An uplink physical channel may correspond to a set of resource elements that carry information originating from the higher-layer and/or uplink control information. The uplink physical channel may be a physical channel used in an uplink component carrier. The uplink physical channel may be transmitted by the terminal device 1. The uplink physical channel may be received by the base station device 3. In the wireless communication system according to one aspect of the present embodiment, at least part or all of PUCCH (Physical Uplink Control CHannel), PUSCH (Physical Uplink Shared CHannel), and PRACH (Physical Random Access CHannel) may be used.

A PUCCH may be used to transmit uplink control information (UCI). The PUCCH may be sent to deliver (transmission, convey) uplink control information. The uplink control information may be mapped to (or arranged in) the PUCCH. The terminal device 1 may transmit PUCCH in which uplink control information is arranged. The base station device 3 may receive the PUCCH in which the uplink control information is arranged.

Uplink control information (uplink control information bit, uplink control information sequence, uplink control information type) includes at least part or all of channel state information (CSI), scheduling request (SR), and HARQ-ACK (Hybrid Automatic Repeat request ACKnowledgement).

Channel state information is conveyed by using channel state information bits or a channel state information sequence. Scheduling request is also referred to as a scheduling request bit or a scheduling request sequence. HARQ-ACK information is also referred to as a HARQ-ACK information bit or a HARQ-ACK information sequence.

HARQ-ACK information may include HARQ-ACK status which corresponds to a transport block (TB: Transport block, MAC PDU: Medium Access Control Protocol Data Unit, DL-SCH: Downlink-Shared Channel, UL-SCH: Uplink-Shared Channel, PDSCH: Physical Downlink Shared CHannel, PUSCH: Physical Uplink Shared CHannel). The HARQ-ACK status may indicate ACK (acknowledgement) or NACK (negative-acknowledgement) corresponding to the transport block. The ACK may indicate that the transport block has been successfully decoded. The NACK may indicate that the transport block has not been successfully decoded. The HARQ-ACK information may include a HARQ-ACK codebook that includes one or more HARQ-ACK status (or HARQ-ACK bits).

For example, the correspondence between the HARQ-ACK information and the transport block may mean that the HARQ-ACK information and the PDSCH used for transmission of the transport block correspond.

HARQ-ACK status may indicate ACK or NACK which correspond to one CBG (Code Block Group) included in the transport block.

The scheduling request may at least be used to request PUSCH (or UL-SCH) resources for new transmission. The scheduling request may be used to indicate either a positive SR or a negative SR. The fact that the scheduling request indicates a positive SR is also referred to as "a positive SR is sent". The positive SR may indicate that the PUSCH (or UL-SCH) resource for initial transmission is requested by the terminal device 1. A positive SR may indicate that a higher-layer is to trigger a scheduling request. The positive SR may be sent when the higher-layer instructs to send a scheduling request. The fact that the scheduling request bit indicates a negative SR is also referred to as "a negative SR is sent". A negative SR may indicate that the PUSCH (or UL-SCH) resource for initial transmission is not requested by the terminal device 1. A negative SR may indicate that the higher-layer does not trigger a scheduling request. A negative SR may be sent if the higher-layer is not instructed to send a scheduling request.

The channel state information may include at least part or all of a channel quality indicator (CQI), a precoder matrix indicator (PMI), and a rank indicator (RI). CQI is an indicator related to channel quality (e.g., propagation quality) or physical channel quality, and PMI is an indicator related to a precoder. RI is an indicator related to transmission rank (or the number of transmission layers).

Channel state information may be provided at least based on receiving one or more physical signals (e.g., one or more CSI-RSs) used at least for channel measurement. The channel state information may be selected by the terminal device 1 at least based on receiving one or more physical signals used for channel measurement. Channel measurements may include interference measurements.

A PUCCH may correspond to a PUCCH format. A PUCCH may be a set of resource elements used to convey a PUCCH format. A PUCCH may include a PUCCH format. A PUCCH format may include UCI.

A PUSCH may be used to transmit uplink data (a transport block) and/or uplink control information. A PUSCH may be used to transmit uplink data (a transport block) corresponding to a UL-SCH and/or uplink control information. A PUSCH may be used to convey uplink data (a transport block) and/or uplink control information. A PUSCH may be used to convey uplink data (a transport block) corresponding to a UL-SCH and/or uplink control information. Uplink data (a transport block) may be arranged in a PUSCH. Uplink data (a transport block) corresponding to UL-SCH may be arranged in a PUSCH. Uplink control information may be arranged to a PUSCH. The terminal device 1 may transmit a PUSCH in which uplink data (a transport block) and/or uplink control information is arranged. The base station device 3 may receive a PUSCH in which uplink data (a transport block) and/or uplink control information is arranged.

A PRACH may be used to transmit a random-access preamble. The PRACH may be used to convey a random-access preamble. The sequence $x_{u,v}$ (n) of the PRACH is defined by $x_{u,v}(n)=x_u(\mod (n+C_v, L_{RA}))$. The $x_u$ may be a ZC sequence (Zadoff-Chu sequence). The $x_u$ may be defined by $x_u=\exp (-jpui (i+1)/L_{RA})$. The j is an imaginary unit. The p is the circle ratio. The $C_v$ corresponds to cyclic shift of the PRACH. $L_{RA}$ corresponds to the length of the PRACH. The $L_{RA}$ may be 839 or 139 or another value. The i is an integer in the range of 0 to $L_{RA}-1$. The u is a sequence index for the PRACH. The terminal device 1 may transmit the PRACH. The base station device 3 may receive the PRACH.

For a given PRACH opportunity, 64 random-access preambles are defined. The random-access preamble is specified (determined, given) at least based on the cyclic shift $C_v$ of the PRACH and the sequence index u for the PRACH.

An uplink physical signal may correspond to a set of resource elements. The uplink physical signal may not carry information generated in the higher-layer. The uplink physical signal may be a physical signal used in the uplink component carrier. The terminal device 1 may transmit an uplink physical signal. The base station device 3 may receive the uplink physical signal. In the radio communication system according to one aspect of the present embodiment, at least a part or all of UL DMRS (UpLink Demodulation Reference Signal), SRS (Sounding Reference Signal), UL PTRS (UpLink Phase Tracking Reference Signal) may be used.

UL DMRS is a generic name of a DMRS for a PUSCH and a DMRS for a PUCCH.

A set of antenna ports of a DMRS for a PUSCH (a DMRS associated with a PUSCH, a DMRS included in a PUSCH, a DMRS which corresponds to a PUSCH) may be given based on a set of antenna ports for the PUSCH. That is, the set of DMRS antenna ports for the PUSCH may be the same as the set of antenna ports for the PUSCH.

Transmission of a PUSCH and transmission of a DMRS for the PUSCH may be indicated (or scheduled) by one DCI format. The PUSCH and the DMRS for the PUSCH may be collectively referred to as a PUSCH. Transmission of the PUSCH may be transmission of the PUSCH and the DMRS for the PUSCH.

A PUSCH may be estimated from a DMRS for the PUSCH. That is, propagation path of the PUSCH may be estimated from the DMRS for the PUSCH.

A set of antenna ports of a DMRS for a PUCCH (a DMRS associated with a PUCCH, a DMRS included in a PUCCH, a DMRS which corresponds to a PUCCH) may be identical to a set of antenna ports for the PUCCH.

Transmission of a PUCCH and transmission of a DMRS for the PUCCH may be indicated (or triggered) by one DCI format. The arrangement of the PUCCH in resource elements (resource element mapping) and/or the arrangement of the DMRS in resource elements for the PUCCH may be provided at least by one PUCCH format. The PUCCH and the DMRS for the PUCCH may be collectively referred to as PUCCH. Transmission of the PUCCH may be transmission of the PUCCH and the DMRS for the PUCCH.

A PUCCH may be estimated from a DMRS for the PUCCH. That is, propagation path of the PUCCH may be estimated from the DMRS for the PUCCH.

A downlink physical channel may correspond to a set of resource elements that carry information originating from the higher-layer and/or downlink control information. The downlink physical channel may be a physical channel used in the downlink component carrier. The base station device 3 may transmit the downlink physical channel. The terminal device 1 may receive the downlink physical channel. In the wireless communication system according to one aspect of the present embodiment, at least a part or all of PBCH (Physical Broadcast Channel), PDCCH (Physical Downlink Control Channel), and PDSCH (Physical Downlink Shared Channel) may be used.

The PBCH may be used to transmit a MIB (Master Information Block) and/or physical layer control information. The physical layer control information is a kind of downlink control information. The PBCH may be sent to deliver the MIB and/or the physical layer control information. A BCH may be mapped (or corresponding) to the PBCH. The terminal device 1 may receive the PBCH. The base station device 3 may transmit the PBCH. The physical layer control information is also referred to as a PBCH payload and a PBCH payload related to timing. The MIB may include one or more higher-layer parameters.

Physical layer control information includes 8 bits. The physical layer control information may include at least part or all of 0A to 0D. The 0A is radio frame information. The 0B is half radio frame information (half system frame information). The 0C is SS/PBCH block index information. The 0D is subcarrier offset information.

The radio frame information is used to indicate a radio frame in which the PBCH is transmitted (a radio frame including a slot in which the PBCH is transmitted). The radio frame information is represented by 4 bits. The radio frame information may be represented by 4 bits of a radio frame indicator. The radio frame indicator may include 10 bits. For example, the radio frame indicator may at least be used to identify a radio frame from index 0 to index 1023.

The half radio frame information is used to indicate whether the PBCH is transmitted in first five subframes or in second five subframes among radio frames in which the PBCH is transmitted. Here, the half radio frame may be configured to include five subframes. The half radio frame may be configured by five subframes of the first half of ten subframes included in the radio frame. The half radio frame may be configured by five subframes in the second half of ten subframes included in the radio frame.

The SS/PBCH block index information is used to indicate an SS/PBCH block index. The SS/PBCH block index information may be represented by 3 bits. The SS/PBCH block index information may consist of 3 bits of an SS/PBCH block index indicator. The SS/PBCH block index indicator may include 6 bits. The SS/PBCH block index indicator may at least be used to identify an SS/PBCH block from index 0 to index 63 (or from index 0 to index 3, from index 0 to index 7, from index 0 to index 9, from index 0 to index 19, etc.).

The subcarrier offset information is used to indicate subcarrier offset. The subcarrier offset information may be used to indicate the difference between the first subcarrier in which the PBCH is arranged and the first subcarrier in which the control resource set with index 0 is arranged.

A PDCCH may be used to transmit downlink control information (DCI). A PDCCH may be transmitted to deliver downlink control information. Downlink control information may be mapped to a PDCCH. The terminal device 1 may receive a PDCCH in which downlink control information is arranged. The base station device 3 may transmit the PDCCH in which the downlink control information is arranged.

Downlink control information may correspond to a DCI format. Downlink control information may be included in a DCI format. Downlink control information may be arranged in each field of a DCI format.

DCI format is a generic name for DCI format 00, DCI format 0_1, DCI format 1_0, and DCI format 1_1. Uplink DCI format is a generic name of the DCI format 0_0 and the DCI format 0_1. Downlink DCI format is a generic name of the DCI format 1_0 and the DCI format 1_1.

The DCI format 0_0 is at least used for scheduling a PUSCH for a cell (or a PUSCH arranged on a cell). The DCI format 0_0 includes at least a part or all of fields 1A to 1E. The 1A is a DCI format identification field (Identifier field for DCI formats). The 1B is a frequency domain resource assignment field (FDRA field, FDRA information field). The 1C is a time domain resource assignment field (TDRA field, TDRA information field). The 1D is a frequency-hopping flag field. The 1E is an MCS field (Modulation-and-Coding-Scheme field).

Frequency domain resource assignment field may be referred to as FDRA field or FDRA information field.

Time domain resource assignment field may be referred to as TDRA field or TDRA information field.

The DCI format identification field may indicate whether the DCI format including the DCI format identification field is an uplink DCI format or a downlink DCI format. The DCI format identification field included in the DCI format 00 may indicate 0 (or may indicate that the DCI format 0_0 is an uplink DCI format).

The frequency domain resource assignment field included in the DCI format 0_0 may be at least used to indicate the assignment (allocation) of frequency resources for a PUSCH. The frequency domain resource assignment field included in the DCI format 0_0 may be at least used to indicate the assignment (allocation) of frequency resources for a PUSCH scheduled by the DCI format 0_0.

The time domain resource assignment field included in the DCI format 0_0 may be at least used to indicate the assignment of time resources for a PUSCH. The time domain resource assignment field included in the DCI format 00 may be at least used to indicate the assignment of time resources for a PUSCH scheduled by the DCI format 0_0.

The frequency-hopping flag field may be at least used to indicate whether frequency-hopping is applied to a PUSCH. The frequency-hopping flag field may be at least used to indicate whether frequency-hopping is applied to a PUSCH scheduled by the DCI format 0_0.

The MCS field included in the DCI format 00 may be at least used to indicate a modulation scheme for a PUSCH and/or a part or all of a target coding rate for the PUSCH. The MCS field included in the DCI format 00 may be at least used to indicate a modulation scheme for a PUSCH scheduled by the DCI format 0_0 and/or a part or all of a target coding rate for the PUSCH. A size of a transport block (TBS: Transport Block Size) of a PUSCH may be given based at least on a target coding rate and a part or all of a modulation scheme for the PUSCH. The modulation scheme may include at least one of modulation order, target code rate and spectral efficiency.

The DCI format 0_0 may not include fields used for a CSI request. That is, CSI may not be requested by the DCI format 0_0.

The DCI format 0_0 may not include a carrier indicator field. An uplink component carrier on which a PUSCH scheduled by the DCI format 0_0 is arranged may be the same as an uplink component carrier on which a PDCCH including the DCI format 00 is arranged.

The DCI format 0_0 may not include a BWP field. An uplink BWP on which a PUSCH scheduled by the DCI format 0_0 is arranged may be the same as an uplink BWP on which a PDCCH including the DCI format 00 is arranged.

The DCI format 0_1 is at least used for scheduling of a PUSCH for a cell (or arranged on a cell). The DCI format 0_1 includes at least a part or all of fields 2A to 2H. The 2A is a DCI format identification field. The 2B is a frequency domain resource assignment field. The 2C is a time domain resource assignment field. The 2D is a frequency-hopping flag field. The 2E is an MCS field. The 2F is a CSI request field. The 2G is a BWP field. The 2H is a carrier indicator field.

The DCI format identification field included in the DCI format 0_1 may indicate 0 (or may indicate that the DCI format 0_1 is an uplink DCI format).

The frequency domain resource assignment field included in the DCI format 0_1 may be at least used to indicate the assignment of frequency resources for a PUSCH. The frequency domain resource assignment field included in the DCI format 0_1 may be at least used to indicate the assignment of frequency resources for a PUSCH scheduled by the DCI format.

The time domain resource assignment field included in the DCI format 0_1 may be at least used to indicate the assignment of time resources for a PUSCH. The time domain resource assignment field included in DCI format 0_1 may be at least used to indicate the assignment of time resources for a PUSCH scheduled by the DCI format 0_1.

The frequency-hopping flag field may be at least used to indicate whether frequency-hopping is applied to a PUSCH scheduled by the DCI format 0_1.

The MCS field included in the DCI format 01 may be at least used to indicate a modulation scheme for a PUSCH and/or a part or all of a target coding rate for the PUSCH. The MCS field included in the DCI format 01 may be at least used to indicate a modulation scheme for a PUSCH scheduled by the DCI format and/or part or all of a target coding rate for the PUSCH.

When the DCI format 0_1 includes the BWP field, the BWP field may be used to indicate an uplink BWP on which a PUSCH scheduled by the DCI format 0_1 is arranged. When the DCI format 0_1 does not include the BWP field, an uplink BWP on which a PUSCH is arranged may be the active uplink BWP. When the number of uplink BWPs configured in the terminal device 1 in an uplink component carrier is two or more, the number of bits for the BWP field included in the DCI format 0_1 used for scheduling a PUSCH arranged on the uplink component carrier may be one or more. When the number of uplink BWPs configured in the terminal device 1 in a uplink component carrier is one, the number of bits for the BWP field included in the DCI format 0_1 used for scheduling a PUSCH arranged on the uplink component carrier may be zero.

The CSI request field is at least used to indicate CSI reporting.

If the DCI format 0_1 includes the carrier indicator field, the carrier indicator field may be used to indicate an uplink component carrier (or a serving cell) on which a PUSCH is arranged. When the DCI format 0_1 does not include the carrier indicator field, a serving cell on which a PUSCH is arranged may be the same as the serving cell on which a PDCCH including the DCI format 0_1 used for scheduling of the PUSCH is arranged. When the number of uplink component carriers (or the number of serving cells) configured in the terminal device 1 in a serving cell group is two or more (when uplink carrier aggregation is operated in a serving cell group), or when cross-carrier scheduling is configured for the serving cell group, the number of bits for the carrier indicator field included in the DCI format 0_1 used for scheduling a PUSCH arranged on the serving cell group may be one or more (e.g., 3). When the number of uplink component carriers (or the number of serving cells) configured in the terminal device 1 in a serving cell group is one (or when uplink carrier aggregation is not operated in a serving cell group), or when the cross-carrier scheduling is not configured for the serving cell group, the number of bits for the carrier indicator field included in the DCI format 0_1 used for scheduling of a PUSCH arranged on the serving cell group may be zero.

The DCI format 1_0 is at least used for scheduling of a PDSCH for a cell (arranged on a cell). The DCI format 1_0 includes at least a part or all of fields 3A to 3F. The 3A is a DCI format identification field. The 3B is a frequency domain resource assignment field. The 3C is a time domain resource assignment field. The 3D is an MCS field. The 3E is a PDSCH-to-HARQ-feedback indicator field. The 3F is a PUCCH resource indicator field.

The DCI format identification field included in the DCI format 1_0 may indicate 1 (or may indicate that the DCI format 1_0 is a downlink DCI format).

The frequency domain resource assignment field included in the DCI format 1_0 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_0.

The time domain resource assignment field included in the DCI format 1_0 may be at least used to indicate the assignment of time resources for a PDSCH. The time domain resource assignment field included in the DCI format 10 may be at least used to indicate the assignment of time resources for a PDSCH scheduled by the DCI format 1_0.

The MCS field included in the DCI format 10 may be at least used to indicate a modulation scheme for a PDSCH and/or a part or all of a target coding rate for the PDSCH. The MCS field included in the DCI format 10 may be at least used to indicate a modulation scheme for a PDSCH scheduled by the DCI format 1_0 and/or a part or all of a target coding rate for the PDSCH. A size of a transport block (TBS: Transport Block Size) of a PDSCH may be given based at least on a target coding rate and a part or all of a modulation scheme for the PDSCH.

The PDSCH-to-HARQ-feedback timing indicator field may be at least used to indicate the offset (K1) from a slot in which the last OFDM symbol of a PDSCH scheduled by the DCI format 1_0 is included to another slot in which the first OFDM symbol of a PUCCH triggered by the DCI format 1_0 is included.

The PUCCH resource indicator field may be a field indicating an index of any one or more PUCCH resources included in the PUCCH resource set for a PUCCH transmission. The PUCCH resource set may include one or more PUCCH resources. The PUCCH resource indicator field may trigger PUCCH transmission with a PUCCH resource indicated at least based on the PUCCH resource indicator field.

The DCI format 1_0 may not include the carrier indicator field. A downlink component carrier on which a PDSCH scheduled by the DCI format 1_0 is arranged may be the same as a downlink component carrier on which a PDCCH including the DCI format 1_0 is arranged.

The DCI format 1_0 may not include the BWP field. A downlink BWP on which a PDSCH scheduled by a DCI format 1_0 is arranged may be the same as a downlink BWP on which a PDCCH including the DCI format 10 is arranged.

The DCI format 1_1 is at least used for scheduling of a PDSCH for a cell (or arranged on a cell). The DCI format 1_1 includes at least a part or all of fields 4A to 4H. The 4A is a DCI format identification field. The 4B is a frequency domain resource assignment field. The 4C is a time domain resource assignment field. The 4D is an MCS field. The 4E is a PDSCH-to-HARQ-feedback indicator field. The 4F is a PUCCH resource indicator field. The 4G is a BWP field. The 4H is a carrier indicator field.

The DCI format identification field included in the DCI format 1_1 may indicate 1 (or may indicate that the DCI format 1_1 is a downlink DCI format).

The frequency domain resource assignment field included in the DCI format 1_1 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_1.

The time domain resource assignment field included in the DCI format 1_1 may be at least used to indicate the assignment of time resources for a PDSCH. The time domain resource assignment field included in the DCI format 11 may be at least used to indicate the assignment of time resources for a PDSCH scheduled by the DCI format 1_1.

The MCS field included in the DCI format 11 may be at least used to indicate a modulation scheme for a PDSCH and/or a part or all of a target coding rate for the PDSCH. The MCS field included in the DCI format 11 may be at least used to indicate a modulation scheme for a PDSCH scheduled by the DCI format 1_1 and/or a part or all of a target coding rate for the PDSCH.

When the DCI format 1_1 includes a PDSCH-to-HARQ-feedback timing indicator field, the PDSCH-to-HARQ-feedback timing indicator field indicates an offset (K1) from a slot including the last OFDM symbol of a PDSCH scheduled by the DCI format 1_1 to another slot including the first OFDM symbol of a PUCCH triggered by the DCI format 1_1. When the DCI format 1_1 does not include the PDSCH-to-HARQ-feedback timing indicator field, an offset from a slot in which the last OFDM symbol of a PDSCH scheduled by the DCI format 1_1 is included to another slot in which the first OFDM symbol of a PUCCH triggered by the DCI format 1_1 is identified by a higher-layer parameter.

When the DCI format 1_1 includes the BWP field, the BWP field may be used to indicate a downlink BWP on which a PDSCH scheduled by the DCI format 1_1 is arranged. When the DCI format 1_1 does not include the BWP field, a downlink BWP on which a PDSCH is arranged may be the active downlink BWP. When the number of downlink BWPs configured in the terminal device 1 in a downlink component carrier is two or more, the number of bits for the BWP field included in the DCI format 1_1 used for scheduling a PDSCH arranged on the downlink component carrier may be one or more. When the number of downlink BWPs configured in the terminal device 1 in a downlink component carrier is one, the number of bits for the BWP field included in the DCI format 1_1 used for scheduling a PDSCH arranged on the downlink component carrier may be zero.

If the DCI format 1_1 includes the carrier indicator field, the carrier indicator field may be used to indicate a downlink component carrier (or a serving cell) on which a PDSCH is arranged. When the DCI format 1_1 does not include the carrier indicator field, a downlink component carrier (or a serving cell) on which a PDSCH is arranged may be the same as a downlink component carrier (or a serving cell) on which a PDCCH including the DCI format 1_1 used for scheduling of the PDSCH is arranged. When the number of downlink component carriers (or the number of serving cells) configured in the terminal device 1 in a serving cell group is two or more (when downlink carrier aggregation is operated in a serving cell group), or when cross-carrier scheduling is configured for the serving cell group, the number of bits for the carrier indicator field included in the DCI format 1_1 used for scheduling a PDSCH arranged on the serving cell group may be one or more (e.g., 3). When the number of downlink component carriers (or the number of serving cells) configured in the terminal device 1 in a serving cell group is one (or when downlink carrier aggregation is not operated in a serving cell group), or when the cross-carrier scheduling is not configured for the serving cell group, the number of bits for the carrier indicator field included in the DCI format 1_1 used for scheduling of a PDSCH arranged on the serving cell group may be zero.

A PDSCH may be used to transmit one or more transport blocks. A PDSCH may be used to transmit one or more transport blocks which corresponds to a DL-SCH. A PDSCH may be used to convey one or more transport blocks. A PDSCH may be used to convey one or more transport blocks which corresponds to a DL-SCH. One or more transport blocks may be arranged in a PDSCH. One or more transport blocks which corresponds to a DL-SCH may be arranged in a PDSCH. The base station device 3 may transmit a PDSCH. The terminal device 1 may receive the PDSCH.

Downlink physical signals may correspond to a set of resource elements. The downlink physical signals may not carry the information generated in the higher-layer. The downlink physical signals may be physical signals used in the downlink component carrier. A downlink physical signal may be transmitted by the base station device 3. The downlink physical signal may be transmitted by the terminal device 1. In the wireless communication system according to one aspect of the present embodiment, at least a part or all of an SS (Synchronization signal), DL DMRS (DownLink DeModulation Reference Signal), CSI-RS (Channel State Information-Reference Signal), and DL PTRS (DownLink Phase Tracking Reference Signal) may be used.

The synchronization signal may be used at least for the terminal device 1 to synchronize in the frequency domain and/or time domain for downlink. The synchronization signal is a generic name of PSS (Primary Synchronization Signal) and SSS (Secondary Synchronization Signal).

Figure 7:
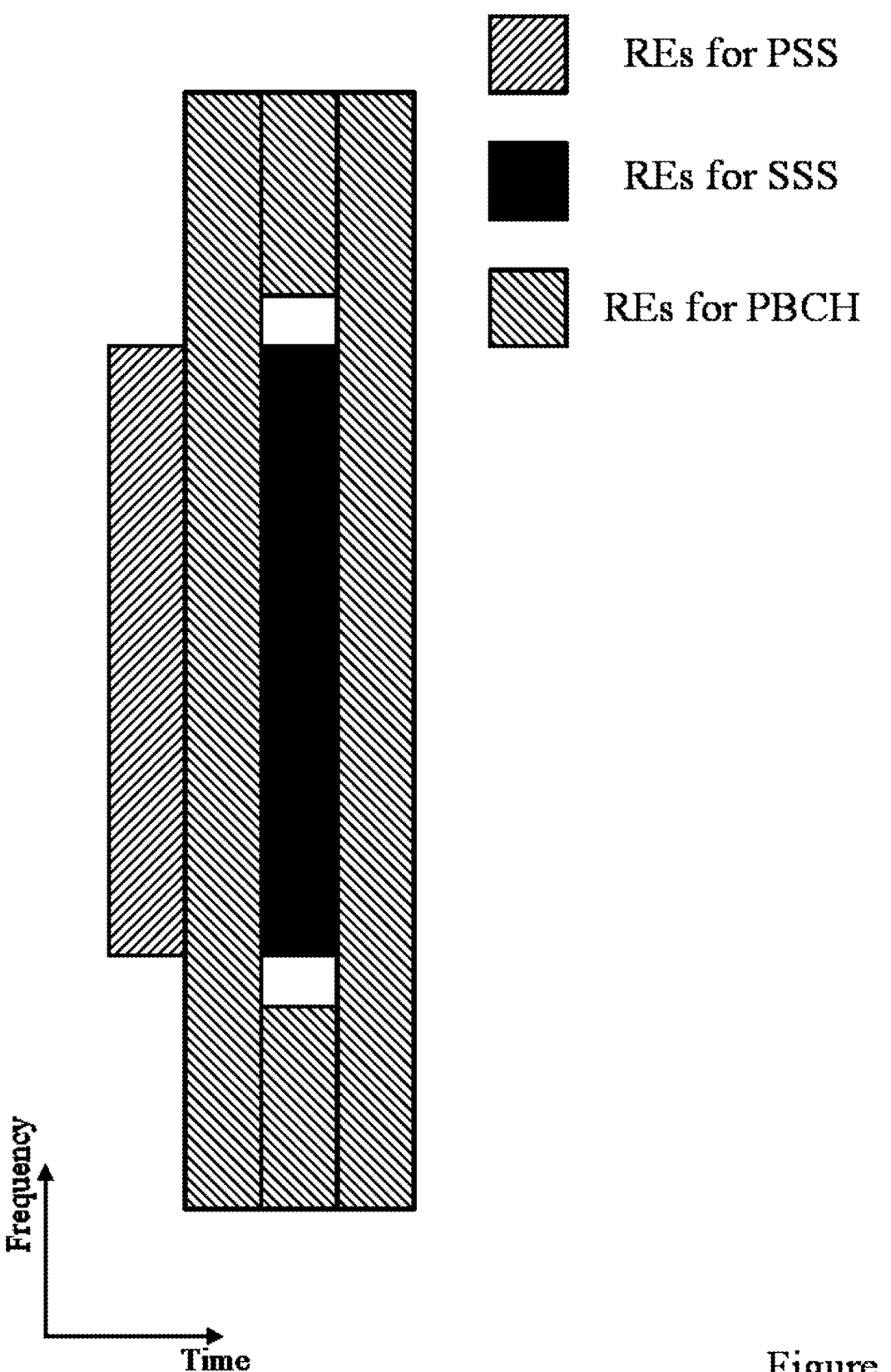
FIG. 7 is a diagram showing a configuration example of an SS/PBCH block according to an aspect of the present embodiment.

FIG. 7 is a diagram showing a configuration example of an SS/PBCH block according to an aspect of the present embodiment. In FIG. 7, the horizontal axis indicates time domain (OFDM symbol index $1_{sym}$), and the vertical axis indicates frequency domain. The shaded blocks indicate a set of resource elements for a PSS. The blocks of grid lines indicate a set of resource elements for an SSS. Also, the blocks in the horizontal line indicate a set of resource elements for a PBCH and a set of resource elements for a DMRS for the PBCH (DMRS related to the PBCH, DMRS included in the PBCH, DMRS which corresponds to the PBCH).

As shown in FIG. 7, the SS/PBCH block includes a PSS, an SSS, and a PBCH. The SS/PBCH block includes 4 consecutive OFDM symbols. The SS/PBCH block includes 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of a PSS, an SSS, a PBCH, and a DMRS for the PBCH in an SS/PBCH block may be identical.

A PBCH may be estimated from a DMRS for the PBCH. For the DM-RS for the PBCH, the channel over which a symbol for the PBCH on an antenna port is conveyed can be inferred from the channel over which another symbol for the DM-RS on the antenna port is conveyed only if the two symbols are within a SS/PBCH block transmitted within the same slot, and with the same SS/PBCH block index.

DL DMRS is a generic name of DMRS for a PBCH, DMRS for a PDSCH, and DMRS for a PDCCH.

A set of antenna ports for a DMRS for a PDSCH (a DMRS associated with a PDSCH, a DMRS included in a PDSCH, a DMRS which corresponds to a PDSCH) may be given based on the set of antenna ports for the PDSCH. The set of antenna ports for the DMRS for the PDSCH may be the same as the set of antenna ports for the PDSCH.

Transmission of a PDSCH and transmission of a DMRS for the PDSCH may be indicated (or scheduled) by one DCI format. The PDSCH and the DMRS for the PDSCH may be collectively referred to as PDSCH. Transmitting a PDSCH may be transmitting a PDSCH and a DMRS for the PDSCH.

A PDSCH may be estimated from a DMRS for the PDSCH. For a DM-RS associated with a PDSCH, the channel over which a symbol for the PDSCH on one antenna port is conveyed can be inferred from the channel over which another symbol for the DM-RS on the antenna port is conveyed only if the two symbols are within the same resource as the scheduled PDSCH, in the same slot, and in the same PRG (Precoding Resource Group).

Antenna ports for a DMRS for a PDCCH (a DMRS associated with a PDCCH, a DMRS included in a PDCCH, a DMRS which corresponds to a PDCCH) may be the same as an antenna port for the PDCCH.

A PDCCH may be estimated from a DMRS for the PDCCH. For a DM-RS associated with a PDCCH, the channel over which a symbol for the PDCCH on one antenna port is conveyed can be inferred from the channel over which another symbol for the DM-RS on the same antenna port is conveyed only if the two symbols are within resources for which the UE may assume the same precoding being used (i.e. within resources in a REG bundle).

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channel used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords and modulation processing is performed for each codeword.

One UL-SCH and one DL-SCH may be provided for each serving cell. BCH may be given to PCell. BCH may not be given to PSCell and SCell.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH may be used to transmit a common RRC message in a plurality of terminal devices 1. The CCCH may be used for the terminal device 1 which is not connected by RRC. The DCCH may be used at least to transmit a dedicated RRC message to the terminal device 1. The DCCH may be used for the terminal device 1 that is in RRC-connected mode.

The RRC message includes one or more RRC parameters (information elements, higher layer parameters). For example, the RRC message may include a MIB. For example, the RRC message may include system information (SIB: System Information Block, MIB). SIB is a generic name for various type of SIBs (e.g., SIB1, SIB2). For example, the RRC message may include a message which corresponds to a CCCH. For example, the RRC message may include a message which corresponds to a DCCH. RRC message is a general term for common RRC message and dedicated RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to a PUSCH in the physical channel. The DL-SCH in the transport channel may be mapped to a PDSCH in the physical channel. The BCH in the transport channel may be mapped to a PBCH in the physical channel.

A higher-layer parameter is a parameter included in an RRC message or a MAC CE (Medium Access Control Control Element). The higher-layer parameter is a generic name of information included in a MIB, system information, a message which corresponds to CCCH, a message which corresponds to DCCH, and a MAC CE. A higher-layer parameter may be referred to as an RRC parameter or an RRC configuration if the higher-layer parameter is the parameter included in the RRC message.

A higher-layer parameter may be a cell-specific parameter or a UE-specific parameter. A cell-specific parameter is a parameter including a common configuration in a cell. A UE-specific parameter is a parameter including a configuration that may be configured differently for each UE.

The base station device may indicate change of cell-specific parameters by reconfiguration with random-access. The UE may change cell-specific parameters before triggering random-access. The base station device may indicate change of UE-specific parameters by reconfiguration with or without random-access. The UE may change UE-specific parameters before or after random-access.

The procedure performed by the terminal device 1 includes at least a part or all of the following 5A to 5C. The 5A is cell search. The 5B is random-access. The 5C is data communication.

The cell search is a procedure used by the terminal device 1 to synchronize with a cell in the time domain and/or the frequency domain and to detect a physical cell identity. The terminal device 1 may detect the physical cell ID by performing synchronization of time domain and/or frequency domain with a cell by the cell search.

A sequence of a PSS is given based at least on a physical cell ID. A sequence of an SSS is given based at least on the physical cell ID.

An SS/PBCH block candidate indicates a resource for which transmission of the SS/PBCH block may exist. An SS/PBCH block may be transmitted at a resource indicated as the SS/PBCH block candidate. The base station device 3 may transmit an SS/PBCH block at an SS/PBCH block candidate. The terminal device 1 may receive (detect) the SS/PBCH block at the SS/PBCH block candidate.

A set of SS/PBCH block candidates in a half radio frame is also referred to as an SS-burst-set. The SS-burst-set is also referred to as a transmission window, a SS transmission window, or a DRS transmission window (Discovery Reference Signal transmission window). The SS-burst-set is a generic name that includes at least a first SS-burst-set and a second SS-burst-set.

The base station device 3 transmits SS/PBCH blocks of one or more indexes at a predetermined cycle. The terminal device 1 may detect an SS/PBCH block of at least one of the SS/PBCH blocks of the one or more indexes. The terminal device 1 may attempt to decode the PBCH included in the SS/PBCH block.

The random-access is a procedure including at least a part or all of message 1, message 2, message 3, and message 4.

The message 1 is a procedure in which the terminal device 1 transmits a PRACH. The terminal device 1 transmits the PRACH in one PRACH occasion selected from among one or more PRACH occasions based on at least the index of the SS/PBCH block candidate detected based on the cell search.

The message 2 is a procedure in which the terminal device 1 attempts to detect a DCI format 1_0 with CRC (Cyclic Redundancy Check) scrambled by an RA-RNTI (Random Access-Radio Network Temporary Identifier). The terminal device 1 may attempt to detect the DCI format 1_0 in a search-space-set.

The message 3 (Msg 3) is a procedure for transmitting a PUSCH scheduled by a random-access response grant included in the DCI format 1_0 detected in the message 2 procedure. The random-access response grant is indicated by the MAC CE included in the PDSCH scheduled by the DCI format 1_0.

The PUSCH scheduled based on the random-access response grant is either a message 3 PUSCH or a PUSCH. The message 3 PUSCH contains a contention resolution identifier MAC CE. The contention resolution ID MAC CE includes a contention resolution ID.

Retransmission of the message 3 PUSCH is scheduled by DCI format 0_0 with CRC scrambled by a TC-RNTI (Temporary Cell-Radio Network Temporary Identifier).

The message 4 is a procedure that attempts to detect a DCI format 1_0 with CRC scrambled by either a C-RNTI (Cell-Radio Network Temporary Identifier) or a TC-RNTI. The terminal device 1 receives a PDSCH scheduled based on the DCI format 1_0. The PDSCH may include a collision resolution ID.

Data communication is a generic term for downlink communication and uplink communication.

In data communication, the terminal device 1 attempts to detect a PDCCH (attempts to monitor a PDCCH, monitors a PDCCH). in a resource identified at least based on one or all of a control resource set and a search-space-set. It's also called as "the terminal device 1 attempts to detect a PDCCH in a control resource set", "the terminal device 1 attempts to detect a PDCCH in a search-space-set", "the terminal device 1 attempts to detect a PDCCH candidate in a control resource set", "the terminal device 1 attempts to detect a PDCCH candidate in a search-space-set", "the terminal device 1 attempts to detect a DCI format in a control resource set", or "the terminal device 1 attempts to detect a DCI format in a search-space-set". Monitoring a PDCCH may be equivalent as monitoring a DCI format in the PDCCH.

The control resource set is a set of resources configured by the number of resource blocks and a predetermined number of OFDM symbols in a slot.

The set of resources for the control resource set may be indicated by higher-layer parameters. The number of OFDM symbols included in the control resource set may be indicated by higher-layer parameters.

A PDCCH may be also called as a PDCCH candidate.

A search-space-set is defined as a set of PDCCH candidates. A search-space-set may be a Common Search Space (CSS) set or a UE-specific Search Space (USS) set.

The CSS set is a generic name of a type-0 PDCCH common search-space-set, a type-0a PDCCH common search-space-set, a type-1 PDCCH common search-space-set, a type-2 PDCCH common search-space-set, and a type-3 PDCCH common search-space-set. The USS set may be also called as UE-specific PDCCH search-space-set.

The type-0 PDCCH common search-space-set may be used as a common search-space-set with index 0. The type-0 PDCCH common search-space-set may be an common search-space-set with index 0.

A search-space-set is associated with (included in, corresponding to) a control resource set. The index of the control resource set associated with the search-space-set may be indicated by higher-layer parameters.

For a search-space-set, a part or all of 6A to 6C may be indicated at least by higher-layer parameters. The 6A is PDCCH monitoring period. The 6B is PDCCH monitoring pattern within a slot. The 6C is PDCCH monitoring offset.

A monitoring occasion of a search-space-set may correspond to one or more OFDM symbols in which the first OFDM symbol of the control resource set associated with the search-space-set is allocated. A monitoring occasion of a search-space-set may correspond to resources identified by the first OFDM symbol of the control resource set associated with the search-space-set. A monitoring occasion of a search-space-set is given based at least on a part or all of PDCCH monitoring periodicity, PDCCH monitoring pattern within a slot, and PDCCH monitoring offset.

Figure 8:
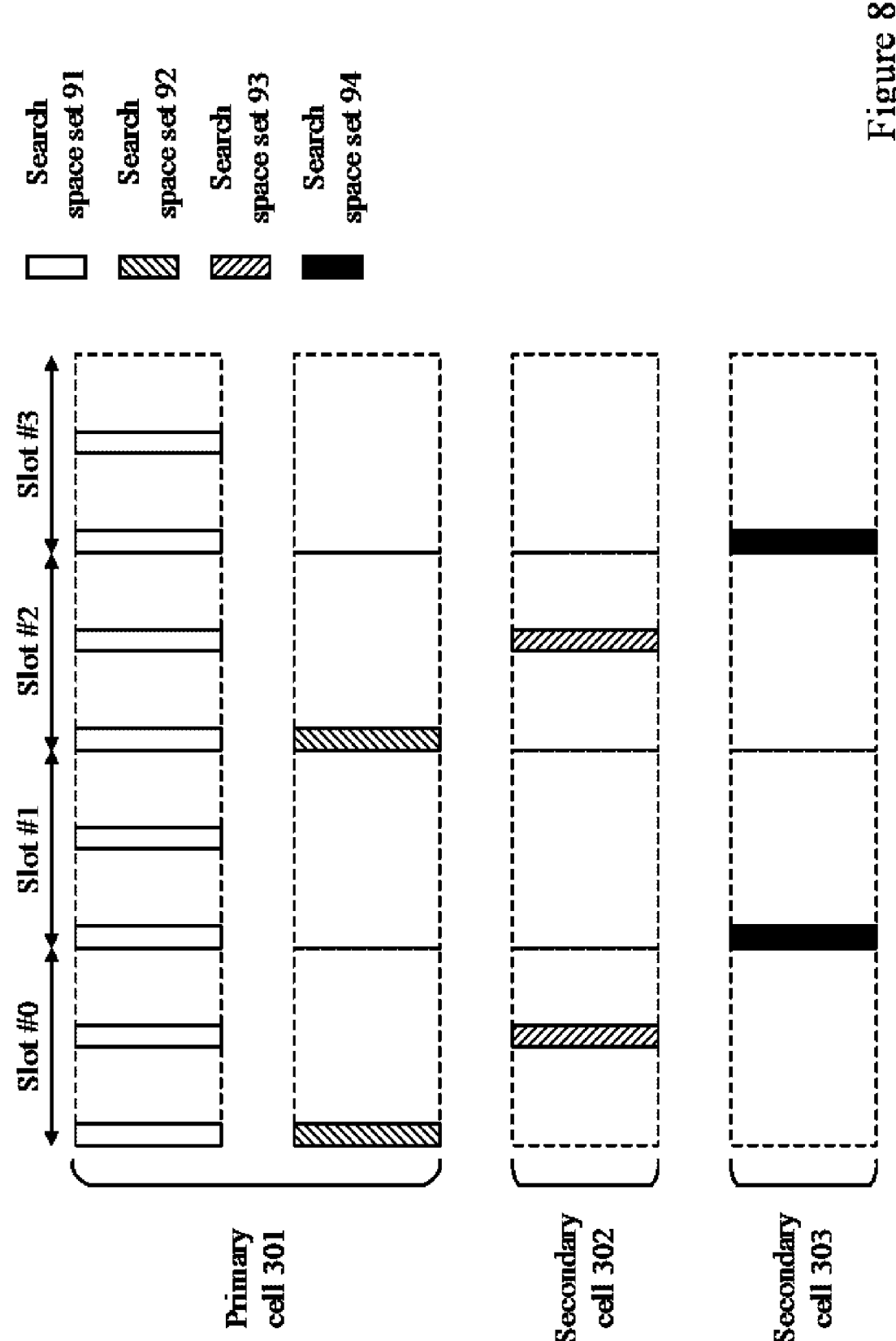
FIG. 8 is a diagram showing an example of the monitoring occasion of the search-space-set according to an aspect of the present embodiment.

FIG. 8 is a diagram showing an example of the monitoring occasion of the search-space-set according to an aspect of the present embodiment. In FIG. 8, the search-space-set 91 and the search-space-set 92 are sets in the primary cell 301, the search-space-set 93 is a set in the secondary cell 302, and the search-space-set 94 is a set in the secondary cell 303.

In FIG. 8, the block indicated by the grid line indicates the search-space-set 91, the block indicated by the upper right diagonal line indicates the search-space-set 92, the block indicated by the upper left diagonal line indicates the search-space-set 93, and the block indicated by the horizontal line indicates the search-space-set 94.

In FIG. 8, the PDCCH monitoring periodicity for the search-space-set 91 is set to 1 slot, the PDCCH monitoring offset for the search-space-set 91 is set to 0 slot, and the PDCCH monitoring pattern for the search-space-set 91 is [1, 0, 0, 0, 0, 0, 0, 1, 0, 0, 0, 0, 0, 0]. That is, the monitoring occasion of the search-space-set 91 corresponds to the first OFDM symbol (OFDM symbol #0) and the eighth OFDM symbol (OFDM symbol #7) in each of the slots.

In FIG. 8, the PDCCH monitoring periodicity for the search-space-set 92 is set to 2 slots, the PDCCH monitoring offset for the search-space-set 92 is set to 0 slots, and the PDCCH monitoring pattern for the search-space-set 92 is [1, 0, 0, 0, 0, 0, 0, 0, 0, 0, 0, 0, 0, 0]. That is, the monitoring occasion of the search-space-set 92 corresponds to the leading OFDM symbol (OFDM symbol #0) in each of the even slots.

In FIG. 8, the PDCCH monitoring periodicity for the search-space-set 93 is set to 2 slots, the PDCCH monitoring offset for the search-space-set 93 is set to 0 slots, and the PDCCH monitoring pattern for the search-space-set 93 is [0, 0, 0, 0, 0, 0, 0, 1, 0, 0, 0, 0, 0, 0]. That is, the monitoring occasion of the search-space-set 93 corresponds to the eighth OFDM symbol (OFDM symbol #7) in each of the even slots.

In FIG. 8, the PDCCH monitoring periodicity for the search-space-set 94 is set to 2 slots, the PDCCH monitoring offset for the search-space-set 94 is set to 1 slot, and the PDCCH monitoring pattern for the search-space-set 94 is [1, 0, 0, 0, 0, 0, 0, 0, 0, 0, 0, 0, 0, 0]. That is, the monitoring occasion of the search-space-set 94 corresponds to the leading OFDM symbol (OFDM symbol #0) in each of the odd slots.

The type-0 PDCCH common search-space-set may be at least used for a DCI format with a cyclic redundancy check (CRC) sequence scrambled by an SI-RNTI (System Information-Radio Network Temporary Identifier).

The type-0a PDCCH common search-space-set may be used at least for a DCI format with a cyclic redundancy check sequence scrambled by an SI-RNTI.

The type-1 PDCCH common search-space-set may be used at least for a DCI format with a CRC sequence scrambled by an RA-RNTI (Random Access-Radio Network Temporary Identifier) or a CRC sequence scrambled by a TC-RNTI (Temporary Cell-Radio Network Temporary Identifier).

The type-2 PDCCH common search-space-set may be used for a DCI format with a CRC sequence scrambled by P-RNTI (Paging-Radio Network Temporary Identifier).

The type-3 PDCCH common search-space-set may be used for a DCI format with a CRC sequence scrambled by a C-RNTI (Cell-Radio Network Temporary Identifier).

The UE-specific search-space-set may be used at least for a DCI format with a CRC sequence scrambled by a C-RNTI, CS-RNTI (Configured Scheduling-Radio Network Temporary Identifier), MCS-C-RNTI (Modulation and Coding Scheme-Radio Network Temporary Identifier) or SP-CSI-RNTI (Semi Persistent-Channel State Information-Radio Network Temporary Identifier).

The DCI format with a CRC sequence scrambled by a C-RNTI may be used to schedule PUSCH (dynamically scheduled PUSCH (DG-PUSCH)). The DCI format with a CRC sequence scrambled by a CS-RNTI may be used to activate and/or release Type-2 Configured Scheduling (CS). The PUSCH based on CS may be referred to as CS-PUSCH. The DCI format with a CRC sequence scrambled by a CS-RNTI may be used to schedule a retransmission of the CS-PUSCH (e.g. Type-1 CS-PUSCH and/or Type-2 CS-PUSCH).

In downlink communication, the terminal device 1 may detect a downlink DCI format. The detected downlink DCI format is at least used for resource assignment for a PDSCH. The detected downlink DCI format is also referred to as downlink assignment. The terminal device 1 attempts to receive the PDSCH. Based on a PUCCH resource indicated based on the detected downlink DCI format, an HARQ-ACK corresponding to the PDSCH (HARQ-ACK corresponding to a transport block included in the PDSCH) may be reported to the base station device 3.

In uplink communication, the terminal device 1 may detect an uplink DCI format. The detected uplink DCI format is at least used for resource assignment for a PUSCH. The detected uplink DCI format is also referred to as uplink grant. The terminal device 1 transmits the PUSCH.

PUSCH transmission(s) can be dynamically scheduled by an UL grant in a DCI, or the transmission can correspond to a configured grant Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI according to those procedure(s) after the reception of higher layer parameter configuredGrantConfig not including rrc-ConfiguredUplinkGrant. If configuredGrantConfig-ToAddModList is configured, more than one configured grant configuration of configured grant Type 1 and/or configured grant Type 2 may be active at the same time on an active BWP of a serving cell.

More details of resource allocation in time domain for PUSCH scheduled by a DCI format is described. When the UE (terminal device 1) is scheduled to transmit a transport block and no CSI report, or the UE is scheduled to transmit a transport block and a CSI report(s) on PUSCH by a DCI, the 'Time domain resource assignment' field value m of the DCI may provide a row index m+1 to an allocated table. The determination of the used resource allocation table may be pre-defined and/or defined in RRC configuration. The indexed row of the resource allocation table may define the slot offset K2, the start and length indicator SLIV, or directly the start symbol S and the allocation length L, the PUSCH mapping type, and the number of repetitions (if RRC parameter numberOfRepetitions is present in the resource allocation table) to be applied in the PUSCH transmission. It is noted that RRC parameter is a kind of high-layer parameter.

For PUSCH scheduled by DCI format 0_1, if RRC parameter pusch-RepTypeIndicatorDCI-0-1 is set to 'pusch-RepTypeB', the UE may apply PUSCH repetition Type B procedure when determining the time domain resource allocation. For PUSCH scheduled by DCI format 0_2, if RRC parameter pusch-RepTypeIndicatorDCI-0-2 is set to 'pusch-RepTypeB', the UE may apply PUSCH repetition Type B procedure when determining the time domain resource allocation. Otherwise, the UE may apply PUSCH repetition Type A procedure when determining the time domain resource allocation for PUSCH scheduled by PDCCH.

For PUSCH repetition Type A, the starting symbol S relative to the start of the slot, and the number of consecutive symbols L counting from the symbol S allocated for the PUSCH may be determined from the start and length indicator SLIV of the indexed row: if $(L-1)\leq7$ then $SLIV=14(L-1)+S$, otherwise $SLIV=14(14-L+1+(14-1-S)$, where $0<L\leq14-S$.

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K may be determined as: if RRC parameter numberOfRepetitions is present in the resource allocation table, the number of repetitions K may be equal to numberOfRepetitions; else if the UE is configured with RRC parameter pusch-AggregationFactor, the number of repetitions K may be equal to pusch-AggregationFactor; otherwise K=1.

If the UE is not capable of a certain coverage enhancement feature(s) (e.g. available slot based PUSCH repetition counting) or if the UE is not provided with a certain coverage enhancement configuration(s) (e.g. available slot based PUSCH repetition counting), the following may be applied. For PUSCH repetition Type A, in case K>1, the same symbol allocation may be applied across the K consecutive slots and the PUSCH may be limited to a single transmission layer. The UE may repeat the TB across the K consecutive slots applying the same symbol allocation in each slot. The redundancy version to be applied on the nth transmission occasion of the TB, where n=0, 1, . . . K–1, may be determined as describe below. For PUSCH repetition Type A, a PUSCH transmission in a slot of a multi-slot PUSCH transmission may be omitted according to the conditions at least and/or at most in, PUSCH-priority based procedure, slot configuration based procedure, slot format based procedure and cancellation indication based procedure. For example, a slot may be determined as available if the slot is available according to all the conditions defined in those procedures, and/or the slot may be determined as not available if the slot is not available according to at least one of the conditions defined in those procedures. K may be an integer.

The configuredGrantConfig may be referred to the ConfiguredGrantConfig.

The configuredGrantConfig may be referred to as the ConfiguredGrantConfig.

When PUSCH resource allocation is semi-statically configured by higher layer parameter configuredGrantConfig in BWP-UplinkDedicated information element, and the PUSCH transmission corresponding to a configured grant, the following higher layer parameters are applied in the transmission.

For Type 1 PUSCH transmissions with a configured grant, the following parameters are given in configuredGrantConfig unless mentioned otherwise, and For the determination of the PUSCH repetition type, if the higher layer parameter pusch-RepTypeIndicator in rrc-ConfiguredUplinkGrant is configured and set to 'pusch-RepTypeB', PUSCH repetition Type B is applied. Otherwise, PUSCH repetition Type A is applied.

The higher layer parameter pusch-RepTypeIndicator indicates whether UE follows the behavior for PUSCH repetition Type A or the behavior for PUSCH repetition Type B for each Type 1 configured grant configuration. The value pusch-RepTypeA enables the 'PUSCH repetition Type A' and the value pusch-RepTypeB enables the 'PUSCH repetition Type B'. The value pusch-RepTypeB is not configured simultaneously with cg-nrofPUSCH-InSlot-r16 and cg-nrofSlots-r16.

For PUSCH repetition Type A, the selection of the time domain resource allocation table follows the rules for DCI format 0_0 on UE specific search space.

For PUSCH repetition Type A, the selection of the time domain resource allocation table is as follows. If pusch-RepTypeIndicatorDCI-0-1 in pusch-Config is configured and set to 'pusch-RepTypeA', pusch-TimeDomainResourceAllocationListDCI-0-1 in pusch-Config is used. Otherwise, pusch-TimeDomainResourceAllocationListDCI-0-2 in pusch-Config is used. It is not expected that pusch-RepTypeIndicator in rrc-ConfiguredUplinkGrant is configured with 'pusch-RepTypeA' when none of pusch-RepTypeIndicatorDCI-0-1 and pusch-RepTypeIndicatorDCI-0-2 in pusch-Config is set to 'pusch-RepTypeA'.

For PUSCH repetition Type B, the selection of the time domain resource allocation table is as follows. If pusch-RepTypeIndicatorDCI-0-1 in pusch-Config is configured and set to 'pusch-RepTypeB', pusch-TimeDomainResourceAllocationListDCI-0-1 in pusch-Config is used. Otherwise, pusch-TimeDomainResourceAllocationListDCI-0-2 in pusch-Config is used. It is not expected that pusch-RepTypeIndicator in rrc-ConfiguredUplinkGrant is configured with 'pusch-RepTypeB' when none of pusch-RepTypeIndicatorDCI-0-1 and pusch-RepTypeIndicatorDCI-0-2 in pusch-Config is set to 'pusch-RepTypeB'.

More details of resource allocation in time domain for PUSCH with configured grant is described. For PUSCH transmissions with a Type 1 or Type 2 configured grant, the number of (nominal) repetitions K to be applied to the transmitted transport block may be provided by the indexed row in the time domain resource allocation table if numberOfRepetitions is present in the table; otherwise K may be provided by the higher layer configured parameters repK. The UE may not be allowed to transmit anything on the resources configured by RRC parameter configuredGrantConfig if the higher layers did not deliver a transport block to transmit on the resources allocated for uplink transmission without grant.

A set of allowed periodicities P are defined in RRC configuration. The RRC parameter cg-nrofSlots, may provide the number of consecutive slots allocated within a configured grant period. The RRC parameter cg-nrofPUSCH-InSlot may provide the number of consecutive PUSCH allocations within a slot, where the first PUSCH allocation may follow the RRC parameter timeDomainAllocation for Type 1 PUSCH transmission or the higher layer configuration according to MAC procedure, and UL grant received on the DCI for Type 2 PUSCH transmissions, and the remaining PUSCH allocations may have the same length and PUSCH mapping type, and may be appended following the previous allocations without any gaps. The same combination of start symbol and length and PUSCH mapping type may repeat over the consecutively allocated slots.

The UE may not be expected to be configured with the time duration for the transmission of K repetitions larger than the time duration derived by the periodicity P. If the UE determines that, for a transmission occasion, the number of symbols available for the PUSCH transmission in a slot is smaller than transmission duration L, the UE may not transmit the PUSCH in the transmission occasion.

The procedures apply to PUSCH transmissions of PUSCH repetition Type A with a Type 1 or Type 2 configured grant. The RRC parameter repK-RV defines the redundancy version pattern to be applied to the repetitions. If cg-RetransmissionTimer is provided, the redundancy version for uplink transmission with a configured grant is determined by the UE. If the parameter repK-RV is not provided in the configuredGrantConfig and cg-RetransmissionTimer is not provided, the redundancy version for uplink transmissions with a configured grant may have to be set to 0. If the parameter repK-RV is provided in the configuredGrantConfig and cg-RetransmissionTimer is not provided, for the nth transmission occasion among K repetitions, n=1, 2, . . . , K, it is associated with $(\bmod(n-1,4)+1)^{th}$ value in the configured RV sequence. If a configured grant configuration is configured with startingFromRV0 set to 'off', the initial transmission of a transport block may only start at the first transmission occasion of the K repetitions. Otherwise, the initial transmission of a transport block may start the first transmission occasion of the K repetitions if the configured RV sequence is {0, 2, 3, 1}, any of the transmission occasions of the K repetitions that are associated with RV=0 if the configured RV sequence is {0, 3, 0, 3}, and/or any of the transmission occasions of the K repetitions if the configured RV sequence is {0,0,0,0}, except the last transmission occasion when K>8.

If a configured grant configuration is not configured with startingFromRV0 set to 'off' and if available slot-based counting is configured, the initial transmission of a transport block may start at the first transmission occasion of the K repetitions.

If a configured grant configuration is not configured with startingFromRV0 set to 'off' and if available slot-based counting is not configured, the initial transmission of a transport block may start the first transmission occasion of the K repetitions if the configured RV sequence is {0,2,3,1}, any of the transmission occasions of the K repetitions that are associated with RV=0 if the configured RV sequence is {0,3,0,3}, and/or any of the transmission occasions of the K repetitions if the configured RV sequence is {0,0,0,0}, except the last transmission
occasion when K>8.

If a configured grant configuration is not configured with startingFromRV0 set to 'off' and if available slot-based counting is configured, the initial transmission of a transport block may start the first transmission occasion of the K repetitions if the configured RV sequence is {0,2,3,1}, any of the transmission occasions of the K repetitions that are associated with RV=0 if the configured RV sequence is {0,3,0,3}, and/or any of the transmission occasions of the K repetitions if the configured RV sequence is {0,0,0,0}, except the last transmission occasion when K≥8.

If a configured grant configuration is not configured with startingFromRV0 set to 'off' and if available slot-based counting is not configured, the initial transmission of a transport block may start the first transmission occasion of the K repetitions if the configured RV sequence is {0,2,3,1}, any of the transmission occasions of the K repetitions that are associated with RV=0 assuming the transmission occasions of the K repetitions are determined based on consecutive physical slots if the configured RV sequence is {0,3,0, 3}, and/or any of the transmission occasions of the K repetitions if the configured RV sequence is {0,0,0,0}, except the last transmission occasion when K>8.

For any RV sequence, the repetitions may have to be terminated after transmitting K repetitions, or at the last transmission occasion among the K repetitions within the period P, or from the starting symbol of the repetition that overlaps with a PUSCH with the same HARQ process scheduled by DCI format 00, 0_1 or 0_2, whichever is reached first. In addition, the UE may have to terminate the repetition of a transport block in a PUSCH transmission if the UE receives a DCI format 0_1 with DFI flag provided and set to '1', and if in this DCI the UE detects ACK for the HARQ process corresponding to that transport block.

The UE is not expected to be configured with the time duration for the transmission of K repetitions larger than the time duration derived by the periodicity P. If the UE determines that, for a transmission occasion, the number of symbols available for the PUSCH transmission in a slot is smaller than transmission duration L, the UE does not transmit the PUSCH in the transmission occasion.

The MAC entity may be included in the medium access control layer processing unit 15.

The pusch-Config may be referred to the PUSCH-Config.

The pusch-Config may be referred to as the PUSCH-Config.

The RRC parameter frequencyHopping indicates that the value intraSlot enables 'Intra-slot frequency hopping' and the value interSlot enables 'Inter-slot frequency hopping'. If the field is absent, frequency hopping is not configured for 'pusch-RepTypeA'. The field frequencyHopping applies to DCI format 0_0 and 0_1 for 'pusch-RepTypeA'.

The RRC parameter frequencyHoppingDCI-0-1-r16 indicates the frequency hopping scheme for DCI format 01 when pusch-RepTypeIndicatorDCI-0-1 is set to 'pusch-RepTypeB', The value interRepetition enables 'Inter-repetition frequency hopping', and the value interSlot enables 'Inter-slot frequency hopping'. If the field is absent, frequency hopping is not configured for DCI format 0_1.

The RRC parameter frequencyHoppingDCI-0-1-r17 indicates the frequency hopping scheme for DCI format 01 when pusch-RepTypeIndicatorDCI-0-1 is set to 'pusch-RepTypeA' or 'pusch-RepTypeB' with 'Inter-repetition frequency hopping'. The value interRepetition enables 'Inter-repetition frequency hopping', and the value interSlot enables 'Inter-slot frequency hopping', and the value intraSlot enables 'intra-slot frequency hopping'. If the field is absent, inter-repetition frequency hopping is not configured for DCI format 0_1 for 'pusch-RepTypeA' and frequency hopping is not configured for DCI format 0_1 for 'pusch-RepTypeB'. Or the RRC parameter frequencyHoppingDCI-0-1-r17 may indicate the frequency hopping scheme for DCI format 01 when pusch-RepTypeIndicatorDCI-0-1 is set to 'pusch-RepTypeA' enabling 'Inter-repetition frequency hopping'.

In case of resource allocation type 2, the UE transmits PUSCH without frequency hopping.

In case of resource allocation type 1, whether or not transform precoding is enabled for PUSCH transmission, the UE may perform PUSCH frequency hopping, if the frequency hopping field in a corresponding detected DCI format or in a random access response UL grant is set to 1, or if for a Type 1 PUSCH transmission with a configured grant the RRC parameter frequencyHoppingOffset is provided, otherwise no PUSCH frequency hopping is performed. When frequency hopping is enabled for PUSCH, the RE mapping is defined in those procedures.

For a PUSCH scheduled by RAR UL grant, fallbackRAR UL grant, or by DCI format 0_0 with CRC scrambled by TC-RNTI, frequency offsets are obtained as described in those procedures. For a PUSCH scheduled by DCI format 0_0/0_1 or a PUSCH based on a Type2 configured UL grant activated by DCI format 0_0/0_1 and for resource allocation type 1, frequency offsets are configured by RRC parameter frequencyHoppingOffsetLists in pusch-Config. For a PUSCH scheduled by DCI format 0_2 or a PUSCH based on a Type2 configured UL grant activated by DCI format 0_2 and for resource allocation type 1, frequency offsets are configured by RRC parameter frequencyHoppingOffsetListsDCI-0-2 in pusch-Config. When the size of the active BWP is less than 50 PRBs, one of two higher layer configured offsets is indicated in the UL grant. When the size of the active BWP is equal to or greater than 50 PRBs, one of four higher layer configured offsets is indicated in the UL grant.

For PUSCH based on a Type1 configured UL grant the frequency offset is provided by the RRC parameter frequencyHoppingOffset in rrc-ConfiguredUplinkGrant.

For PUSCH repetition Type B (as determined according to procedures defined in those procedures for scheduled PUSCH, or those procedures for configured PUSCH), a UE is configured for frequency hopping by the RRC parameter frequencyHoppingDCI-0-2 in pusch-Config for PUSCH transmission scheduled by DCI format 0_2, by frequencyHoppingDCI-0-1 provided in pusch-Config for PUSCH transmission scheduled by DCI format 0_1, and by frequencyHoppingPUSCH-RepTypeB provided in rrc-ConfigureddUplinkGrant for Type 1 configured PUSCH transmission. The frequency hopping mode for Type 2 configured PUSCH transmission follows the configuration of the activating DCI format. One of two frequency hopping modes (Inter-repetition frequency hopping and Inter-slot frequency hopping) can be configured.

In case of resource allocation type 1, whether or not transform precoding is enabled for PUSCH transmission, the UE may perform PUSCH frequency hopping, if the frequency hopping field in a corresponding detected DCI format is set to 1, or if for a Type 1 PUSCH transmission with a configured grant the RRC parameter frequencyHoppingPUSCH-RepTypeB is provided, otherwise no PUSCH frequency hopping is performed. When frequency hopping is enabled for PUSCH, the RE mapping is defined in those procedures.

For a PUSCH scheduled by DCI format 0_1 or a PUSCH based on a Type 2 configured UL grant activated by DCI format 0_1 and for resource allocation type 1, frequency offsets are configured by RRC parameter frequencyHoppingOffsetLists in pusch-Config. For a PUSCH scheduled by DCI format 0_2 or a PUSCH based on a Type 2 configured UL grant activated by DCI format 0_2 and for resource allocation type 1, frequency offsets are configured by RRC parameter frequencyHoppingOffsetListsDCI-0-2 in pusch-Config. When the size of the active BWP is less than 50 PRBs, one of two higher layer configured offsets is indicated in the UL grant. When the size of the active BWP is equal to or greater than 50 PRBs, one of four higher layer configured offsets is indicated in the UL grant.

For PUSCH based on a Type1 configured UL grant the frequency offset is provided by the RRC parameter frequencyHoppingOffset in rrc-ConfiguredUplinkGrant.

In case of inter-slot frequency hopping, the starting RB during slot $n\hat{}u\_s$ follows that of inter-slot frequency hopping for PUSCH Repetition Type A according to at least one of the conditions defined in those procedures.

The pattern of inter-slot frequency hopping according to the available slots may be determined based on the omission of PUSCH transmissions.

The pattern of RV according to the available slots may be determined based on the omission of PUSCH transmissions.

The pattern of slot-counting according to the available slots may be determined based on the omission of PUSCH transmissions.

The PUSCH-priority based procedure is described. If a PUSCH is scheduled by a DCI or a PUSCH with configured grant is configured, the PUSCH is transmitted unless otherwise stated.

A PUSCH or a PUCCH transmission, including repetitions if any, can be of priority index 0 or of priority index 1. For a configured grant PUSCH transmission, a UE may determine a priority index from RRC parameter phy-PriorityIndex, if provided. For a PUCCH transmission with HARQ-ACK information corresponding to a SPS PDSCH reception or a SPS PDSCH release, a UE may determine a priority index from RRC parameter harq-CodebookID, if provided. For a PUCCH transmission with SR, a UE may determine the corresponding priority by RRC parameter phy-PriorityIndex in RRC parameter SchedulingRequestResourceConfig, if any. For a PUSCH transmission with semi-persistent CSI report, a UE may determine a priority index from a priority indicator field, if provided, in a DCI format that activates the semi-persistent CSI report. If a priority index is not provided to a UE for a PUSCH or a PUCCH transmission, the priority index may be 0.

If in an active DL BWP a UE may monitor PDCCH either for detection of DCI format 0_1 and DCI format 1_1 or for detection of DCI format 0_2 and DCI format 1_2, a priority index can be provided by a priority indicator field. If a UE indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 can schedule a PUSCH transmission of any priority and a DCI format 1_1 or a DCI format 1_2 can schedule a PDSCH reception and trigger a PUCCH transmission with corresponding HARQ-ACK information of any priority.

When a UE determines overlapping for PUCCH and/or PUSCH transmissions of different priority indexes, including repetitions if any, the UE may first resolve the overlapping for PUCCH and/or PUSCH transmissions of smaller priority index. Then: if a transmission of a first PUCCH of larger priority index scheduled by a DCI format in a PDCCH reception would overlap in time with a repetition of a transmission of a second PUSCH or a second PUCCH of smaller priority index, the UE may cancel the repetition of a transmission of the second PUSCH or the second PUCCH before the first symbol that would overlap with the first PUCCH transmission; if a transmission of a first PUSCH of larger priority index scheduled by a DCI format in a PDCCH reception would overlap in time with a repetition of the transmission of a second PUCCH of smaller priority index, the UE may cancel the repetition of the transmission of the second PUCCH before the first symbol that would overlap with the first PUSCH transmission. The overlapping may be applicable before or after resolving overlapping among channels of larger priority index, if any. The UE may expect that the transmission of the first PUCCH or the first PUSCH, respectively, would not start before $T\_(proc,2)+d\_1$ after a last symbol of the corresponding PDCCH reception. $T\_(proc,2)$ is the PUSCH preparation time for a corresponding UE processing capability assuming $d\_2,1=0$, based on and $N\_2$, and $d\_1$ is determined by a reported UE capability.

If a UE is scheduled by a DCI format in a first PDCCH reception to transmit a first PUCCH or a first PUSCH of larger priority index that overlaps with a second PUCCH or a second PUSCH transmission of smaller priority index that, if any, is scheduled by a DCI format in a second PDCCH, $T\_(proc,2)$ may be based on a value of corresponding to the smallest SCS configuration of the first PDCCH, the second PDCCHs, the first PUCCH or the first PUSCH, and the second PUCCHs or the second PUSCHs. If the overlapping group includes the first PUCCH, $N\_2$ is 5 for μ=0, 5.5 for μ=1 and 11 for μ=2 if RRC parameter processingType2Enabled of RRC parameter PDSCH-ServingCellConfig is set to enable for the serving cell where the UE receives the first PDCCH and for all serving cells where the UE receives the PDSCHs corresponding to the second PUCCHs, and if processingType2Enabled of RRC parameter PUSCH-ServingCellConfig is set to enable for the serving cells with the second PUSCHs, $N\_2$ is 10 for μ=0, 12 for μ=1, 23 for μ=2, and 36 for μ=3 otherwise. If the overlapping group includes the first PUSCH, $N\_2$ is 5 for μ=0, 5.5 for μ=1 and 11 for μ=2 if processingType2Enabled of PUSCH-ServingCellConfig is set to enable for the serving cells with the first PUSCH and the second PUSCHs and if processingType2Enabled of PDSCH-ServingCellConfig is set to enable for all serving cells where the UE receives the PDSCHs corresponding to the second PUCCHs, $N\_2$ is 10 for μ=0, 12 for μ=1, 23 for μ=2, and 36 for μ=3 otherwise.

If a UE would transmit the following channels, including repetitions if any, that would overlap in time: a first PUCCH of larger priority index with SR and a second PUCCH or PUSCH of smaller priority index; or a configured grant PUSCH of larger priority index and a PUCCH of smaller priority index; or a first PUCCH of larger priority index with HARQ-ACK information only in response to a PDSCH reception without a corresponding PDCCH and a second PUCCH of smaller priority index with SR and/or CSI, or a configured grant PUSCH with smaller priority index, or a PUSCH of smaller priority index with SP-CSI report(s) without a corresponding PDCCH; or a PUSCH of larger priority index with SP-CSI reports(s) without a corresponding PDCCH and a PUCCH of smaller priority index with SR, or CSI, or HARQ-ACK information only in response to a PDSCH reception without a corresponding PDCCH; or a configured grant PUSCH of larger priority index and a configured PUSCH of lower priority index on a same serving cell, the UE may be expected to cancel a repetition of the PUCCH/PUSCH transmissions of smaller priority index before the first symbol overlapping with the PUCCH/ PUSCH transmission of larger priority index if the repetition of the PUCCH/PUSCH transmissions of smaller priority index overlaps in time with the PUCCH/PUSCH transmissions of larger priority index.

A UE may not expect to be scheduled to transmit a PUCCH or a PUSCH with smaller priority index that would overlap in time with a PUCCH of larger priority index with HARQ-ACK information only in response to a PDSCH reception without a corresponding PDCCH. A UE may not expect to be scheduled to transmit a PUCCH of smaller priority index that would overlap in time with a PUSCH of larger priority index with SP-CSI report(s) without a corresponding PDCCH.

If a UE multiplexes aperiodic CSI in a PUSCH and the UE would multiplex UCI that includes HARQ-ACK information in a PUCCH that overlaps with the PUSCH and the timing conditions for overlapping PUCCHs and PUSCHs are fulfilled, the UE may multiplex only the HARQ-ACK information in the PUSCH and does not transmit the PUCCH.

If a UE transmits multiple PUSCHs in a slot on respective serving cells that include first PUSCHs that are scheduled by DCI formats and second PUSCHs configured by respective RRC parameter ConfiguredGrantConfig or semiPersisten- tOnPUSCH, and the UE would multiplex UCI in one of the multiple PUSCHs, and the multiple PUSCHs fulfil the conditions for UCI multiplexing, the UE may multiplex the UCI in a PUSCH from the first PUSCHs.

If a UE transmits multiple PUSCHs in a slot on respective serving cells and the UE would multiplex UCI in one of the multiple PUSCHs and the UE does not multiplex aperiodic CSI in any of the multiple PUSCHs, the UE may multiplex the UCI in a PUSCH of the serving cell with the smallest RRC parameter ServCellIndex subject to the conditions for UCI multiplexing being fulfilled. If the UE transmits more than one PUSCHs in the slot on the serving cell with the smallest ServCellIndex that fulfil the conditions for UCI multiplexing, the UE may multiplex the UCI in the earliest PUSCH that the UE transmits in the slot.

If a UE transmits a PUSCH over multiple slots and the UE would transmit a PUCCH with HARQ-ACK and/or CSI information over a single slot that overlaps with the PUSCH transmission in one or more slots of the multiple slots, and the PUSCH transmission in the one or more slots fulfills the conditions for multiplexing the HARQ-ACK and/or CSI information, the UE may multiplex the HARQ-ACK and/or CSI information in the PUSCH transmission in the one or more slots. The UE may not multiplex HARQ-ACK and/or CSI information in the PUSCH transmission in a slot from the multiple slots if the UE would not transmit a single-slot PUCCH with HARQ-ACK and/or CSI information in the slot in case the PUSCH transmission was absent.

If the PUSCH transmission over the multiple slots is scheduled by a DCI format that includes a DAI field, the value of the DAI field may be applicable for multiplexing HARQ-ACK information in the PUSCH transmission in any slot from the multiple slots where the UE multiplexes HARQ-ACK information.

When a UE would multiplex HARQ-ACK information in a PUSCH transmission that is configured by an RRC param- eter ConfiguredGrantConfig, and includes CG-UCI, the UE may multiplex the HARQ-ACK information in the PUSCH transmission if the UE is provided RRC parameter cg-UCI- Multiplexing; otherwise, the UE does not transmit the PUSCH and multiplexes the HARQ-ACK information in a PUCCH transmission or in another PUSCH transmission.

If a PUSCH (or a repetition of a PUSCH) in a slot is determined to be transmitted or to multiplex UCI(s), the slot may be considered as available for the PUSCH transmission. If a PUSCH (or a repetition of a PUSCH) in a slot is determined to be cancelled, the slot may be considered as not available for the PUSCH transmission.

The slot configuration based procedure is described. If a PUSCH is scheduled by a DCI or a PUSCH with configured grant is configured, the PUSCH is transmitted unless oth- erwise stated.

If a UE is provided RRC parameter tdd-UL-DL-Configu- rationCommon, the UE may set the slot format (the format which indicates which type of symbol between downlink, uplink and flexible symbols each symbol in a slot is) per slot over a number of slots as indicated by tdd-UL-DL-Configu- rationCommon. If the UE is additionally provided RRC parameter tdd-UL-DL-ConfigurationDedicated, the param- eter tdd-UL-DL-ConfigurationDedicated may override only flexible symbols per slot over the number of slots as pro- vided by tdd-UL-DL-ConfigurationCommon.

For operation on a single carrier in unpaired spectrum, if a UE is configured by higher layers to receive a PDCCH, or a PDSCH, or a CSI-RS, or a DL PRS in a set of symbols of a slot, the UE receives the PDCCH, the PDSCH, the CSI-RS, or the DL PRS if the UE does not detect a DCI format that indicates to the UE to transmit a PUSCH, a PUCCH, a PRACH, or a SRS in at least one symbol of the set of symbols of the slot; otherwise, the UE may not receive the PDCCH, or the PDSCH, or the CSI-RS, or the DL PRS in the set of symbols of the slot.

For a set of symbols of a slot that are indicated to a UE as downlink by tdd-UL-DL-ConfigurationCommon, or tdd- UL-DL-ConfigurationDedicated, the UE may not transmit PUSCH, PUCCH, PRACH, or SRS when the PUSCH, PUCCH, PRACH, or SRS overlaps, even partially, with the set of symbols of the slot.

For a set of symbols of a slot that are indicated to a UE as flexible by tdd-UL-DL-ConfigurationCommon, and tdd- UL-DL-ConfigurationDedicated if provided, the UE may not expect to receive both dedicated RRC parameters con- figuring transmission from the UE in the set of symbols of the slot and dedicated RRC parameters configuring recep- tion by the UE in the set of symbols of the slot.

For operation on a single carrier in unpaired spectrum, for a set of symbols of a slot indicated to a UE by RRC parameter ssb-PositionsInBurst in SIB1 or ssb-PositionsIn- Burst in ServingCellConfigCommon, for reception of SS/PBCH blocks, the UE may not transmit PUSCH, PUCCH, PRACH in the slot if a transmission would overlap with any symbol from the set of symbols and the UE does not transmit SRS in the set of symbols of the slot. The UE may not expect the set of symbols of the slot to be indicated as uplink by tdd-UL-DL-ConfigurationCommon, or tdd-UL-DL-ConfigurationDedicated, when provided to the UE.

If a UE is scheduled by a DCI format to transmit PUSCH over multiple slots, and if tdd-UL-DL-ConfigurationCommon, or tdd-UL-DL-ConfigurationDedicated, indicates that, for a slot from the multiple slots, at least one symbol from a set of symbols where the UE is scheduled PUSCH transmission in the slot is a downlink symbol, the UE may not transmit the PUSCH in the slot.

If a PUSCH (or a repetition of a PUSCH) in a slot is determined to be transmitted, the slot may be considered as available for the PUSCH transmission. If a PUSCH (or a repetition of a PUSCH) in a slot is determined to be cancelled or not to be transmitted, the slot may be considered as not available for the PUSCH transmission.

A PUSCH instance may be a unit of baseband signal generation. Here, the baseband signal generation may be performed by the baseband unit 13.

Details of UE procedure(s) for applying transform precoding on PUSCH are described.

Figure 9:
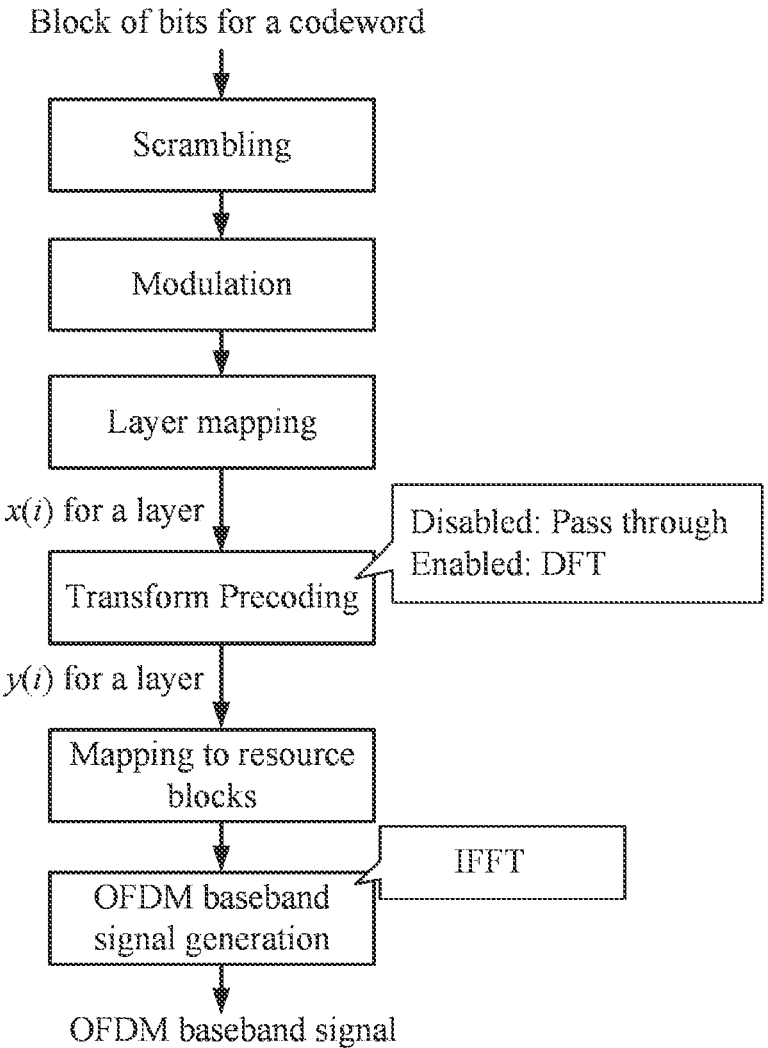
FIG. 9 shows an example of PUSCH generation procedures at the UE side.

FIG. 9 shows an example of PUSCH generation procedures at the UE side. The PUSCH generation procedures may include multiple processes, e.g., scrambling, modulation, layer mapping, transform precoding, mapping to resource blocks, and OFDM baseband signal generation. Block of bits for a codeword may be scrambled so that the scrambled bits are generated. The scrambled bits may be modulated so that the modulation symbols (i.e., complex-valued modulation symbols) are generated. The modulation symbols may be layer mapped so that the set of modulation symbols per layer is generated. The set of modulation symbols per layer x(i) may be the input to the transform precoding process, and the processed modulation symbols per layer y(i) may be the output corresponding to x(i). The processed modulation symbols per layer y(i) may be mapped to resource blocks (e.g., virtual resource blocks and/or physical resource blocks). Inverse Fast Fourier Transformation (IFFT) may be applied to the modulation symbols on resource blocks so that OFDM baseband signal is generated.

In gNB side, processes each corresponding to the respective process shown in FIG. 9 may be performed. For example, de-scrambling process at the gNB side may correspond to the scrambling process at the UE side, de-modulation process at the gNB side may correspond to the modulation process at the UE side, IDFT (Inverse DFT) at the gNB side may correspond to the DFT at the UE side, and FFT at the gNB side may correspond to the IFFT at the UE side.

In the transform precoding process, when the transform precoding is configured to be disabled (or is not configured to be enabled), the input may pass through as it is. Therefore, y(i)=x(i) in this case. When the transform precoding is configured to be enabled, At lease Digital Fourier Transformation (DFT) may be applied to the input so that the output is generated. FIG. 10 shows an example of equation of DFT process for transform precoding, where $M^{PUSCH}_{RB}$ may represent the bandwidth of the PUSCH in terms of resource blocks, $M^{layer}_{symb}$ may denote the number of modulation symbols per layer and $N^{RB}_{sc}$ may denote the number of subcarriers within a resource block (e.g. $N^{RB}_{sc}=12$). If phase-tracking reference signal (PT-RS) is not used, $\hat{x}$(i)=x(i). If phase-tracking reference signal (PT-RS) is used, x(i) are mapped to $\hat{x}$ (i) which are not associated with PT-RS samples.

For a PUSCH scheduled by RAR UL grant, or for a PUSCH scheduled by fallbackRAR UL grant, or for a PUSCH scheduled by DCI format 0_0 with CRC scrambled by TC-RNTI, the UE may consider the transform precoding either 'enabled' or 'disabled' according to the higher layer configured parameter msg3-transformPrecoder.

For a MsgA PUSCH, the UE may consider the transform precoding either 'enabled' or 'disabled' according to the higher layer configured parameter msgA-TransformPrecoder. If an RRC parameter msgA-TransformPrecoder is not configured, the UE may consider the transform precoding either 'enabled' or 'disabled' according to the RRC parameter msg3-transformPrecoder.

The RRC parameter msgA-TransformPrecoder indicates whether the UE enables or disables the transform precoder for MsgA transmission.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was received with DCI format 0_0, the UE may, for this PUSCH transmission, consider the transform precoding either enabled or disabled according to the RRC parameter msg3-transformPrecoder.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 00, and if the UE is configured with the RRC parameter transformPrecoder in pusch-Config, the UE may, for this PUSCH transmission, consider the transform precoding either enabled or disabled according to this parameter (i.e. configured transformPrecoder).

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 00, and if the UE is configured with the RRC parameters transformPrecoder and dynamicSwitchingTransformPrecoder set to 'disabled' in pusch-Config, the UE may, for this PUSCH transmission, consider the transform precoding either enabled or disabled according to the RRC parameter transformPrecoder.

"The DCI with the scheduling grant was not received with DCI format 00" may mean that "the DCI with the scheduling grant was received with a DCI format other than the DCI format 0_0". Or "the DCI with the scheduling grant was not received with DCI format 00" may mean that "the scheduling grant was received with a configured grant".

The RRC parameter dynamicSwitchingTransformPrecoder indicates whether or not the 'transform precoding indicator' field (also referred to as transform precoding field or transform precoder field) is included in the DCI format 0_1/0_2. Alternatively, two different RRC parameters dynamicSwitchingTransformPrecoderDCI0_1 and dynamicSwitchingTransformPrecoderDCI0_2 indicate whether or not the 'transform precoding indicator' field (also referred to as transform precoding field) is included in the DCI format 0_1 and DCI 0_2, respectively. In this case, the RRC parameter dynamicSwitchingTransformPrecoder described here after may be interpreted as the RRC parameters dynamicSwitchingTransformPrecoderDCI0_1 and dynamicSwitchingTransformPrecoderDCI0_2 for DCI format 0_1 and DCI format 0_2, respectively.

The 'transform precoding indicator' field is used for indicating whether or not the transform precoder is enabled.

The RRC parameter dynamicSwitchingTransformPrecoder may be configured as a common parameter for different DCI formats.

The RRC parameter dynamicSwitchingTransformPrecoder may be configured for the DCI format 0_1 and the DCI format 0_2, respectively. In other words, the RRC parameter dynamicSwitchingTransformPrecoder corresponding to each of DCI formats may be configured. If the UE is configured with the RRC parameters dynamicSwitchingTransformPrecoder corresponding to each of DCI formats, the UE may assume that he 'transform precoding indicator' field may be included in the corresponding DCI format(s), respectively.

If the RRC parameter dynamicSwitchingTransformPrecoder indicates 'enabled', the 'transform precoding indicator' field may be included in the DCI format 0_1/0_2. If the RRC parameter dynamicSwitchingTransformPrecoder indicates 'disabled', the 'transform precoding indicator' field may not be included in the DCI format 0_1/0_2.

If the RRC parameter dynamicSwitchingTransformPrecoder is configured, the UE may assume that the 'transform precoding indicator' field may be included in the DCI format 0_1/0_2. The RRC parameter dynamicSwitchingTransformPrecoder may indicate that the 'transform precoding indicator' field is included in the DCI format 0_1/0_2, if provided.

If the RRC parameter dynamicSwitchingTransformPrecoder is not configured/absent, the UE may assume that the 'transform precoding indicator' field may not be included in the DCI format 0_1/0_2.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 00, and if the UE is configured with the RRC parameters transformPrecoder and dynamicSwitchingTransformPrecoder set to 'enabled' in pusch-Config, the UE may, for this PUSCH transmission, consider the transform precoding either enabled or disabled according to the DCI 'transform precoding indicator' field.

Alternatively, for PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0, and if the UE is configured with the RRC parameters transformPrecoder and dynamicSwitchingTransformPrecoder set to 'enabled' in pusch-Config, the UE may, for this PUSCH transmission, consider the transform precoding either enabled or disabled according to the DCI 'transform precoding indicator' field, irrespective of the value of the transformPrecoder.

Alternatively, for PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0, and if the UE is configured with the RRC parameters transformPrecoder set to 'enabled' and dynamicSwitchingTransformPrecoder set to 'enabled' in pusch-Config, the UE may, for this PUSCH transmission, consider the transform precoding either enabled or disabled according to the DCI 'transform precoding indicator' field.

The UE may assume that the DCI 'transform precoding indicator' field is not included in the DCI format 0_0.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 00, and if the UE is not configured with the RRC parameter transformPrecoder in pusch-Config, the UE may, for this PUSCH transmission, consider the transform precoding either enabled or disabled according to the RRC parameter msg3-transformPrecoder.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0 and if the UE is not configured with the RRC parameters transformPrecoder and dynamicSwitchingTransformPrecoder set to 'enabled' in pusch-Config, the UE may, for this PUSCH transmission, consider the transform precoding either enabled or disabled according to the higher layer configured parameter msg3-transformPrecoder.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0 and if the UE is not configured with the RRC parameters transformPrecoder and dynamicSwitchingTransformPrecoder in pusch-Config, the UE may, for this PUSCH transmission, consider the transform precoding either enabled or disabled according to the higher layer configured parameter msg3-transformPrecoder.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 00, if the UE is not configured with the RRC parameters transformPrecoder and if the UE is configured with dynamicSwitchingTransformPrecoder set to 'disabled' in pusch-Config, the UE may, for this PUSCH transmission, consider the transform precoding either enabled or disabled according to the RRC parameter msg3-transformPrecoder.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 00, and if the UE is not configured with the RRC parameter transformPrecoder in pusch-Config and if the UE is configured with the RRC parameter dynamicSwitchingTransformPrecoder set to 'enabled' in pusch-Config, the UE may, for this PUSCH transmission, consider the transform precoding either enabled or disabled according to the DCI 'transform precoding indicator' field.

The feature of the DCI 'transform precoding indicator' field may be realized by using the DCI field other than 'transform precoding indicator' field. In other words, if UE is configured with the RRC parameter dynamicSwitchingTransformPrecoder set to 'enabled' in pusch-Config, a first value of a first DCI field may indicate that the transform precoder is enabled, and a second value of the first DCI field may indicate that the transform precoder is disabled. The UE may assume that the value(s) of the first DCI field included in the DCI format are associated with whether or not the transform precoder is enabled.

If the base station provides the RRC parameter dynamicSwitchingTransformPrecoder set to 'enabled' in pusch-Config, a first value of a first DCI field may be set for indicating that the transform precoder is enabled, and a second value of the first DCI field may be set for indicating that the transform precoder is disabled.

For PUSCH transmission with a configured grant, if the UE is configured with the RRC parameter transformPrecoder in configuredGrantConfig, the UE may, for this PUSCH transmission, consider the transform precoding either enabled or disabled according to this parameter.

For PUSCH transmission with a configured grant, if the UE is not configured with the RRC parameter transformPrecoder in configuredGrantConfig, the UE may, for this PUSCH transmission, consider the transform precoding either enabled or disabled according to the higher layer configured parameter msg3-transformPrecoder.

Here, "the dynamicSwitchingTransformPrecoder is configured" may have a same meaning as "the dynamicSwitchingTransformPrecoder set to 'enabled' is configured". And "the dynamicSwitchingTransformPrecoder is not configured" may have a same meaning as "the dynamicSwitchingTransformPrecoder set to 'disabled' is configured".

Alternatively or additionally, the dynamic switching from DFT-S-OFDM (i.e., OFDM with Transform Precoder) to OFDM (i.e., OFDM without Transform Precoder) may not be allowable, while the dynamic switching from OFDM to DFT-S-OFDM may be allowable. OFDM may be also referred to as CP-OFDM (Cyclic Prefix-OFDM) which means OFDM with CP.

The DCI format 0_1 and/or 0_2 with CRC scrambled by a C-RNTI may include the 'transform precoding indicator' field in the case when the RRC parameter dynamicSwitchingTransformPrecoder in pusch-Config is provided. The DCI format 0_1 and/or 0_2 may not include the 'transform precoding indicator' field in the case when the RRC parameter dynamicSwitchingTransformPrecoder in pusch-Config is not provided. The RRC parameter dynamicSwitchingTransformPrecoder may be configured in the case when the RRC parameter transformPrecoder set to 'enabled' in pusch-Config is provided. The RRC parameter dynamicSwitchingTransformPrecoder may not be allowed/expected to be configured in the case when the RRC parameter transformPrecoder set to 'enabled' in pusch-Config is not provided. The DCI format 0_1 and/or 0_2 with CRC scrambled by a C-RNTI may include the 'transform precoding indicator' field in the case when the RRC parameter transformPrecoder set to 'enabled' in pusch-Config is provided. The DCI format 0_1 and/or 0_2 with CRC scrambled by a C-RNTI may not be allowed/expected to include the 'transform precoding indicator' field in the case when the RRC parameter transformPrecoder set to 'enabled' in pusch-Config is not provided. Note that the DCI format 0_1 and/or 0_2 with CRC scrambled by a C-RNTI may be a UL grant which dynamically schedules a PUSCH transmission.

The DCI format 00, 0_1 and/or 0_2 with CRC scrambled by a CS-RNTI may include the 'transform precoding indicator' field in the case when the RRC parameter dynamicSwitchingTransformPrecoder in pusch-Config is provided. The DCI format 0_1 and/or 0_2 may not include the 'transform precoding indicator' field in the case when the RRC parameter dynamicSwitchingTransformPrecoder in pusch-Config is not provided. The RRC parameter dynamicSwitchingTransformPrecoder may be configured in the case when the RRC parameter transformPrecoder set to 'enabled' in ConfiguredGrantConfig is provided. The RRC parameter dynamicSwitchingTransformPrecoder may not be allowed/expected to be configured in the case when the RRC parameter transformPrecoder set to 'enabled' in ConfiguredGrantConfig is not provided. The DCI format 0_1 and/or 0_2 with CRC scrambled by a CS-RNTI may include the 'transform precoding indicator' field in the case when the RRC parameter transformPrecoder set to 'enabled' in ConfiguredGrantConfig is provided. The DCI format 0_1 and/or 0_2 with CRC scrambled by a CS-RNTI may not be allowed/expected to include the 'transform precoding indicator' field in the case when the RRC parameter transformPrecoder set to 'enabled' in ConfiguredGrantConfig is not provided. Note that the DCI format 0_1 and/or 0_2 with CRC scrambled by a CS-RNTI may be a configured UL grant Type 2 which activates configured scheduled PUSCH transmissions.

In this case, the value of the 'transform precoding indicator' field may indicate whether transform precoder applies or not, even when the transform precoder is not enabled by the RRC parameter transformPrecoder. The 'transform precoding indicator' field may be a 1-bit field. The 'transform precoding indicator' field value equal to "0" may indicate that the transform precoder does not apply (the transform precoder is actually disabled) (i.e., to follow the RRC configuration about the transform precoder) to the PUSCH scheduled by the DCI format or to the PUSCH with a configured UL grant Type 2, while the 'transform precoding indicator' field value equal to "1" may indicate that the transform precoder applies (the transform precoder is actually enabled) (i.e., not to follow the RRC configuration about the transform precoder) to the PUSCH scheduled by the DCI format or to the PUSCH with a configured UL grant Type 2. Alternatively, the 'transform precoding indicator' field value equal to "1" may indicate that the transform precoder does not apply (the transform precoder is actually disabled) (i.e., to follow the RRC configuration about the transform precoder) to the PUSCH scheduled by the DCI format or to the PUSCH with a configured UL grant Type 2, while the 'transform precoding indicator' field value equal to "0" may indicate that the transform precoder applies (the transform precoder is actually enabled) (i.e., not to follow the RRC configuration about the transform precoder) to the PUSCH scheduled by the DCI format or to the PUSCH with a configured UL grant Type 2.

DCI format 0_0 may not include the 'transform precoding indicator' field irrespective of whether the RRC parameter transformPrecoder set to 'enabled' is provided or not or irrespective of whether the RRC parameter dynamicSwitchingTransformPrecoder is provided or not. For the PUSCH scheduled by the DCI format 0_0 or configured scheduled PUSCH activated by DCI format 00, whether the transform precoder is actually enable or not follows whether RRC parameter transformPrecoder is set to 'enabled' or not. In other words, if RRC parameter transformPrecoder set to 'enabled' is provided, the transport precoding applies to the PUSCH. If RRC parameter transformPrecoder set to 'enabled' is not provided, the transport precoding does not apply to the PUSCH.

It is noted that the transform precoding is a precoding which is applied to the output of layer mapping and/or to the input of the precoding matrix W based precoding, where the index of the precoding matrix W may correspond to precoding matrix indicator. For the single codeword q=0, the complex-valued modulation symbols for the codeword to be transmitted may be mapped onto up to four layers. Complex-valued modulation symbols $d^{(q)}(0), \ldots, d^{(q)} (M_{sybm}^{(q)}-1)$ for codeword q may be mapped onto the layers $x(i)= [x^{(0)}(i) \ldots x^{(v-1)}(i)]^T, i=0,1, \ldots, M_{symb}^{layer}-1$ where v is the number of layers and $M_{symb}^{layer}$ is the number of modulation symbols per layer.

If transform precoding is not enabled (i.e., is not applied), $y^{(\lambda)}(i)=x^{(\lambda)}(i)$ for each layer $\lambda=0,1, \ldots, v-1$. If transform precoding is enabled (i.e., is applied), v=1 and $\tilde{x}^{(0)}(i)$ may depend on the configuration of phase-tracking reference signals. If phase-tracking reference signals are not being used, the block of complex-valued symbols $x^{(0)}(0), \ldots, x^{(0)} (M_{symb}^{layer}-1)$ for the single layer $\lambda=0$ may be divided into $M_{symb}^{layer}/M_{sc}^{PUSCH}$ sets, each corresponding to one OFDM symbol and $\tilde{x}^{(0)}(i)=x^0 (i)$. If phase-tracking reference signals are being used, the block of complex-valued symbols $x^{(0)}(0), \ldots, x^{(0)} (M_{symb}^{layer}-1)$ may be divided into sets, each set corresponding to one OFDM symbol, and where set l contains $M_{sc}^{PUSCH}-\varepsilon_i N_{samp}^{group} N_{group}^{PTRS}$ symbols and is mapped to the complex-valued symbols $\tilde{x}^{(0)}(lM_{sc}^{PUSCH}+i')$ corresponding to OFDM symbol l prior to transform precoding, with $i' \in \{0,1,\ldots,M_{sc}^{PUSCH}-1\}$ and $i' \neq m$. m is the index of PT-RS samples in set l, $N_{samp}^{group}$ is the number of samples per PT-RS group, and $N_{group}^{PT-RS}$ is the number of PT-RS groups. The quantity $\varepsilon_i=1$ when OFDM symbol l contains one or more PT-RS samples, otherwise $\varepsilon_i=0$.

As also shown in FIG. 10, transform precoding may be applied according to $$y^{(0)}\left(l \cdot M_{sc}^{PUSCH} + k\right) = \frac{1}{\sqrt{M_{sc}^{PUSCH}}} \sum_{i=0}^{M_{sc}^{PUSCH}-1} \tilde{x}^{(0)}\left(l \cdot M_{sc}^{PUSCH} + i\right) e^{-j\frac{2\pi ik}{M_{sc}^{PUSCH}}}$$

$$k = 0, \ldots, M_{sc}^{PUSCH} - 1$$

$$l = 0, \ldots, M_{symb}^{layer}/M_{sc}^{PUSCH} - 1$$

(i.e., applying Digital Fourier Transformation to) $\tilde{x}^{(0)}(i)$ ), resulting in a block of complex-valued symbols $y^{(0)}$ (0), . . . . , $y^{(0)}$ $M_{symb}^{layer}-1$). The variable $M_{sc}^{PUSCH}=M_{RB}^{PUSCH} \cdot M_{sc}^{RB}$, where $M_{RB}^{PUSCH}$ represents the bandwidth of the PUSCH in terms of resource blocks, and may fulfil $M_{RB}^{PUSCH}=2^{\alpha_2}, 3^{\alpha_3}, 5^{\alpha_5}$ where $\alpha_2, \alpha_3, \alpha_5$ is a set of non-negative integers.

The block of vectors $[y^{(0)}(i) \ldots y^{(v-1)}(i)]^T$, i=0,1, . . . $M_{symb}^{layer}-1$ may be precoded according to $$\begin{bmatrix} z^{(p_0)}(i) \\ \vdots \\ z^{(p_{P-1})}(i) \end{bmatrix} = W \begin{bmatrix} y^{(0)}(i) \\ \vdots \\ y^{(v-1)}(i) \end{bmatrix},$$

where i=0,1, . . . , $M_{symb}^{ap}-1$, $M_{symb}^{ap}=M_{symb}^{layer}$ and $\{p_0, \ldots p_{P-1}\}$ the set of antenna ports. W is the precoding matrix.

Table 1 shows the sizes of information fields in DCI format 0_1 and the RRC parameter(s) which affect each field size. Table 2 shows the sizes of information fields in DCI format 0_2 and the RRC parameter(s) which affect each field size.

TABLE 1

| Sizes of information fields in DCI format 0_1 | |
| --- | --- |
| Field in DCI format 0_1 | RRC parameters which affect field size |
| Identifier for DCI formats - 1 bit | N/A |
| Carrier indicator - 0 or 3 bits | schedulingCellInfo |
| DFI flag - 0 or 1 bit | N/A (affected only by whether to operate with shared spectrum channel access or not) |
| UL/SUL indicator - 0 or 1 bit | supplementaryUplink |
| Bandwidth part indicator - 0, 1 or 2 bits | uplinkBWP-ToReleaseList, uplinkBWP-ToAddModList |
| Frequency domain resource assignment | resourceAllocation, rbg-Size, locationAndBandwidth |
| Time domain resource assignment - 0, 1, 2, 3, 4, 5, or 6 bits | pusch-TimeDomainAllocationListDCI-0-1, pusch-TimeDomainAllocationListForMultiPUSCH, pusch-TimeDomainResourceAllocationListForMultiPUSCH-r17, pusch-TimeDomainAllocationList |
| Frequency hopping flag - 0 or 1 bit | resourceAllocation, frequencyHopping, pusch-RepTypeIndicatorDCI-0-1, frequencyHoppingDCI-0-1 |
| Modulation and coding scheme - 5 bits | N/A |
| New data indicator - 1, 2, 3, 4, 5, 6, 7 or 8 bits | pusch-TimeDomainAllocationListForMultiPUSCH, pusch-TimeDomainResourceAllocationListForMultiPUSCH-r17 |
| Redundancy version - 2, 3, 4, 5, 6, 7 or 8 bits | pusch-TimeDomainAllocationListForMultiPUSCH, pusch-TimeDomainResourceAllocationListForMultiPUSCH-r17 |
| HARQ process number - 4 or 5 bits | harq-ProcessNumberSizeDCI-0-1 |
| 1st downlink assignment index - 1, 2 or 4 bits | pdsch-HARQ-ACK-Codebook, pdsch-HARQ-ACK-CodebookList, pdsch-HARQ-ACK-Codebook-secondaryPUCCHgroup, pdsch-HARQ-ACK-Codebook-Multicast, fdmed-Reception-Multicast, UL-TotalDAI-Included |
| 2nd downlink assignment index - 0, 2 or 4 bits | pdsch-HARQ-ACK-Codebook-r16, UL-TotalDAI-Included |
| 3rd downlink assignment index - 0, 1 or 2 bits | pdsch-HARQ-ACK-Codebook-Multicast, fdmed-Reception-Multicast |
| TPC command for scheduled PUSCH - 2 bits | N/A |
| Second TPC command for scheduled PUSCH - 0 or 2 bits | SecondTPCFieldDCI-0-1 |
| SRS resource set indicator - 0 or 2 bits | txConfig, srs-ResourceSetToAddModList, usage |
| SRS resource indicator | txConfig, srs-ResourceSetToAddModList, usage, maxMIMO-Layers |
| Second SRS resource indicator | txConfig, maxMIMO-Layers |

TABLE 1-continued

| Sizes of information fields in DCI format 0__1 | |
| --- | --- |
| Field in DCI format 0__1 | RRC parameters which affect field size |
| Precoding information and number of layers | txConfig, ul-FullPowerTransmission, transformPrecoder, maxRank, codebookSubset |
| Second Precoding information | txConfig, ul-FullPowerTransmission, transformPrecoder, maxRank, codebookSubset |
| Antenna ports | transformPrecoder, dmrs-Type, maxLength, dmrs-UplinkTransformPrecoding, tp-pi2BPSK, txConfig, dmrs-UplinkForPUSCH-MappingTypeA, dmrs-UplinkForPUSCH-MappingTypeB |
| SRS request - 2 or 3 bits | supplementaryUplink |
| SRS offset indicator - 0, 1 or 2 bits | AvailableSlotOffset |
| CSI request - 0, 1, 2, 3, 4, 5, or 6 bits | reportTriggerSize |
| CBG transmission information (CBGTI) - 0, 2, 4, 6, or 8 bit | codeBlockGroupTransmission, pusch-TimeDomainAllocationListForMultiPUSCH, pusch-TimeDomainResourceAllocationListForMultiPUSCH-r17, maxCodeBlockGroupsPerTransportBlock |
| PTRS-DMRS association - 0 or 2 bits | PTRS-UplinkConfig, transformPrecoder, maxRank |
| Second PTRS-DMRS association - 0 or 2 bits | PTRS-UplinkConfig, transformPrecoder, maxRank, txConfig, srs-ResourceSetToAddModList, usage |
| beta__offset indicator - 0 or 2 bits | betaOffsets |
| DMRS sequence initialization - 0 bit | transformPrecoder |
| UL-SCH indicator - 0 or 1 bit | pusch-TimeDomainAllocationListForMultiPUSCH, pusch-TimeDomainResourceAllocationListForMultiPUSCH-r17 |
| ChannelAccess-CPext-CAPC - 0, 1, 2, 3, 4, 5 or 6 bits | ul-AccessConfigListDCI-0-1, channelAccessMode-r16 |
| Open-loop power control parameter set indication - 0 or 1 or 2 bits | p0-PUSCH-SetList, txConfig, srs-ResourceSetToAddModList, usage, olpc-ParameterSetDCI-0-1 |
| Priority indicator - 0 or 1 bit | priorityIndicatorDCI-0-1 |
| Invalid symbol pattern indicator - 0 or 1 bit | invalidSymbolPatternIndicatorDCI-0-1 |
| Minimum applicable scheduling offset indicator - 0 or 1 bit | minimumSchedulingOffsetK2 |
| SCell dormancy indication - 0, 1, 2, 3, 4 or 5 bits | dormancyGroupWithinActiveTime |
| Sidelink assignment index - 0, 1 or 2 bits | pdsch-HARQ-ACK-Codebook, rrc-ConfiguredSidelinkGrant-r16, SL-ScheduledConfig-r16 |
| PDCCH monitoring adaptation indication - 0, 1 or 2 bits | searchSpaceGroupIdList-r17, pdcch-SkippingDurationList |

TABLE 2

| Sizes of information fields in DCI format 0__2 | |
| --- | --- |
| Field in DCI format 0__1 | RRC parameters which affect field size |
| Identifier for DCI formats - 1 bit | N/A |
| Carrier indicator - 0 or 3 bits | carrierIndicatorSizeDCI-0-2 |
| UL/SUL indicator - 0 or 1 bit | supplementaryUplink |
| Bandwidth part indicator - 0, 1 or 2 bits | uplinkBWP-ToReleaseList, uplinkBWP-ToAddModList |
| Frequency domain resource assignment | resourceAllocationDCI-0-2-r16, rbg-Size, locationAndBandwidth |
| Time domain resource assignment - 0, 1, 2, 3, 4, 5, or 6 bits | pusch-TimeDomainAllocationListDCI-0-2, pusch-TimeDomainAllocationList |
| Frequency hopping flag - 0 or 1 bit | frequencyHoppingDCI-0-2 |
| Modulation and coding scheme - 5 bits | N/A |
| New data indicator - 1 bit | N/A |

TABLE 2-continued

| Sizes of information fields in DCI format 0__2 | |
| --- | --- |
| Field in DCI format 0_1 | RRC parameters which affect field size |
| Redundancy version - 0, 1 or 2 bits | numberOfBitsForRV-DCI-0-2 |
| HARQ process number - 0, 1, 2, 3, 4 or 5 bits | harq-ProcessNumberSizeDCI-0-2-v1700, harq-ProcessNumberSizeDCI-0-2 |
| Downlink assignment index - 0, 1 or 2 bits | downlinkAssignmentIndexDCI-0-2, pdsch-HARQ-ACK-Codebook, pdsch-HARQ-ACK-CodebookList, pdsch-HARQ-ACK-Codebook-secondaryPUCCHgroup, pdsch-HARQ-ACK-Codebook-Multicast, fdmed-Reception-Multicast |
| TPC command for scheduled PUSCH - 2 bits | N/A |
| Second TPC command for scheduled PUSCH - 0 or 2 bits | SecondTPCFieldDCI-0-2 |
| SRS resource set indicator - 0 or 2 bits | txConfig, srs-ResourceSetToAddModListDCI-0-2, usage |
| SRS resource indicator | txConfig, srs-ResourceSetToAddModListDCI-0-2, usage |
| Second SRS resource indicator | txConfig, maxMIMO-LayersDCI-0-2 |
| Precoding information and number of layers | txConfig, ul-FullPowerTransmission, transformPrecoder, maxRankDCI-0-2, codebookSubsetDCI-0-2 |
| Second Precoding information | txConfig, ul-FullPowerTransmission, transformPrecoder, maxRankDCI-0-2, codebookSubsetDCI-0-2 |
| Antenna ports | antennaPortsFieldPresenceDCI-0-2, transformPrecoder, dmrs-Type, maxLength, dmrs-UplinkTransformPrecoding, tp-pi2BPSK, txConfig, dmrs-UplinkForPUSCH-MappingTypeA-DCI-0-2, dmrs-UplinkForPUSCH-MappingTypeB-DCI-0-2 |
| SRS request - 0, 1, 2 or 3 bits | srs-RequestDCI-0-2, supplementaryUplink |
| SRS offset indicator - 0, 1 or 2 bits | AvailableSlotOffset |
| CSI request - 0, 1, 2, 3, 4, 5, or 6 bits | reportTriggerSizeDCI-0-2 |
| PTRS-DMRS association - 0 or 2 bits | PTRS-UplinkConfig, transformPrecoder, maxRankDCI-0-2 |
| Second PTRS-DMRS association - 0 or 2 bits | PTRS-UplinkConfig, transformPrecoder, maxRankDCI-0-2, txConfig, srs-ResourceSetToAddModListDCI-0-2, usage |
| beta__offset indicator - 0, 1 or 2 bits | betaOffsets, dynamicDCI-0-2 |
| DMRS sequence initialization - 0 bit | transformPrecoder, dmrs-SequenceInitializationDCI-0-2 |
| UL-SCH indicator - 0 or 1 bit | pusch-TimeDomainAllocationListForMultiPUSCH, pusch-TimeDomainResourceAllocationListForMultiPUSCH-r17 |
| ChannelAccess-CPext-CAPC - 0, 1, 2, 3, 4, 5 or 6 bits | ul-AccessConfigListDCI-0-2, channelAccessMode-r16 |
| Open-loop power control parameter set indication - 0 or 1 or 2 bits | p0-PUSCH-SetList, txConfig, srs-ResourceSetToAddModListDCI-0-2, usage, olpc-ParameterSetDCI-0-2 |
| Priority indicator - 0 or 1 bit | priorityIndicatorDCI-0-2 |
| Invalid symbol pattern indicator - 0 or 1 bit | invalidSymbolPatternIndicatorDCI-0-2 |
| PDCCH monitoring adaptation indication - 0, 1 or 2 bits | searchSpaceGroupIdList-r17, pdcch-SkippingDurationList |

According to Table 1, it can be seen that sizes of the following information fields in DCI format 0_1 may change depending on waveform of the scheduled PUSCH: Precoding information and number of layers; Second Precoding information; Antenna ports; PTRS-DMRS association; Second PTRS-DMRS association; and DMRS sequence initialization. According to Table 2, it can be seen that sizes of the following information fields in DCI format 0_2 may change depending on waveform of the scheduled PUSCH: Precoding information and number of layers; Second Precoding information; Antenna ports; PTRS-DMRS association; Second PTRS-DMRS association; and DMRS sequence initialization.

Figure 11:
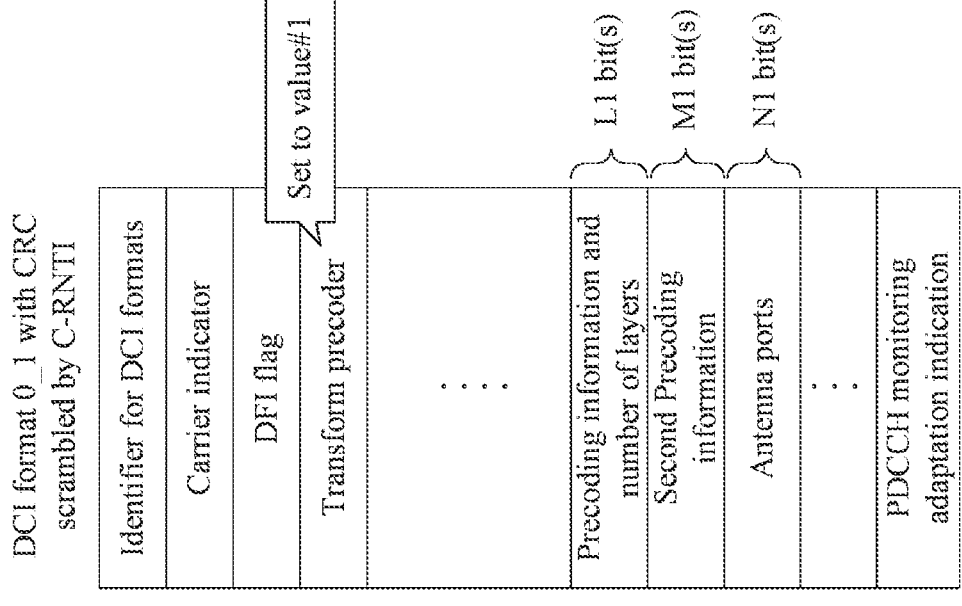
FIG. 11 shows an example of payload size of DCI format 0_1 with CRC scrambled by C-RNTI prior to bit padding.
Figure 11:
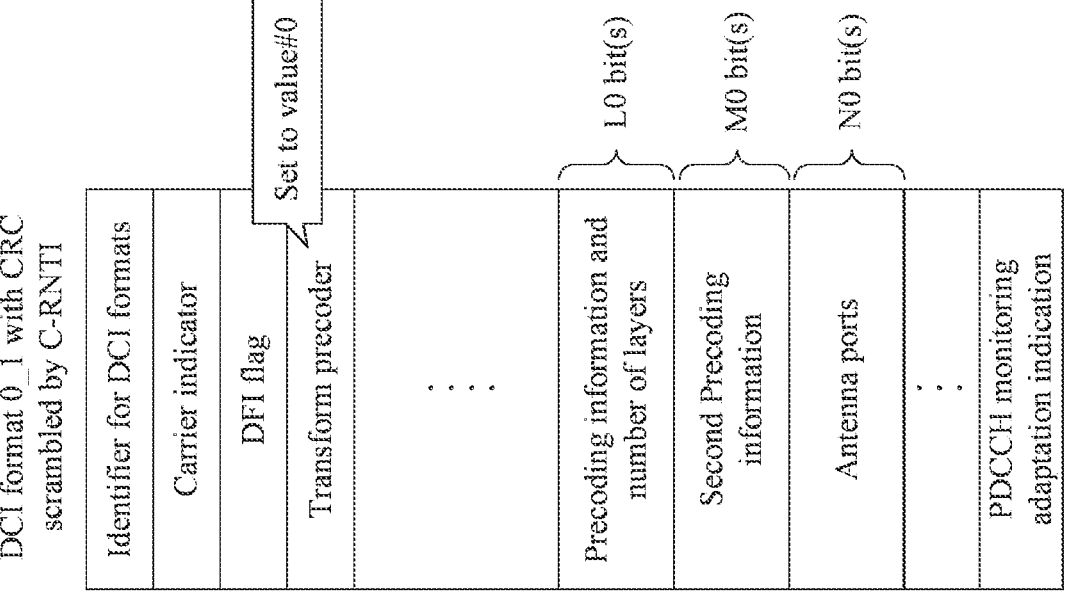

FIG. 11 shows an example of payload size of DCI format 0_1 with CRC scrambled by C-RNTI prior to bit padding. This may be an example where the RRC parameter dynamicSwitchingTransformPrecoder is provided, and bit width(s) of some information field(s) (e.g., Precoding information and number of layers, Second Precoding information and/or Antenna ports), prior to bit padding, in the DCI format may depend on the value set in transform precoder field. Value #0

(e.g. 0) may indicate the transform precoding is disabled (or the transform precoding is not enabled), while Value #1 (e.g. 1) may indicate the transform precoding is enabled.

If transform precoder field is set to value #0, the sizes of Precoding information and number of layers, Second Precoding information and/or Antenna ports may be L0, M0 and/or N0 bits, respectively. If transform precoder field is set to value #1, the sizes of Precoding information and number of layers, Second Precoding information and/or Antenna ports may be L1, M1 and/or N1 bits, respectively.

L0 may be larger than or equal to L1, M0 may be larger than or equal to M1, N0 may be larger than or equal to N1. Alternatively or additionally, L0+M0+N0 may be larger than or equal to L1+M1+N1.

Figure 12:
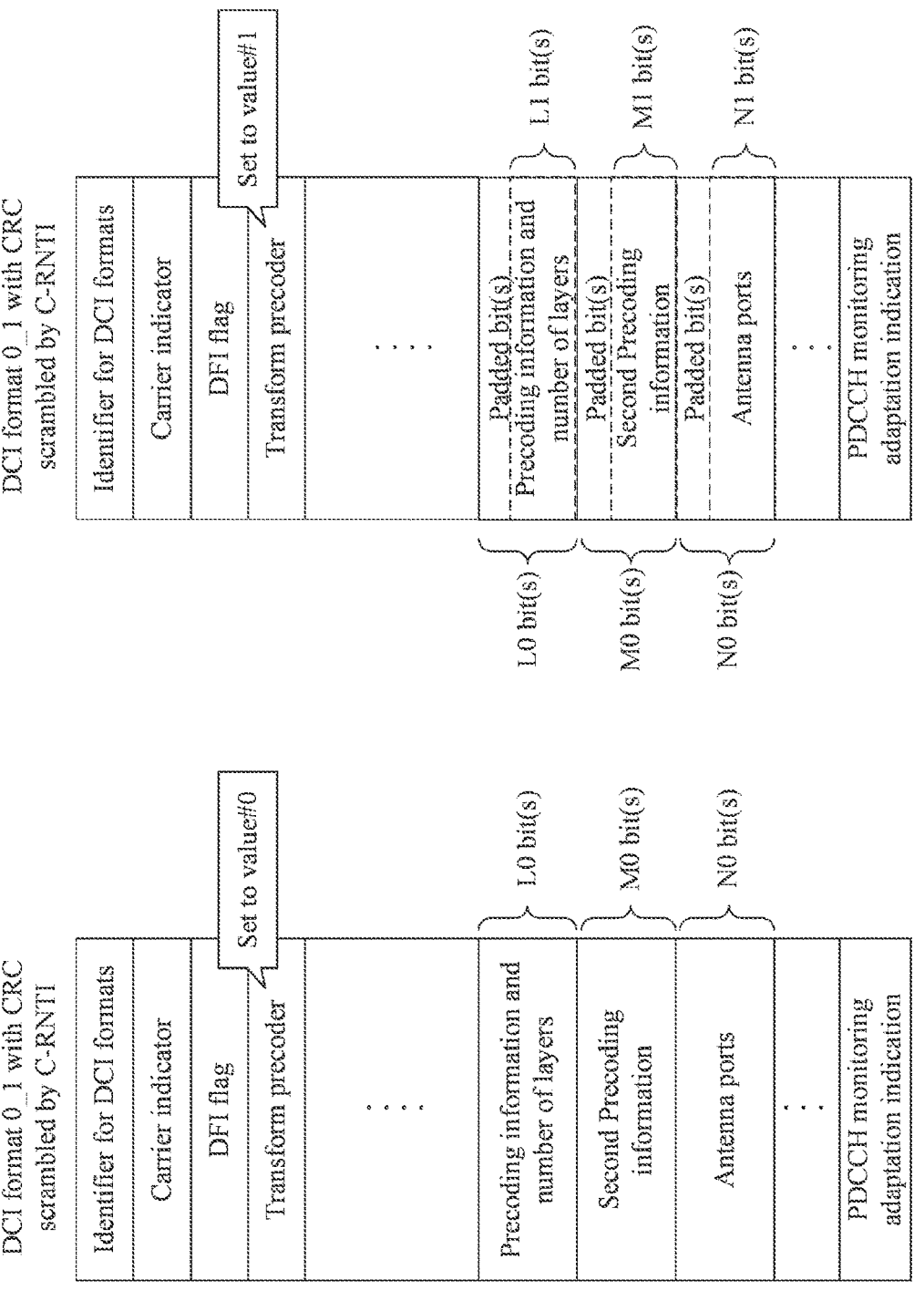
FIG. 12 shows an example of payload size of DCI format 0_1 with CRC scrambled by C-RNTI after bit field size alignments.

FIG. 12 shows an example of payload size of DCI format 0_1 with CRC scrambled by C-RNTI after bit field size alignments. For the UE configured with a transform precoder field in DCI format 0_1 (i.e., the RRC parameter dynamicSwitchingTransformPrecoder is provided), if the bit width of a field in the DCI format 0_1 with CRC scrambled by C-RNTI and with the value of its transform precoder field set to 0 (value #0) is not equal to that of the corresponding field in the DCI format 0_1 with CRC scrambled by C-RNTI and with the value of its transform precoder field set to 1 (value #1) for the same serving cell, a number of most significant bits with value set to '0' are inserted to the field in DCI format 0_1 with CRC scrambled by C-RNTI and with the value of its transform precoder field set to 1 (value #1) until the bit width equals that of the corresponding field in the DCI format 0_1 with CRC scrambled by C-RNTI and with the value of its transform precoder field set to 0 (value #0) for the same serving cell. If L0 is larger than L1, L0-L1 bit(s) may be inserted (bit padded) to Precoding information and number of layers field. If M0 is larger than M1, M0-M1 bit(s) may be inserted (bit padded) to Second Precoding information field. If N0 is larger than N1, N0-N1 bit(s) may be inserted (bit padded) to Antenna ports field. With this bit field size alignments, the payload size of the DCI format 0_1 with CRC scrambled by C-RNTI is the same for the case with the transform precoder field set to 0 and the case with the transform precoder field set to 1.

In another example of field size alignments, each field size may be aligned to the larger one. For the UE configured with a transform precoder field in DCI format 0_1, if the bit width of a field in the DCI format 0_1 with CRC scrambled by C-RNTI and with the value of its transform precoder field set to 0 (value #0) is not equal to that of the corresponding field in the DCI format 0_1 with CRC scrambled by C-RNTI and with the value of its transform precoder field set to 1 (value #1) for the same serving cell, a number of most significant bits with value set to '0' are inserted to the field in DCI format 0_1 with CRC scrambled by C-RNTI and with smaller size until the bit width of the field is the same for DCI format 0_1 with CRC scrambled by C-RNTI and with the value of its transform precoder field set to 0 (value #0) and DCI format 0_1 with CRC scrambled by C-RNTI and with the value of its transform precoder field set to 1 (value #1).

In either example, the UE may attempt decoding of PDCCH assuming DCI payload sizes after the size alignments. The UE may remove padded bit(s) from those fields and then determine what values were set in those fields. In other words, the UE may assume the value ranges of the fields are determined by the field bit widths not including the padded bits.

Figure 13:
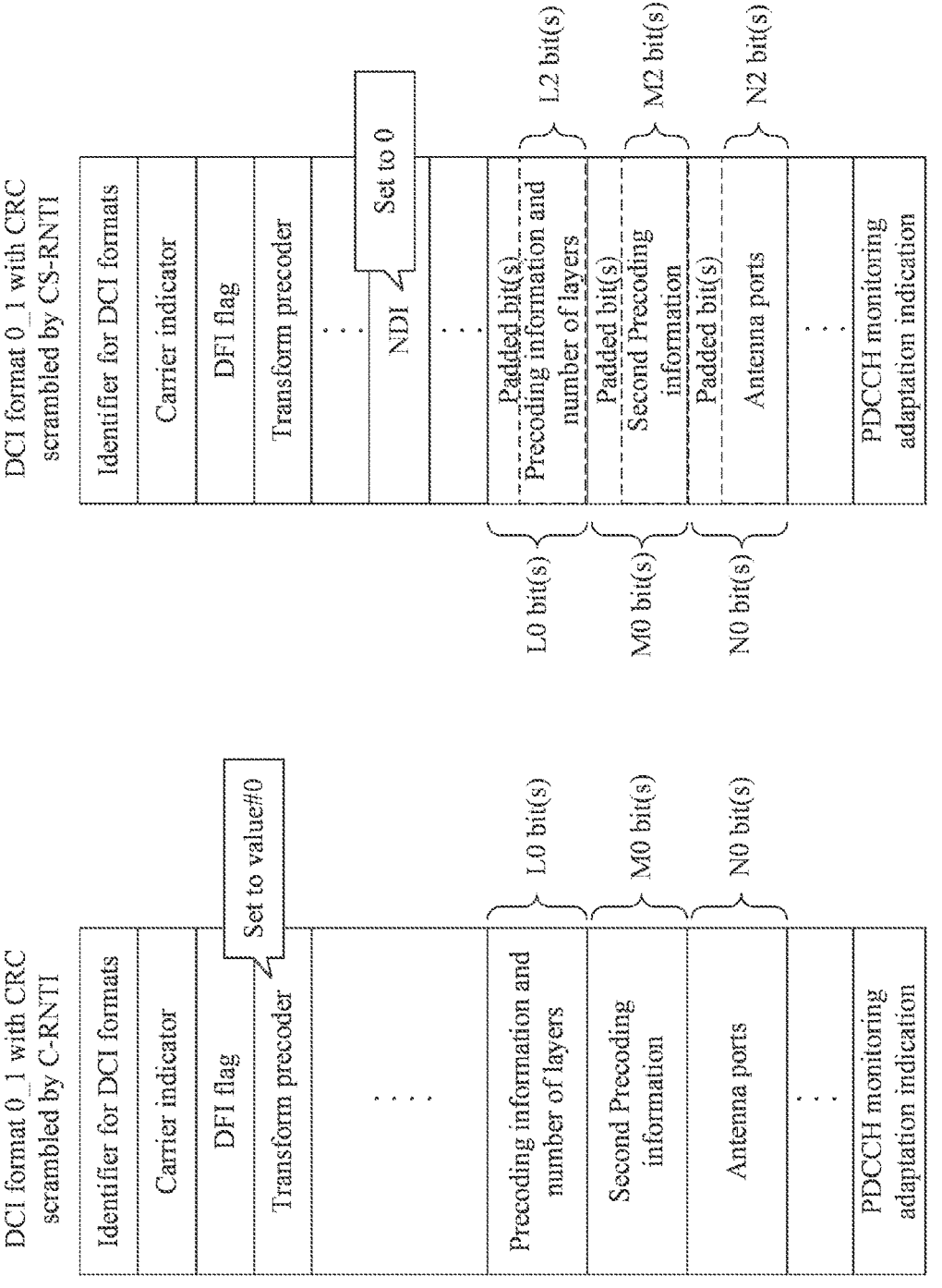
FIG. 13 shows an example of bit field size alignments between DCI format 0_1 with CRC scrambled by C-RNTI and DCI format 0_1 with NDI=0 with CRC scrambled by CS-RNTI.

FIG. 13 shows an example of bit field size alignments between DCI format 0_1 with CRC scrambled by C-RNTI and DCI format 0_1 with NDI=0 with CRC scrambled by CS-RNTI. After the field size alignment between DCI format 0_1 with the transform precoder value set to 0 with CRC scrambled by C-RNTI and DCI format 0_1 with the transform precoder value set to 1 with CRC scrambled by C-RNTI, the sizes of Precoding information and number of layers, Second Precoding information and/or Antenna ports may be L0, M0 and/or N0 bits, respectively, as shown in the left-side part of the figure.

The sizes of some information fields (e.g. Precoding information and number of layers; Second Precoding information; Antenna ports; PTRS-DMRS association; Second PTRS-DMRS association; and DMRS sequence initialization) in the DCI format 0_1 with CRC scrambled by CS-RNTI may change depending on the value of NDI field in the same DCI format and/or waveform.

The sizes of these fields, prior to bit padding, in the DCI format 0_1 with NDI=O with CRC scrambled by CS-RNTI may be determined based on the RRC parameter transformPrecoder contained in the RRC information element configuredGrantConf, if the RRC parameter transformPrecoder contained in the RRC information element configuredGrantConf is provided from the gNB to the UE, irrespective of whether the RRC parameter dynamicSwitchingTransformPrecoder is provided or not and/or the value of the RRC parameter dynamicSwitchingTransformPrecoder. The sizes of these fields, prior to bit padding, may be determined based on the RRC parameter msg3-transformPrecoder in RACH-ConfigCommon, if the RRC parameter transformPrecoder contained in the RRC information element configuredGrantConf is not provided from the gNB to the UE, irrespective of whether the RRC parameter dynamicSwitchingTransformPrecoder is provided or not and/or the value of the RRC parameter dynamicSwitchingTransformPrecoder. In this case, the transform precoder field may not be included in the DCI format 0_1 with CRC scrambled by CS-RNTI if dynamicSwitchingTransformPrecoder set to "enabled" is not provided, while the transform precoder field may be included in the DCI format 0_1 with CRC scrambled by CS-RNTI and the transform precoder field may be reserved if dynamicSwitchingTransformPrecoder set to "enabled" is provided at least for DCI format 0_1 with C-RNTI.

Alternatively, the sizes of these fields, prior to bit padding, in the DCI format 0_1 with NDI=0 with CRC scrambled by CS-RNTI may be determined based on the RRC parameter transformPrecoder contained in the RRC information element configuredGrantConf, if the RRC parameter transformPrecoder contained in the RRC information element configuredGrantConf is provided from the gNB to the UE, and if the RRC parameter dynamicSwitchingTransformPrecoder set to "enabled" is not configured for CG-PUSCH. The sizes of these fields, prior to bit padding, may be determined based on the RRC parameter msg3-transformPrecoder in RACH-ConfigCommon, if the RRC parameter transformPrecoder contained in the RRC information element configuredGrantConf is not provided from the gNB to the UE, and if the RRC parameter dynamicSwitchingTransformPrecoder set to "enabled" is not configured for CG-PUSCH. In these cases, the transform precoder field may not be included in the DCI format 0_1 with CRC scrambled by CS-RNTI if dynamicSwitchingTransformPrecoder set to "enabled" is not provided, while the transform precoder field may be included in the DCI format 0_1 with CRC scrambled by CS-RNTI and the transform precoder field may be reserved if dynamicSwitchingTransformPrecoder set to "enabled" is provided at least for DCI format 0_1 with C-RNTI. If the RRC parameter dynamicSwitchingTransformPrecoder set to "enabled" is configured for CG-PUSCH, the sizes of these fields, prior to bit padding, in the DCI format 0_1 with NDI=0 with CRC scrambled by CS-RNTI may be determined based on the value of transform precoding field in the same DCI format. In this case, the value of the transform precoding field may indicate whether transform precoding is enabled or disabled for the CG-PUSCH activated by this DCI format.

Before bit padding, the sizes of Precoding information and number of layers, Second Precoding information and/or Antenna ports in DCI format 0_1 with NDI=0 with CRC scrambled by CS-RNTI may be L2, M2 and/or N2 bits, respectively. As shown in the right-side part of the figure, if L0 is larger than L2, L0-L2 bit(s) may be inserted (bit padded) to Precoding information and number of layers field in the DCI format 0_1 with NDI=0 with CRC scrambled by CS-RNTI. Similarly, if M0 is larger than M2, M0-M2 bit(s) may be inserted (bit padded) to Second Precoding information field. Yet similarly, if N0 is larger than N2, N0-N2 bit(s) may be inserted (bit padded) to Antenna ports field. With this bit field size alignments, the payload size of the DCI format 0_1 with NDI=0 with CRC scrambled by CS-RNTI is the same for the DCI format 0_1 with CRC scrambled by C-RNTI after the alignment between the case with the transform precoder field set to 0 and the case with the transform precoder field set to 1.

Figure 14:
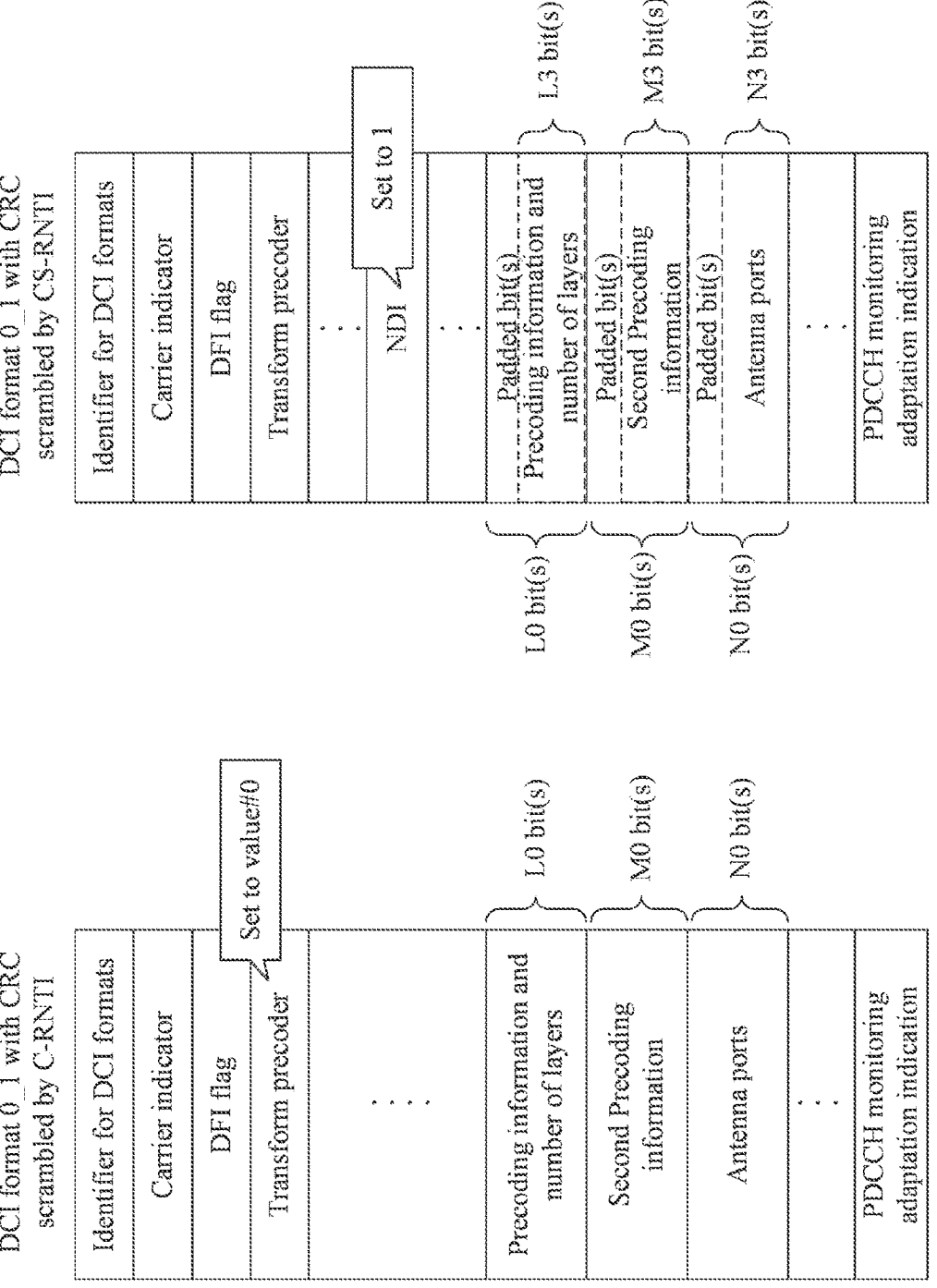
FIG. 14 shows an example of bit field size alignments between DCI format 0_1 with CRC scrambled by C-RNTI and DCI format 0_1 with NDI=1 with CRC scrambled by CS-RNTI.

FIG. 14 shows an example of bit field size alignments between DCI format 0_1 with CRC scrambled by C-RNTI and DCI format 0_1 with NDI=1 with CRC scrambled by CS-RNTI. After the field size alignment between DCI format 0_1 with the transform precoder value set to 0 with CRC scrambled by C-RNTI and DCI format 0_1 with the transform precoder value set to 1 with CRC scrambled by C-RNTI, the sizes of Precoding information and number of layers, Second Precoding information and/or Antenna ports may be L0, M0 and/or N0 bits, respectively, as shown in the left-side part of the figure.

The sizes of some information fields (e.g. Precoding information and number of layers; Second Precoding information; Antenna ports; PTRS-DMRS association; Second PTRS-DMRS association; and DMRS sequence initialization) in the DCI format 0_1 with CRC scrambled by CS-RNTI may change depending on the value of NDI field in the same DCI format and/or waveform.

The sizes of these fields, prior to bit padding, in the DCI format 0_1 with NDI=1 with CRC scrambled by CS-RNTI may be determined based on the RRC parameter transformPrecoder contained in the RRC information element PUSCH-Config, if the RRC parameter transformPrecoder contained in the RRC information element PUSCH-Config is provided from the gNB to the UE, irrespective of whether the RRC parameter dynamicSwitchingTransformPrecoder is provided or not and/or the value of the RRC parameter dynamicSwitchingTransformPrecoder. The sizes of these fields, prior to bit padding, may be determined based on the RRC parameter msg3-transformPrecoder in RACH-Config-Common, if the RRC parameter transformPrecoder contained in the RRC information element PUSCH-Config is not provided from the gNB to the UE, irrespective of whether the RRC parameter dynamicSwitchingTransform-Precoder is provided or not and/or the value of the RRC parameter dynamicSwitchingTransformPrecoder. In this case, the transform precoder field may not be included in the DCI format 0_1 with CRC scrambled by CS-RNTI if dynamicSwitchingTransformPrecoder set to "enabled" is not provided, while the transform precoder field may be included in the DCI format 0_1 with CRC scrambled by CS-RNTI and the transform precoder field may be reserved if dynamicSwitchingTransformPrecoder set to "enabled" is provided at least for DCI format 0_1 with C-RNTI.

Alternatively, the sizes of these fields, prior to bit padding, in the DCI format 0_1 with NDI=1 with CRC scrambled by CS-RNTI may be determined based on the RRC parameter transformPrecoder contained in the RRC information element PUSCH-Config, if the RRC parameter transformPrecoder contained in the RRC information element PUSCH-Config is provided from the gNB to the UE, and if the RRC parameter dynamicSwitchingTransformPrecoder set to "enabled" is not configured for DG-PUSCH. The sizes of these fields, prior to bit padding, may be determined based on the RRC parameter msg3-transformPrecoder in RACH-ConfigCommon, if the RRC parameter transformPrecoder contained in the RRC information element PUSCH-Config is not provided from the gNB to the UE, and if the RRC parameter dynamicSwitchingTransformPrecoder set to "enabled" is not configured for DG-PUSCH. In these cases, the transform precoder field may not be included in the DCI format 0_1 with CRC scrambled by CS-RNTI if dynamicSwitchingTransformPrecoder set to "enabled" is not provided, while the transform precoder field may be included in the DCI format 0_1 with CRC scrambled by CS-RNTI and the transform precoder field may be reserved if dynamicSwitchingTransformPrecoder set to "enabled" is provided at least for DCI format 0_1 with C-RNTI. If the RRC parameter dynamicSwitchingTransformPrecoder set to "enabled" is configured for DG-PUSCH, the sizes of these fields, prior to bit padding, in the DCI format 0_1 with NDI=0 with CRC scrambled by CS-RNTI may be determined based on the value of transform precoding field in the same DCI format. In this case, the value of the transform precoding field may indicate whether transform precoding is enabled or disabled for the CG-PUSCH activated by this DCI format.

Yet alternatively, the sizes of these fields, prior to bit padding, in the DCI format 0_1 with NDI=1 with CRC scrambled by CS-RNTI may be determined based on the RRC parameter transformPrecoder contained in the RRC information element PUSCH-Config, if the RRC parameter transformPrecoder contained in the RRC information element PUSCH-Config is provided from the gNB to the UE, and if the RRC parameter dynamicSwitchingTransformPrecoder set to "enabled" is not configured for CG-PUSCH. The sizes of these fields, prior to bit padding, may be determined based on the RRC parameter msg3-transformPrecoder in RACH-ConfigCommon, if the RRC parameter transformPrecoder contained in the RRC information element PUSCH-Config is not provided from the gNB to the UE, and if the RRC parameter dynamicSwitchingTransformPrecoder set to "enabled" is not configured for CG-PUSCH. In these cases, the transform precoder field may not be included in the DCI format 0_1 with CRC scrambled by CS-RNTI if dynamicSwitchingTransformPrecoder set to "enabled" is not provided, while the transform precoder field may be included in the DCI format 0_1 with CRC scrambled by CS-RNTI and the transform precoder field may be reserved if dynamicSwitchingTransformPrecoder set to "enabled" is provided at least for DCI format 0_1 with C-RNTI. If the RRC parameter dynamicSwitchingTransformPrecoder set to "enabled" is configured for CG-PUSCH, the sizes of these fields, prior to bit padding, in the DCI format 0_1 with NDI=0 with CRC scrambled by CS-RNTI may be determined based on the value of transform precoding field in the same DCI format. In this case, the value of the transform precoding field may indicate whether transform precoding is enabled or disabled for the CG-PUSCH activated by this DCI format. The UE may not expect that dynamicSwitchingTransformPrecoder set to "enabled" is not configured for DG-PUSCH and dynamicSwitchingTransformPrecoder set to "enabled" is configured for CG-PUSCH at the same time.

Before bit padding, the sizes of Precoding information and number of layers, Second Precoding information and/or Antenna ports in DCI format 0_1 with NDI=1 with CRC scrambled by CS-RNTI may be L3, M3 and/or N3 bits, respectively. As shown in the right-side part of the figure, if L0 is larger than L3, L0-L3 bit(s) may be inserted (bit padded) to Precoding information and number of layers field in the DCI format 0_1 with NDI=0 with CRC scrambled by CS-RNTI. Similarly, if M0 is larger than M3, M0-M3 bit(s) may be inserted (bit padded) to Second Precoding information field. Yet similarly, if N0 is larger than N3, N0-N3 bit(s) may be inserted (bit padded) to Antenna ports field. With this bit field size alignments, the payload size of the DCI format 0_1 with NDI=1 with CRC scrambled by CS-RNTI is the same for the DCI format 0_1 with CRC scrambled by C-RNTI after the alignment between the case with the transform precoder field set to 0 and the case with the transform precoder field set to 1.

The aforementioned procedures can be also described as follows. The UE may not expect that the bit width of a field in DCI format 0_1 with CRC scrambled by CS-RNTI is larger than corresponding bit width of same field, after insertion of significant bits with value set to '0' when applied, in DCI format 0_1 with CRC scrambled by C-RNTI for the same serving cell. If the bit width of a field in the DCI format 0_1 with CRC scrambled by CS-RNTI is not equal to that of the corresponding field, after insertion of significant bits with value set to '0' when applied, in the DCI format 0_1 with CRC scrambled by C-RNTI for the same serving cell, a number of most significant bits with value set to '0' are inserted to the field in DCI format 0_1 with CRC scrambled by CS-RNTI until the bit width equals that of the corresponding field, after insertion of significant bits with value set to '0' when applied, in the DCI format 0_1 with CRC scrambled by C-RNTI for the same serving cell.

The UE may not expect that the bit width of a field in DCI format 0_1 with CRC scrambled by CS-RNTI is larger than corresponding bit width of same field, after prior to insertion of significant bits with value set to '0' when applied, in DCI format 0_1 with CRC scrambled by C-RNTI for the same serving cell. Alternatively or additionally, the UE may not expect that the bit width of a field in DCI format 0_1 with CRC scrambled by CS-RNTI is larger than corresponding bit width of same field, assuming the same transform precoder field value and after prior to insertion of significant bits with value set to '0' when applied, in DCI format 0_1 with CRC scrambled by C-RNTI for the same serving cell.

Figure 15:
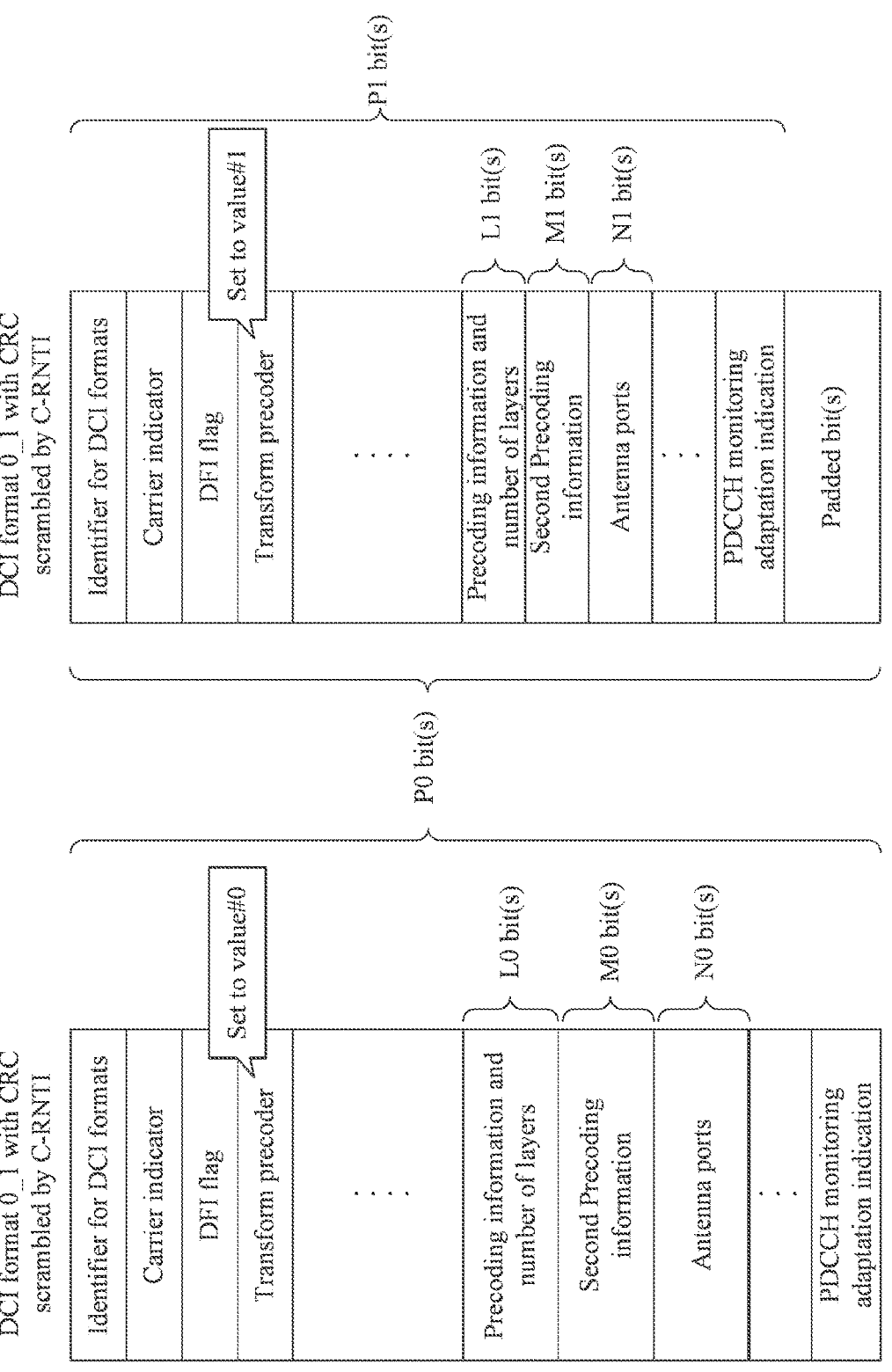
FIG. 15 shows an example of payload size of DCI format 0_1 with CRC scrambled by C-RNTI after payload size alignments.

FIG. 15 shows an example of payload size of DCI format 0_1 with CRC scrambled by C-RNTI after payload size alignments. For the UE configured with a transform precoder field in DCI format 0_1, if the number of information bits in the DCI format 0_1 with CRC scrambled by C-RNTI and with the value of its transform precoder field set to 0 (value #0) prior to padding is not equal the number of information bits in the DCI format 0_1 with CRC scrambled by C-RNTI and with the value of its transform precoder field set to 1 (value #1) for the same serving cell, zeros shall be appended to the DCI format 0_1 with the value of its transform precoder field set to 1 (value #1) until the payload size is the same as the DCI format 0_1 with the value of its transform precoder field set to 0 (value #0). If P0 (total payload size, prior to bit padding, of DCI format 0_1 with the transform precoder field set to 0 (value #0) with CRC scrambled by C-RNTI) is larger than P1 (total payload size, prior to bit padding, of DCI format 0_1 with the transform precoder field set to 1 (value #1) with CRC scrambled by C-RNTI), P0-P1 bit(s) may be inserted (bit padded) to DCI format 0_1 with the transform precoder field set to 1 (value #1) with CRC scrambled by C-RNTI.

In another example of payload size alignments, the payload size may be aligned to the larger one. For the UE configured with a transform precoder field in DCI format 0_1, if the number of information bits in the DCI format 0_1 with CRC scrambled by C-RNTI and with the value of its transform precoder field set to 0 (value #0) prior to padding is not equal the number of information bits in the DCI format 0_1 with CRC scrambled by C-RNTI and with the value of its transform precoder field set to 1 (value #1) for the same serving cell, zeros shall be appended to the DCI format 0_1 with smaller size until the payload size is the same.

As for the field size alignment between C-RNTI and CS-RNTI, larger size for C-RNTI between two waveforms may be assumed. More specifically, if the bit width of a field in the DCI format 0_1 with CRC scrambled by CS-RNTI is not equal to that of the corresponding field, assuming the transform precoding field value which requires larger size, in the DCI format 0_1 with CRC scrambled by C-RNTI for the same serving cell, a number of most significant bits with value set to '0' are inserted to the field in DCI format 0_1 with CRC scrambled by CS-RNTI until the bit width equals that of the corresponding field, assuming the transform precoding field value which requires larger size, in the DCI format 0_1 with CRC scrambled by C-RNTI for the same serving cell. Given that every field size for the DCI format 0_1 with the transform precoder field value set to 0 is larger than or equal to the one for the DCI format 0_1 with the transform precoder field value set to 1, the results of field size alignment between C-RNTI and CS-RNTI may be the same as the ones shown in FIG. 13 and FIG. 14.

All the aforementioned procedures for DCI format 01 may also be applicable to DCI format 0_2.

It is noted that when there is no difference in terms of field size or DCI payload size, bit padding may not be performed to the field or DCI format, respectively.

Figure 16:
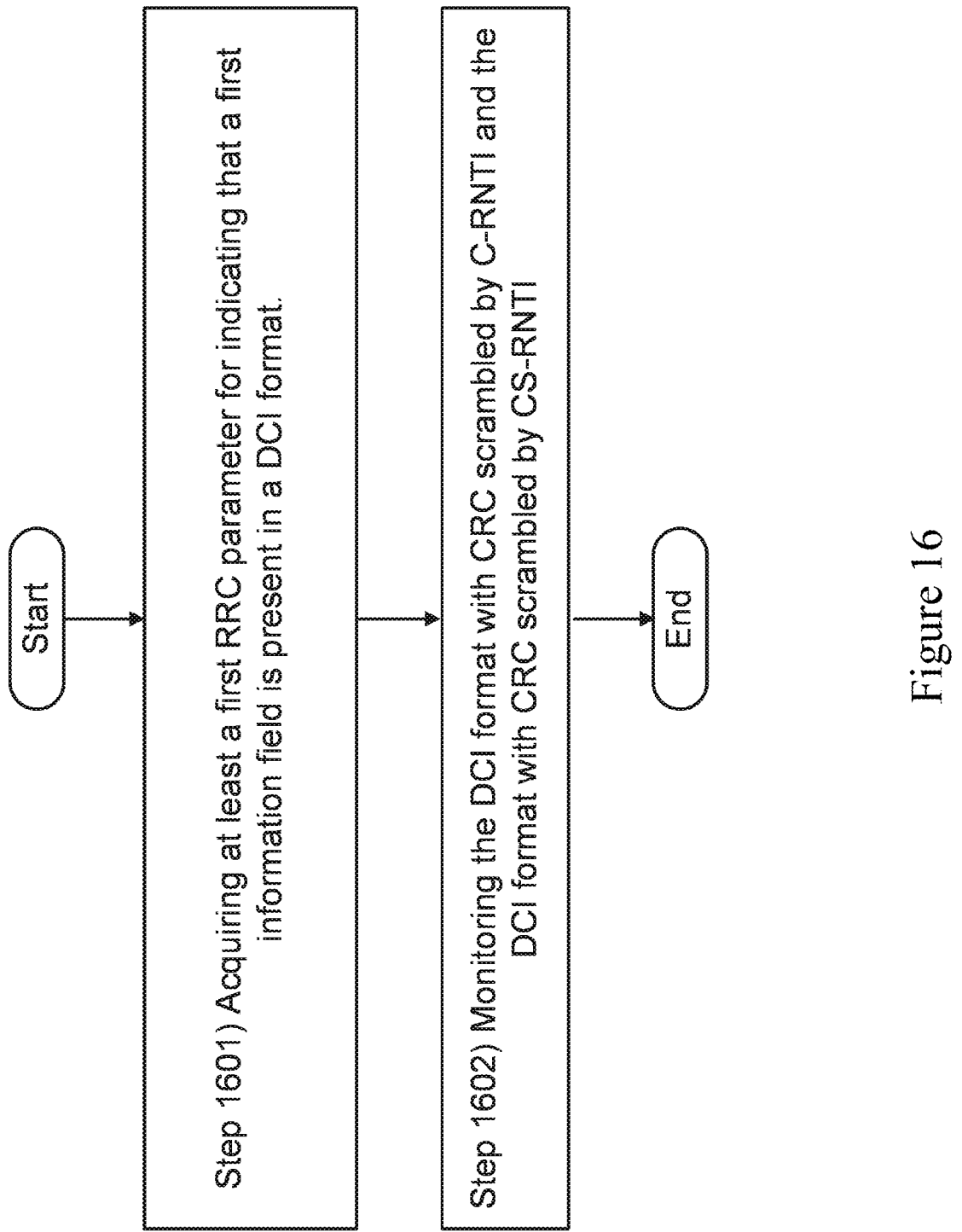
FIG. 16 shows an example of a method for a UE.

FIG. 16 shows an example of a method for a UE. The method may comprise acquiring at least a first RRC parameter for indicating that a first information field is present in a DCI format (Step1601), the first information field indicating whether a transform precoder is enabled or disabled for a PUSCH. The method may also comprise monitoring the DCI format with CRC scrambled by C-RNTI and the DCI format with CRC scrambled by CS-RNTI (Step1602). A first number of bits may be included in a second information field in the DCI format with CRC scrambled by C-RNTI with the first information field indicating the transform precoder as disabled. If a second number of bits included in the second information field in the DCI format with CRC scrambled by CS-RNTI is not equal to the first number, most significant bit of which a value is "0" may be inserted to the second information field in the DCI format with CRC scrambled by CS-RNTI until the second number becomes equal to the first number.

Figure 17:
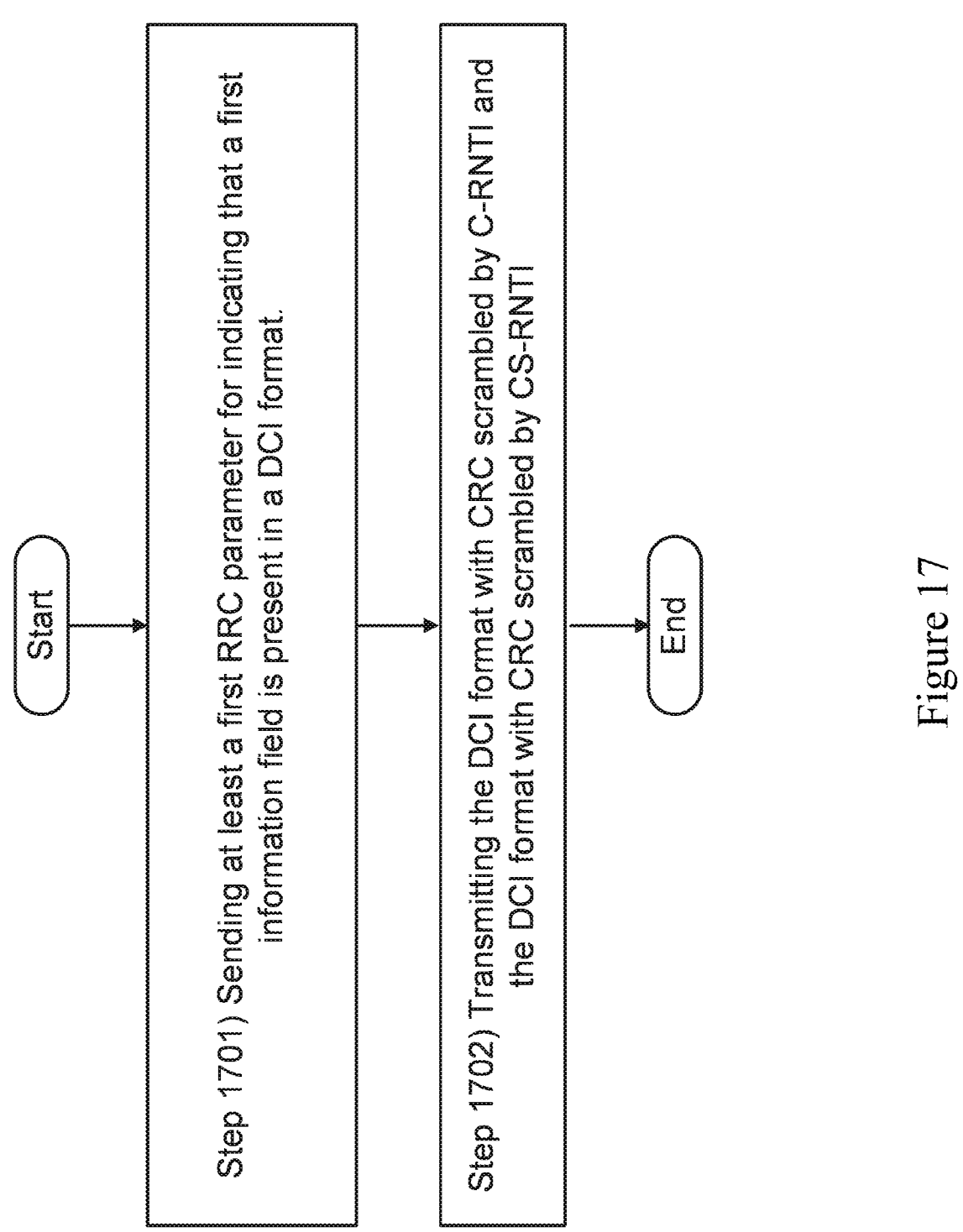
FIG. 17 shows an example of a method for a base station.

FIG. 17 shows an example of a method for a base station. The method may comprise sending at least a first RRC parameter for indicating that a first information field is present in a DCI format (Step 1701), the first information field indicating whether a transform precoder is enabled or disabled for a PUSCH. The method may also comprise transmitting the DCI format with CRC scrambled by C-RNTI and the DCI format with CRC scrambled by CS-RNTI (Step 1702). A first number of bits may be included in a second information field in the DCI format with CRC scrambled by C-RNTI with the first information field indicating the transform precoder as disabled. If a second number of bits included in the second information field in the DCI format with CRC scrambled by CS-RNTI is not equal to the first number, most significant bit of which a value is "0" may be inserted to the second information field in the DCI format with CRC scrambled by CS-RNTI until the second number becomes equal to the first number.

Each of a program running on the base station device and the terminal device according to an aspect of the present invention may be a program that controls a Central Processing Unit (CPU) and the like, such that the program causes a computer to operate in such a manner as to realize the functions of the above-described embodiment according to the present invention. The information handled in these devices is transitorily stored in a Random-Access-Memory (RAM) while being processed. Thereafter, the information is stored in various types of Read-Only-Memory (ROM) such as a Flash ROM and a Hard-Disk-Drive (HDD), and when necessary, is read by the CPU to be modified or rewritten.

Note that the terminal device 1 and the base station device 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device built into the computer system such as a hard disk.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station device 3 according to the above-described embodiment may be achieved as an aggregation (an device group) including multiple devices. Each of the devices configuring such an device group may include some or all of the functions or the functional blocks of the base station device 3 according to the above-described embodiment. The device group may include each general function or each functional block of the base station device 3. Furthermore, the terminal device 1 according to the above-described embodiment can also communicate with the base station device as the aggregation.

Furthermore, the base station device 3 according to the above-described embodiment may serve as an Evolved Universal Terrestrial Radio Access Network (E-UTRAN)

and/or NG-RAN (Next Gen RAN, NR-RAN). Furthermore, the base station device 3 according to the above-described embodiment may have some or all of the functions of a node higher than an eNodeB or the gNB.

Furthermore, some or all portions of each of the terminal device 1 and the base station device 3 according to the above-described embodiment may be typically achieved as an LSI which is an integrated circuit or may be achieved as a chip set. The functional blocks of each of the terminal device 1 and the base station device 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal device has been described as an example of a communication device, but the present invention is not limited to such a terminal device, and is applicable to a terminal device or a communication device of a fixed-type or a stationary-type electronic device installed indoors or outdoors, for example, such as an Audio-Video (AV) device, a kitchen device, a cleaning or washing machine, an air-conditioning device, office equipment, a vending machine, and other household devices.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A user equipment (UE) comprising:

high-layer processing circuitry configured to acquire at least a first radio resource control (RRC) parameter indicating that a first information field is present in a downlink control information (DCI) format, the first information field indicating whether a transform precoder is enabled or disabled for a physical uplink shared channel (PUSCH); and reception circuitry configured to monitor the DCI format with cyclic redundancy check (CRC) scrambled by cell-radio network temporary identifier (C-RNTI) and the DCI format with CRC scrambled by configured scheduling-radio network temporary identifier (CS-RNTI), wherein:

the first information field is included in the DCI format with CRC scrambled by CS-RNTI, the first information field is reserved in a case that the first RRC parameter is set to enabled, the first information field is a 1-bit field, and in a case that a first number of bits is included in a second information field in the DCI format with CRC scrambled by C-RNTI with the first information field indicating the transform precoder as disabled, and in a case that a second number of bits included in the second information field in the DCI format with CRC scrambled by CS-RNTI is not equal to the first number of bits, a most significant bit a value of which is "0" is inserted to the second information field in the DCI format with CRC scrambled by CS-RNTI until the second number of bits becomes equal to the first number of bits.

2. The UE according to claim 1, wherein in a case that a third number of bits is included in the second information field in the DCI format with CRC scrambled by C-RNTI with the first information field indicating the transform precoder as enabled, and in a case that a third number of bits is not equal to the first number of bits, a most significant bit a value of which is "0" is inserted to the second information field in the DCI format with CRC scrambled by C-RNTI with the first information field indicating the transform precoder as enabled until the third number of bits becomes equal to the first number of bits.

3. The UE according to claim 2, wherein a fourth number of bits is included in the DCI format with CRC scrambled by C-RNTI with the first information field indicating the transform precoder as disabled, a fifth number of bits is included in the DCI format with CRC scrambled by C-RNTI with the first information field indicating the transform precoder as enabled, and in a case that the fourth number of bits is not equal to the fifth number of bits, a most significant bit a value of which is "0" is inserted to the DCI format with CRC scrambled by C-RNTI with the first information field indicating the transform precoder as enabled until the fifth number of bits becomes equal to the fourth number of bits.

4. A base station comprising:

high-layer processing circuitry configured to transmit at least a first radio resource control (RRC) parameter indicating that a first information field is present in a downlink control information (DCI) format, the first information field indicating whether a transform precoder is enabled or disabled for a physical uplink shared channel (PUSCH); and transmission circuitry configured to transmit the DCI format with cyclic redundancy check (CRC) scrambled by cell-radio network temporary identifier (C-RNTI) and the DCI format with CRC scrambled by configured scheduling-radio network temporary identifier (CS-RNTI), wherein;

the first information field is included in the DCI format with CRC scrambled by CS-RNTI, the first information field is reserved in a case that the first RRC parameter is set to enabled, the first information field is a 1-bit field, and in a case that a first number of bits is included in a second information field in the DCI format with CRC scrambled by C-RNTI with the first information field indicating the transform precoder as disabled, and in a case that a second number of bits included in the second information field in the DCI format with CRC scrambled by CS-RNTI is not equal to the first number of bits, a most significant bit a value of which is "0" is inserted to the second information field in the DCI format with CRC scrambled by CS-RNTI until the second number of bits becomes equal to the first number of bits.

5. The base station according to claim 4, wherein a third number of bits is included in the second information field in the DCI format with CRC scrambled by C-RNTI with the first information field indicating the transform precoder as enabled, and in a case that a third number of bits is not equal to the first number of bits, a most significant bit a value of which is "0" is inserted to the second information field in the DCI format with CRC scrambled by C-RNTI with the first information field indicating the transform precoder as enabled until the third number of bits becomes equal to the first number of bits.

6. The base station according to claim 4, wherein a fourth number of bits is included in the DCI format with CRC scrambled by C-RNTI with the first information field indicating the transform precoder as disabled, a fifth number of bits is included in the DCI format with CRC scrambled by C-RNTI with the first information field indicating the transform precoder as enabled, and in a case that the fourth number of bits is not equal to the fifth number of bits, a most significant bit a value of which is "0" is inserted to the DCI format with CRC scrambled by C-RNTI with the first information field indicating the transform precoder as enabled until the fifth number of bits becomes equal to the fourth number of bits.

7. A method performed by a user equipment (UE), the method comprising:

acquiring at least a first radio resource control (RRC) parameter indicating that a first information field is present in a downlink control information (DCI) format, the first information field indicating whether a transform precoder is enabled or disabled for a physical uplink shared channel (PUSCH); and monitoring the DCI format with cyclic redundancy check (CRC) scrambled by cell-radio network temporary identifier (C-RNTI) and the DCI format with CRC scrambled by configured scheduling-radio network temporary identifier (CS-RNTI), wherein:

the first information field is included in the DCI format with CRC scrambled by CS-RNTI, the first information field is reserved in a case that the first RRC parameter is set to enabled, the first information field is a 1-bit field, and in a case that a first number of bits is included in a second information field in the DCI format with CRC scrambled by C-RNTI with the first information field indicating the transform precoder as disabled, and in a case that a second number of bits included in the second information field in the DCI format with CRC scrambled by CS-RNTI is not equal to the first number of bits, a most significant bit a value of which is "0" is inserted to the second information field in the DCI format with CRC scrambled by CS-RNTI until the second number of bits becomes equal to the first number of bits.

* * * * *